United States Patent
Sakamoto et al.

(10) Patent No.: US 7,706,934 B2
(45) Date of Patent: Apr. 27, 2010

(54) PORTABLE GUIDE DEVICE AND PORTABLE TELEPHONE

(75) Inventors: Hiroshi Sakamoto, Tokyo (JP); Keisuke Onishi, Tokyo (JP)

(73) Assignee: Navitime Japan Co., Ltd., Tokyo (JP)

( * ) Notice: Subject to any disclaimer, the term of this patent is extended or adjusted under 35 U.S.C. 154(b) by 815 days.

(21) Appl. No.: 11/579,412

(22) PCT Filed: Apr. 27, 2005

(86) PCT No.: PCT/JP2005/007960

§ 371 (c)(1),
(2), (4) Date: Nov. 2, 2006

(87) PCT Pub. No.: WO2005/109367

PCT Pub. Date: Nov. 17, 2005

(65) Prior Publication Data

US 2007/0208502 A1    Sep. 6, 2007

(30) Foreign Application Priority Data

May 6, 2004    (JP)    ............................. 2004-136957

(51) Int. Cl.
G05D 1/00    (2006.01)
G05D 3/00    (2006.01)

(52) U.S. Cl. ........................... 701/19; 701/20; 701/205; 701/209; 701/117; 701/202; 345/419; 246/1 R; 246/1 C; 246/7; 455/456; 455/414

(58) Field of Classification Search ............. 701/19–20, 701/205, 117, 209, 202; 455/456, 414; 246/1 R, 246/1 C, 7

See application file for complete search history.

(56) References Cited

U.S. PATENT DOCUMENTS 3,268,727 A * 8/1966 Shepard .................. 246/187 A (Continued)

FOREIGN PATENT DOCUMENTS

CN    101146120 A    *    3/2008

(Continued)

OTHER PUBLICATIONS

An Analog VLSI Velocity Sensor System for Depth Perception; Karri, S.S.; Titus, A.H.; Sensors Journal, IEEE; vol. 6, Issue 5, Oct. 2006 pp. 1287-1297; Digital Object Identifier 10.1109/JSEN.2006.881379.*

(Continued)

Primary Examiner—Cuong H Nguyen
(74) Attorney, Agent, or Firm—Westerman, Hattori, Daniels & Adrian, LLP

(57) ABSTRACT

A portable guide device is characterized by comprising a transport facility start judgment means for judging that a transport facility has begun to move if a period where an acceleration detected by an acceleration sensor (SN3) is included continuously in an acceleration range at the time of starting movement is not shorter than the acceleration continuation time; a distance calculation means for calculating the moving distance of the transport facility according to an acceleration detected by the acceleration sensor (SN3) when start of movement of the transport facility is detected; a route information storage means (KC6A) for storing route information including information on a distance between stations of the transport facility and station identifying information for identifying each station; and an announcement device control means (KC1) for controlling an announcement unit (11) which announces guidance of a station to a user of the portable guide device according to the station identification information on an entraining station, route information, and the moving distance.

8 Claims, 28 Drawing Sheets

U.S. PATENT DOCUMENTS

| | | | | |
|---|---|---|---|---|
| 4,179,739 | A | * | 12/1979 | Virnot ........................ 701/117 |
| 5,974,368 | A | * | 10/1999 | Schepps et al. ............ 340/5.61 |
| 6,332,107 | B1 | * | 12/2001 | Gordon et al. ................ 701/20 |
| 6,397,129 | B1 | * | 5/2002 | Lanoix et al. ................. 701/19 |
| 6,567,000 | B2 | * | 5/2003 | Slifkin et al. ............... 340/436 |
| 6,647,328 | B2 | * | 11/2003 | Walker ........................ 701/36 |
| 6,681,161 | B1 | * | 1/2004 | Gordon et al. ................ 701/20 |
| 6,980,894 | B1 | * | 12/2005 | Gordon et al. ................ 701/20 |
| 7,571,048 | B2 | * | 8/2009 | Komatsu .................... 701/201 |
| 2004/0049324 | A1 | * | 3/2004 | Walker ........................... 701/1 |
| 2007/0208502 | A1 | * | 9/2007 | Sakamoto et al. ........... 701/205 |
| 2007/0260369 | A1 | * | 11/2007 | Philp et al. .................... 701/19 |
| 2008/0082256 | A1 | * | 4/2008 | Komatsu .................... 701/202 |
| 2008/0186205 | A1 | * | 8/2008 | Breed ......................... 340/901 |
| 2008/0260210 | A1 | * | 10/2008 | Kobeli et al. ................ 382/114 |

FOREIGN PATENT DOCUMENTS

| | | | | |
|---|---|---|---|---|
| JP | 5-2087 | A | | 1/1993 |
| JP | 5-37460 | A | | 2/1993 |
| JP | 5-284069 | A | | 10/1993 |
| JP | 6-138821 | A | | 5/1994 |
| JP | 9-23477 | A | | 1/1997 |
| JP | 3206477 | B2 | | 9/2001 |
| JP | 2001298775 | A | * | 10/2001 |
| JP | 2002-67959 | A | | 3/2002 |
| JP | 2002-79846 | A | | 3/2002 |
| JP | 2002-178923 | A | | 6/2002 |
| JP | 2002-204467 | A | | 7/2002 |
| JP | 2002-230461 | A | | 8/2002 |
| JP | 2003-204577 | A | | 7/2003 |
| JP | 2003-331397 | A | | 11/2003 |
| JP | 2005041262 | A | * | 2/2005 |
| JP | 2007022160 | A | * | 2/2007 |
| JP | 2007322198 | A | * | 12/2007 |
| KR | 2007068134 | A | * | 6/2007 |
| WO | WO 2007061734 | A2 | * | 5/2007 |

OTHER PUBLICATIONS

Design, control, and characterization of a sliding linear investigative platform for analyzing lower limb stability (Slip-Falls) Robinson, C.J.; Purucker, M.C.; Faulkner, L.W.; Rehabilitation Engineering, IEEE Transactions on [see also IEEE Trans. on Neural Systems and Rehabilitation];vol. 6, Issue 3, Sep. 1998 pp. 334-350.*

An integrated GPS and multi-sensor pedestrian positioning system for 3D urban navigation; Wei Chen,; Zhongqian Fu,; Ruizhi Chen,; Yuwei Chen,; Andrei, Octavian; Kroger, Tuomo; Jianyu Wang,; Urban Remote Sensing Event 2009; May 20-22, 2009 pp. 1-6; Digital Object Identifier 10.1109/URS.2009.5137690.*

An accelerometer incorporating a micro-laser encoder for a wide measurable range [for earthquake detection]; Sawada, R.; Higurashi, E.; Itoh, T.; Optical MEMS, 2000 IEEE/LEOS International Conference on; Aug. 21-24, 2000 pp. 14-146 Digital Object Identifier 10.1109/0MEMS.2000.879667.*

Noise Cancellation Model Validation for Reduced Motion Artifact Wearable PPG Sensors Using MEMS Accelerometers; Wood, L.B.; Asada, H.H.; Engineering in Medicine and Biology Society, 2006. EMBS '06. 28th Annual International Conference of the IEEE; Aug. 30-Sep. 3, 2006 pp. 3525-3528; Digital Object Identifier 10.1109/IEMBS.2006.260359.*

Modelling Intelligent Transportation Systems and Their Implications for Climate Change; Armstrong, J.; Khan, A.; EIC Climate Change Technology, 2006 IEEE; May 10-12, 2006 pp. 1-10; Digital Object Identifier 10.1109/EICCCC.2006.277184.*

Maglev vehicles-raising transportation advances of the ground; Powell, Jr.; Danby, G.T.; Potentials, IEEE; vol. 15, Issue 4, Oct.-Nov. 1996 pp. 7-12; Digital Object Identifier 10.1109/45.539957.*

Optimising vehicle positioning systems on automatic railways-a case study; Wallace, P.R.; Developments in Mass Transit Systems, 1998. International Conference on (Conf. Publ. No. 453); Apr. 20-23, 1998 pp. 202-207.*

Longitudinal control system of the intermediate capacity transit system; Rudderham, W.; Vehicular Technology Conference, 1983. 33rd IEEE; vol. 33, May 25-27, 1983 pp. 183-190.*

The influence of policy and operating decisions on systems elements of the Chicago Circulator; Moore, W.R.; Vutz, N.; Mason, J.; Railroad Conference, 1995., Proceedings of the 1995 IEEE/ASME Joint; Apr. 4-6, 1995 pp. 29-38; Digital Object Identifier 10.1109/RRCON.1995.395172.*

Overview of electric railway systems and the calculation of train performance; Goodman, C.J.; Electric Traction Systems, 2008 IET Professional Development course on; Nov. 3-7, 2008 pp. 1-24.*

Map Warping for the Annotation of Metro Maps; Bottger, J. et al.; Computer Graphics and Applications, IEEE; vol. 28, Issue 5, Sep.-Oct. 2008 pp. 56-65; Digital Object Identifier 10.1109/MCG.2008.99.*

Estimation of user's position and behavior based on measurements of sensor information; Tsuji, K.; Kamioka, E.; Autonomous Decentralized Systems, 2009. ISADS '09. International Symposium on; Mar. 23-25, 2009 pp. 1-6 Digital Object Identifier 10.1109/ISADS.2009.5207381.*

Integrating GIS with Cellular Automaton Model for Railway Transportation Safety System; Huijuan Zhou; Limin Jia; Yong Qin; Computer Science and Information Engineering, 2009 WRI World Congress on; vol. 5, Mar. 31-Apr. 2 2009 pp. 503-507; Digital Object Identifier 10.1109/CSIE.2009.821.*

Estimation of user's position and behavior based on measurements of sensor information; Tsuji, K. et al.; Autonomous Decentralized Systems, 2009. ISADS '09. International Symposium on; Mar. 23-25, 2009 pp. 1-6; Digital Object Identifier 10.1109/ISADS.2009.5207381.*

Closed Form Expressions of Optimal Buffer Times between Scheduled Trains at Railway Bottlenecks; Yuan, J.; Hansen, I.A.; Intelligent Transportation Systems, 2008. ITSC 2008. 11th International IEEE Conference on; Oct. 12-15, 2008 pp. 675-680; Digital Object Identifier 10.1109/ITSC.2008.4732539.*

International Search Report of PCT/JP2005/007960 date of mailing Jun. 7, 2005.

Form PCT/IB/338, mailed Mar. 1, 2007, with Form PCT/IPEA/409 issued in International Application No. PCT/JP2005/007960.

* cited by examiner

Start Point
- ⊙ GPS
- ○ Telephone Number [ ]
- ○ Address [ ]

⎤ Start Point Input Field

Goal
[Tokyo Tower]

⎤ Goal Input Field

Date and Time
[ ]/[ ]/[ ]
[ ]:[ ]

⊙ Start ○ Arrival

⎤ Start Date and Time or Arrival Date and Time

Search Number
⊙ 1 ○ 2 ○ 3

⎤ Search Number Input Field

Transport Facility
- ⊙ Transport Facility + Walking
- ○ Walking
- ○ Vehicle

⎤ Transport Facility Input Field

[Search Start] — Search Start Icon

Fig.4

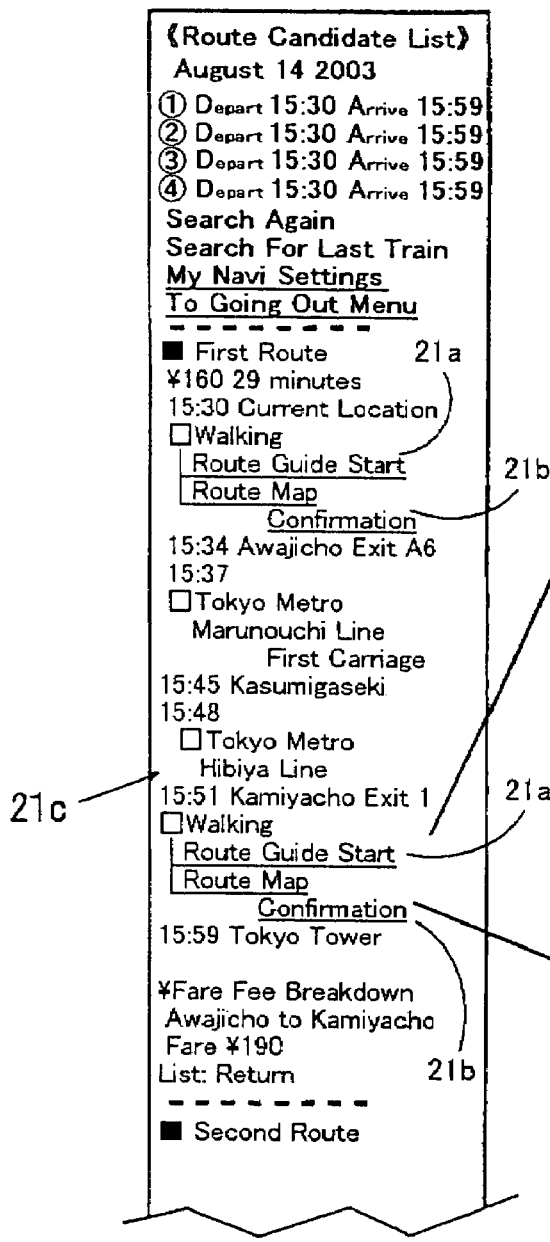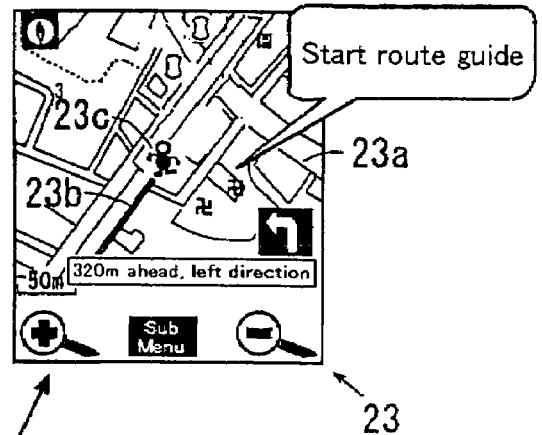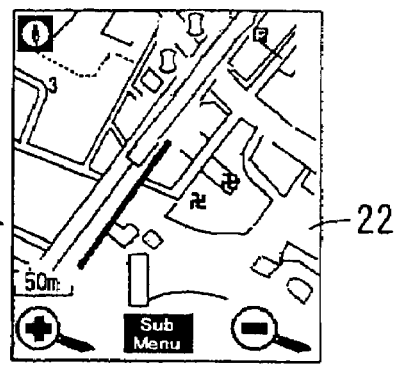
Fig. 12A
Fig. 12B
Fig. 12C
Fig. 12

(Fig. 15A)
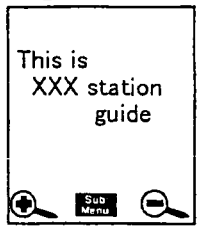
(Fig. 15B)
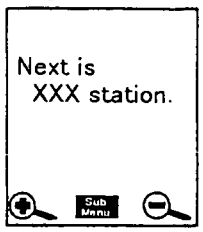
(Fig. 15C)
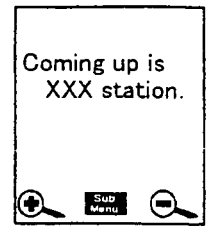
(Fig. 15D)
(Fig. 15E)
(Fig. 15F)
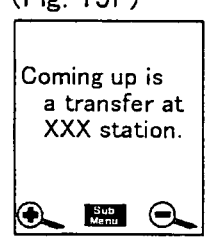
(Fig. 15G)
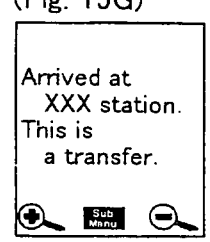
(Fig. 15H)
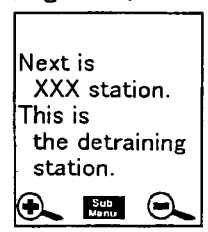
(Fig. 15I)
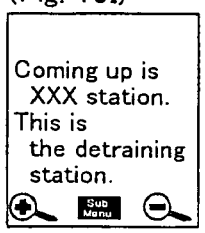
(Fig. 15J)
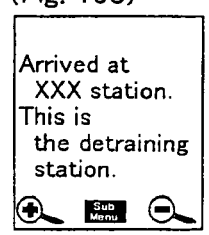
(Fig. 15K)
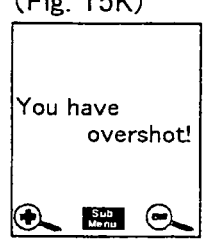
Fig. 15

Station Guide Display Process
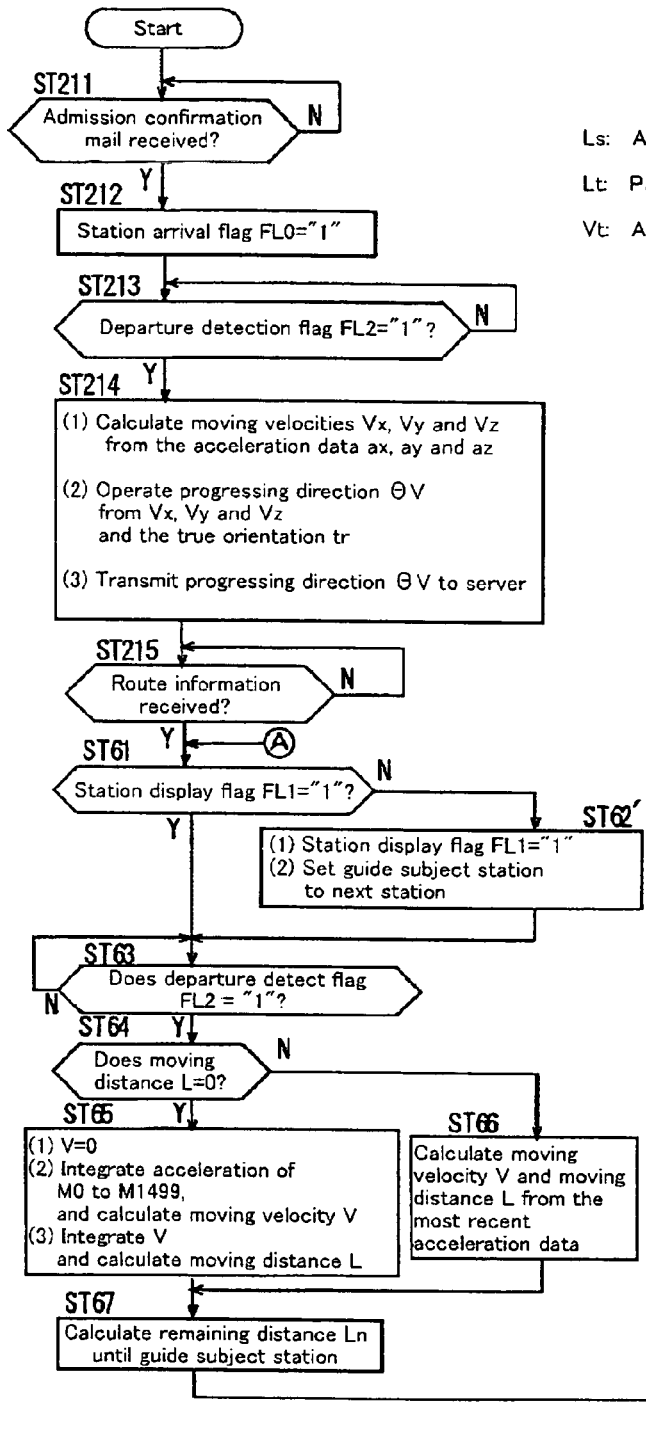
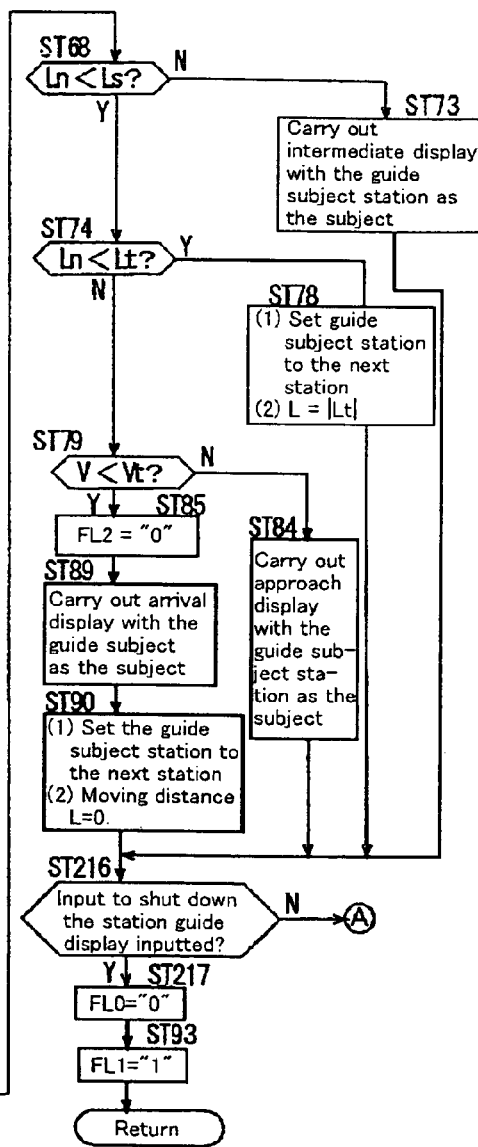
Ls: Approach Judging Distance (200m)
Lt: Passed Judging Disatance (-200m)
Vt: Arrival Judging Velocity (5km/h)
Fig.21

| | | | |
|---|---|---|---|
| Start-up Date | ⊙ Week-day ○ Daily ○ Weekly | XXX ▼ day | |

Detect Time  Outward  [AM 8:00 ▼] ~ [AM 8:30 ▼]
Homeward [PM 5:00 ▼] ~ [AM10:00 ▼]

Zone  [Recorded Route 1]

Arrival Announcement  [Vibration pattern 1]

Option  [Silent mode ON]

Fig.24

Station Detection Process (Server Side)

PORTABLE GUIDE DEVICE AND PORTABLE TELEPHONE

FIELD OF THE INVENTION

The present invention relates to a portable guide device for providing a train or subway station guide for commuters and travelers, and especially relates to a portable guide device and a portable telephone which are capable of announcing the train's arrival at the station where the user carrying the portable guide device intends to detrain or disembark.

In addition to portable telephones, the present invention can also be suitably applied to portable guide devices such as a Personal Digital Assistance unit ("PDA"), music players (e.g. a headphone stereo or the like), a laptop computer and the like.

BACKGROUND OF THE INVENTION

A person who is aboard a transport facility, such as a train or the subway, may sometimes miss or overshoot his detraining station simply due to ignorance or if he should fall asleep on the way. To prevent overshooting, certain techniques have been proposed, including the following prior art, and referred to as Techniques (1) to (3).

(1) Techniques which use the Train Station Arrival Schedule at the Station of Destination (Detraining Station)

Examples of techniques which use the train station arrival schedule are laid out in Japanese Patents JP-5-2087-A (paragraphs 0012 and 0013, hereinafter, "Patent Document 1") and JP-2002-178923-A (paragraphs 0064 to 0068, and FIGS. 11 to 14, hereinafter, "Patent Document 2").

In Patent Documents 1 and 2, the user requests the schedule of arrival of a certain train at an entraining station or a detraining station based on a train timetable, and the arrival time announced to the user is calculated based on the time derived from the timetable and the current time acquired from an internal clock.

(2) Techniques for Detecting a Detraining Station by Means of an Announcement Received from a Signal Generator Installed on the Train Techniques for detecting a detraining station by means of an announcement received from a signal generator installed on the train include, for example, Japanese Patents JP-5-284069-A (paragraphs 0006 to 0008, and FIGS. 1 and 3, hereinafter, "Patent Document 3"), JP-6-138821-A (paragraphs 0019 to 0022, 0026 to 0028 and FIG. 2, hereinafter, "Patent Document 4"), and JP-2002-67959-A (paragraphs 0017 to 0035, hereinafter, "Patent Document 5"). Patent Document 3 discloses a technique for announcing whether the transport facility is approaching a detraining station based on a code which shows a received station name and a pre-determined detraining station code, by using a receiver for receiving a code signal which shows the station name transmitted from a signal transmitting device installed inside the moving train.

Patent Document 4 discloses a technique for judging whether a certain station is the detraining station, based on pre-recorded information identifying the station of destination, by using a portable terminal device for receiving identification information regarding the station of destination transmitted by way of a transmitting means installed inside a running train or within the vicinity of a station.

Patent Document 5 discloses a technique for generating a warning based on pre-stored information regarding a detraining station, by using a portable terminal device for receiving information in respect of the station of destination transmitted from a station where the train has stopped by means of a transmitting device installed inside the carriage of the train.

(3) Techniques for Detecting a Detraining Station by Communicating with the Base Station of a Portable Telephone, Global Positioning System or the Like Examples of techniques for detecting a detraining station by communicating with the base station of a portable telephone, Global Positioning System (GPS) or the like include, for example, Japanese Patents JP-5-37460-A (paragraphs 0012 to 0020, hereinafter, "Patent Document 6"), JP-9-23477-A (paragraphs 0034 to 0048, and FIGS. 1 to 8, hereinafter, "Patent Document 7"), JP-2002-204467-A (paragraphs 0008 to 0010, and FIGS. 1 to 3, hereinafter, "Patent Document 8") and Japanese Patent No. 3206477 (paragraphs 0014 to 0040, hereinafter "Patent Document 9").

Patent Document 6 discloses a technique for pre-recording in a wireless terminal, wireless base station area codes pertaining to the area which covers the detraining station, whereby the area codes sent through wireless electromagnetic waves from the wireless base station are received for announcing whether the transport facility is approaching a detraining (destination) station by comparing such codes with previously recorded area codes.

Patent Document 7 discloses a technique for pre-recording in a moving device, the name of the detraining station or the parameters of the base station within the vicinity of the detraining station, receiving the announcement of information on the station name or base station parameters transmitted from the base station, and informing the user that the transport facility is approaching the detraining station after making such a determination by comparing the information to be announced with recorded information.

Patent Document 8 discloses a technique applicable to a portable device for preventing a user from missing or overshooting the detraining station, by sending a warning before the transport facility arrives at the detraining station based on a signal received from a station ticket gate or a GPS.

Patent Document 9 discloses a technique using GPS for detecting the user's current position when a portable guide device is able to receive electromagnetic waves from a GPS, and if GPS reception is not possible, the user's current position may be detected by means of dead-reckoning navigation using a 3-axial gyro (acceleration sensor), and for displaying station information according to pre-stored route data and the user's current position.

DISCLOSURE OF THE INVENTION

Problems to be Solved

Hereafter, the problems related to the techniques disclosed in Patent Documents 1 to 9 will be cited.

Problems in Respect of the Related-Art Technique
(1)

In the related-art techniques disclosed in Patent Documents 1 and 2, since guidance for a detraining station is conducted based on a pre-existing timetable, such service cannot be provided in accordance with the actual running situation of the transport facility if the train is delayed or a particular trip is canceled, etc. due to an accident or traffic congestion. Thus, if guidance is conducted in accordance with the pre-existing timetable and a delay, etc. has occurred, the guidance conducted may be incorrect, such that a user may be led to detrain at the wrong station.

Problems in Respect of the Related-Art Technique
(2)

In the related-art techniques disclosed in Patent Documents 3 to 5, a separate device has to be installed for transmitting information to a particular site, such as a train station or carriage, or to a facility. Providing every station and every carriage with such a device would entail enormous costs, which is problematic. In addition, such a method is unrealistic, and in fact has not been put to actual use. Further, if provision is made only for selected stations or certain carriages of selected routes, the number of guide routes that can be provided will be restricted.

Problems in Respect of the Related-Art Technique
(3)

The related-art techniques disclosed in Patent Documents 6 to 8 can be used only in environments where signals transmitted from a base station or a GPS can be received. For example, when GPS is used, these techniques cannot be used on the subway where electromagnetic waves from a GPS cannot be received. Further, if electromagnetic waves from a base station are utilized, guidance for a detraining station cannot be conducted when the train moves to an area outside the range where electromagnetic waves can be received from the base station.

In addition, in city areas where transport facilities are highly developed, it is often the case that many stations are adjacent to each other within a small location, whereby several stations may be covered by only one base station area, such that a station cannot be specified by the electromagnetic waves emanating from the base station.

In the technique disclosed in Patent Document 9, acceleration is detected using a 3-axial gyro, and the user's current position is detected by dead-reckoning navigation based on acceleration of the transport facility. However, when dead-reckoning navigation is resorted to, or in other words, at the moment where the detection of current position by GPS is switched to detection of current position by dead-reckoning navigation, the determination of motion velocity becomes an issue. In the dead-reckoning navigation of Patent Document 9, the present position is detected by integrating the acceleration twice to calculate the relative distance traveled from the position where dead-reckoning navigation is commenced. However, if the velocity (initial velocity) at the moment of switching over is not correct, the initial velocity will accumulate as an error, which will result in erroneous detection of the current position. For example, if dead-reckoning navigation is commenced with a mistaken initial velocity of 4 km/h/s, 30 minutes later the error will be 2 km, giving rise to the possibility that the detraining station found will be off by about 1 to 3 stations. Therefore, guidance for a detraining station cannot be accurately conducted using the technique disclosed in Patent Document 9. In particular, for portable devices such as portable telephones or the like, it is extremely difficult to determine the initial velocity (walking velocity) since such devices also move as users continually move, and thus are not in a fixed position at the moment of switching over to dead-reckoning navigation.

Bearing the above-described circumstances in mind, the present invention first aims to conduct and accurately provide a station guide even if electromagnetic waves from a GPS or a base station are not received.

Secondly, the present invention aims to conduct a station guide by using existing systems (infrastructure), that is, without installing new devices in a train carriage or station or the like.

Thirdly, the present invention aims to conduct a guide in accordance with the actual running situation of a transport facility.

Means to Solve the Problems

Embodiments of the present invention will be described hereafter. However, in order to simplify the relationship between and among the elements in the specific examples (Examples) of the below-described embodiments, the elements of the present embodiment have been marked with reference symbols corresponding to those of the elements in the Examples and enclosed in brackets. The use of such reference symbols is only for the purpose of explaining the present embodiment and making it easier to understand, and is not intended in any manner to restrict the scope of the present embodiment to that set out in the Examples.

FIRST EMBODIMENT

The portable guide device according to the First Embodiment for resolving the above-described technical problems comprises:

an acceleration sensor (SN3) for detecting the acceleration of a portable guide device when it is in motion;

acceleration range storage means (KC14A) for storing the motion start time acceleration range of a transport facility which accelerates at a certain speed within a predetermined range at motion start time;

acceleration continuation time storage means (KC14C) for storing the acceleration continuation time to determine whether the transport facility has begun to move;

acceleration range judging means (KC14B) for determining whether the acceleration detected by the acceleration sensor (SN3) is within the motion start time acceleration range;

acceleration continuation judging means (KC14D) for determining whether the acceleration detected by the acceleration sensor (SN3) is within the motion start time acceleration range and whether the duration thereof is longer than the acceleration continuation time;

transport facility motion start judging means (KC14) for determining that the transport facility as begun to move when the acceleration detected by the acceleration sensor (SN3) is within the motion start time acceleration range and the duration thereof is longer than the acceleration continuation time;

distance traveled calculating means (KC16B) for calculating, upon detection that the transport facility has begun to move, the distance traveled by the transport facility based on the acceleration detected by the acceleration sensor (SN3);

route information storage means (KC6A) for storing route information consisting of information pertaining to either the distance between respective stations of the transport facility or information on the position of stations, and station identification information for identifying the respective stations;

entraining station storage means (KC6A1) for storing the station identification information in respect of the entraining station of the transport facility; and announcement device control means (KC1) which controls an announcement unit (11) for announcing a station guide to a user of the portable guide device based on the station identification information in respect of the entraining station, route information and the distance traveled by the transport facility.

EFFECTS OF THE FIRST EMBODIMENT

In the portable guide device comprising the constitutional elements of the First Embodiment, the acceleration of the portable guide device when it is in motion can be detected by the acceleration sensor (SN3). The acceleration range judging means (KC14B) determines whether the acceleration detected by the acceleration sensor (SN3) is within the motion start time acceleration range stored in the acceleration range storage means (KC14A). The acceleration continuation judging means (KC14D) determines whether the acceleration detected by the acceleration sensor (SN3) and stored in the acceleration continuation time storage means (KC14C) is within the motion start time acceleration range and whether the duration thereof is longer than the acceleration continuation time. The transport facility motion start judging means (KC14) determines that the transport facility has begun to move when the acceleration detected by the acceleration sensor (SN3) is within the motion start time acceleration range and the duration thereof is longer than the acceleration continuation time.

The distance traveled calculating means (KC16B) calculates, upon detection that the transport facility has begun to move, the distance traveled by the transport facility based on the acceleration detected by the acceleration sensor (SN3). The route information storage means (KC6A) stores route information consisting of information pertaining to either the distance between respective stations of the transport facility or information on the position of stations, and station identification information for identifying the respective stations.

The announcement unit (11) announces a station guide to a user of the portable guide device based on the station identification information in respect of the entraining station stored in the entraining station storage means (KC6A1), the route information and the distance traveled by the transport facility.

Therefore, in the portable guide device according to the First Embodiment, the motion start of a transport facility can be detected based on the acceleration detected by the acceleration sensor SN3. When it starts to move, the initial velocity of the transport facility is zero, so that the distance traveled can be accurately calculated based on the acceleration. As a result, even if electromagnetic waves from a GPS or a base station cannot be received, the distance traveled can be accurately calculated, whereby calculation of a current position or calculation of the remaining distance to a station can be conducted with good precision. Therefore, station guidance can be accurately conducted for users.

Further, since the distance traveled is calculated without using a timetable, by detecting the motion start of the transport facility actually boarded by the user, station guidance can be conducted in accordance with actual running conditions, without being affected by delays or cancellation of scheduled trips by the transport facility.

FIRST ASPECT OF THE FIRST EMBODIMENT

The portable guide device according to the first aspect of the First Embodiment pertains to the portable guide device of the First Embodiment and comprises:

route information receiving means (KC5C) for receiving the route information transmitted from a route information providing server (7) storing the route information; and the route information storage means (KC6A) for storing the received route information.

EFFECTS OF THE FIRST ASPECT OF THE FIRST EMBODIMENT

In the portable guide device comprising the constitutional elements according to the first aspect of the First Embodiment, route information receiving means (KC5C) receives the route information transmitted from a route information providing server (7) storing the route information. Further, the route information storage means (KC6A) stores the received route information. Therefore, there is no need to store route voluminous information (as that pertaining to the whole country) in the main section of the portable guide device, since route information can be obtained from the route information providing server (7) as needed.

SECOND ASPECT OF THE FIRST EMBODIMENT

The portable guide device according to the second aspect of the First Embodiment pertains to the portable guide device of the First Embodiment and further comprises:

admission information receiving means (KC5D) which receives admission information in respect of admission to a station; and the entraining station storage means (KC6A1) which stores the admitted station as the entraining station based on the admission information received.

EFFECTS OF THE SECOND ASPECT OF THE FIRST EMBODIMENT

In the portable guide device comprising the constitutional elements according to the second aspect of the First Embodiment, the admission information receiving means (KC5D) receives admission information pertaining to admission into a station. Further, the entraining station storage means (KC6A1) stores the admitted station as the entraining station based on the admission information received. Therefore, when the user of a portable guide device is admitted into a station, the admitting station is automatically set as the entraining station without need for the user to perform such setting.

THIRD ASPECT OF THE FIRST EMBODIMENT

The portable guide device according to the third aspect of the First Embodiment pertains to the portable guide device of the second aspect of the First Embodiment and further comprises:

traveling direction operating means (KC16A) which, upon detection that the transport facility has begun to move, determines the traveling direction of the transport facility based on the acceleration detected by the acceleration sensor (SN3);

traveling direction information transmitting means (KC4B) which transmits information in respect of the traveling direction to the route information providing server (7) for detecting a station on a particular route of the boarded transport facility based on the admission information and information on the traveling direction; and a route information storage means (KC6A) for storing the route information comprising station identification information pertaining to stations on the route transmitted from the route information providing server (7).

EFFECTS OF THE THIRD ASPECT OF THE FIRST EMBODIMENT

In the portable guide device comprising the constitutional elements according to the third aspect of the First Embodiment, the traveling direction detection means (KC16A) determines, upon detection that the transport facility has begun to move, the traveling direction of the transport facility based on the acceleration detected by the acceleration sensor (SN3). The traveling direction information transmitting means (KC4B) then transmits such information to the route information providing server (7) which detects stations on a particular route of the boarded transport facility based on the admission information and information on the traveling direction. The route information storage means (KC6A) stores the route information comprising station identification information on the stations along the route transmitted from the route information providing server (7). Therefore, the portable guide device according to the third aspect of the First Embodiment can automatically detect the progressing direction of the transport facility boarded by the user, and can conduct a station guide in the progressing direction of the route taken by the transport facility.

FOURTH ASPECT OF THE FIRST EMBODIMENT

The portable guide device according to the fourth aspect of the First Embodiment pertains to the portable guide device of any of the First Embodiment, the first aspect of the First Embodiment or the second aspect of the First Embodiment and further comprises:

station setting image display means (KC20) which displays a station setting image for setting the departure station and the destination station;

set station information transmitting means (KC4C) for transmitting information on the departure station and the destination station set according to inputs into the station setting image to the route information providing server (7) which stores the route information; and the route information storage means (KC6A) for storing the route information comprising station identification information in respect of the departure station, the destination station, and each of the transit stations transmitted from the route information providing server (7) which detects transit stations between the departure station and the destination station.

EFFECTS OF THE FOURTH ASPECT OF THE FIRST EMBODIMENT

In the portable guide device comprising the constitutional elements according to the fourth aspect of the First Embodiment, the station setting image display means (KC20) displays a station setting image for setting the departure station and destination station. The set station information transmitting means (KC4C) transmits information on the departure station and the destination station determined based on inputs made into the station setting image to the route information providing server (7) storing the route information. The route information storage means (KC6A) stores the route information comprising station identification information in respect of the departure station, the destination station, and each of the transit stations transmitted from the route information providing server (7) which detects transit stations between the departure station and the destination station.

Therefore, the portable guide device according to the fourth aspect of the First Embodiment can automatically detect a transit station in accordance with the departure station and the destination station that were inputted by a user, and can conduct a guide in respect of the destination station or transit station.

FIFTH ASPECT OF THE FIRST EMBODIMENT

The portable guide device according to the fifth aspect of the First Embodiment pertains to the portable guide device of the First Embodiment or the first aspect of the First Embodiment and further comprises:

route storage means (KC6) for storing a route used by the transport facility from the departure location to the desired destination, an entraining station and detraining station of the transport facility boarded, and station identification information on the detraining station and transit stations;

the entraining station storage means (KC6A1) for storing information on the entraining station stored in the route storage means (KC6) as an entraining station of the transport facility; and the route information storage means (KC6A) for storing route information comprising station identification information in respect of the detraining station and transit stations.

EFFECTS OF THE FIFTH ASPECT OF THE FIRST EMBODIMENT

In the portable guide device comprising the constitutional elements according to the fifth aspect of the First Embodiment, the route storage means (KC6) stores a route used by the transport facility from the departure location to the desired destination, an entraining station and detraining station of the transport facility boarded, and station identification information on the detraining station and transit stations. The entraining station storage means (KC6A1) stores information in respect of the entraining station stored in the route storage means (KC6) as an entraining station of the transport facility. The route information storage means (KC6A) stores route information comprising station identification information in respect of the detraining station and transit stations.

Therefore, the portable guide device according to the fifth aspect of the First Embodiment automatically sets the entraining station of the transport facility stored in the route storage means (KC6) as the entraining station, and can conduct guidance regarding transit stations or the detraining station.

SECOND EMBODIMENT

The portable telephone according to the Second Embodiment comprises the portable guide device of any of the First Embodiment or the first to fifth aspects of the First Invention.

EFFECTS OF THE SECOND EMBODIMENT

Since the portable telephone comprising the constitutional elements according to the Second Embodiment basically consists of the portable guide device of any of the First Embodiment or the first to fifth aspects of the First Embodiment, transmission and reception of route information can be carried out by utilizing an existing portable telephone network. Therefore, station guidance can be conducted by utilizing existing systems (infrastructure) without the need for installing new devices in train carriages, stations and the like.

FIRST ASPECT OF THE SECOND EMBODIMENT

The portable telephone according to the first aspect of the Second Embodiment comprises the portable telephone of the Second Embodiment, and consists of a silent mode setting means (KC19), which, upon detection that the transport facility has begun to move, sets the portable telephone to a silent mode by which the user is made aware of an incoming call without activating the ring tone.

EFFECTS OF THE FIRST ASPECT OF THE SECOND EMBODIMENT

In the portable telephone comprising constitutional elements according to the first aspect of the Second Embodiment, the silent mode setting means (KC19) sets the telephone, upon detection that the transport facility has begun to move, to a silent mode whereby the user is informed of an incoming call without activating the ring tone in case of an incoming call to the telephone. Therefore, when a user boards a transport facility, the telephone is automatically set to silent mode so that the ring tone, which is distracting, is not activated.

EFFECTS OF THE EMBODIMENT

The above described present invention can conduct guidance in accordance with the actual running situation of a transport facility.

Further, the present invention can conduct station guidance by utilizing existing systems (infrastructure) without the need to install new devices in train carriages and stations and the like.

Further still, the present invention can conduct station guidance accurately even without receiving electromagnetic waves from a GPS or a base station.

BRIEF DESCRIPTION OF THE DRAWINGS

FIG. 4 is an explanatory diagram of a route search conditions image of Example 1.

FIG. 7 is a series of explanatory diagrams of the records of acceleration and velocity and the distance traveled by a particular train between stations of a transport facility, wherein FIG. 7A is an acceleration record diagram, FIG. 7B is a velocity record diagram, and FIG. 7C is a distance traveled record diagram.

FIG. 12 is a series of explanatory diagrams of the image shown during the route guide of Example 1, wherein FIG. 12A is an explanatory diagram of a route candidate list image, FIG. 12B is an explanatory diagram of a route guide image, and FIG. 12C is an explanatory diagram of a route confirmation site map image.

FIG. 15 is a series of explanatory diagrams of the station guide image of Example 1, wherein FIG. 15A is an explanatory diagram of an entraining station display image for announcing an entraining station; FIG. 15B is an explanatory diagram of an intermediate display image for announcing the next transit station; FIG. 15C is an explanatory diagram of an approach display image for announcing that a transit station has been approached; FIG. 15D is an explanatory diagram of an arrival display image for announcing that the train has arrived at the transit station; FIG. 15E is an explanatory diagram of an intermediate display image for announcing the next station where transfer to another train can be made; FIG. 15F is an explanatory diagram of an approach display image for announcing that the train is nearing or approaching the transfer station; FIG. 15G is an explanatory diagram of an arrival display image for announcing that the train has arrived at the transfer station; FIG. 15H is an explanatory diagram of an intermediate display image for announcing that the next station is the detraining station; FIG. 15I is an explanatory diagram of an approach display image for announcing that the train is nearing or approaching the detraining station; FIG. 15J is an explanatory diagram of an arrival display image for announcing that the train has arrived at the detraining station; and FIG. 15K is an explanatory diagram of an overshot display image for announcing that the train has already passed the detraining station and the user has overlooked or failed to notice it.

FIG. 21 is a flowchart of the station guide display process of the route guide program provided in the portable telephone of the route guide system of Example 2, and corresponds to FIG. 14 of Example 1.

FIG. 24 is an explanatory diagram of the station setting image of Example 3.

DESCRIPTION OF EMBODIMENTS

Specific examples (Examples) of the embodiments according to the present disclosure will be explained hereafter with reference to the drawings. However, the present disclosure is not limited to these Examples.

Example 1

Figure 1:
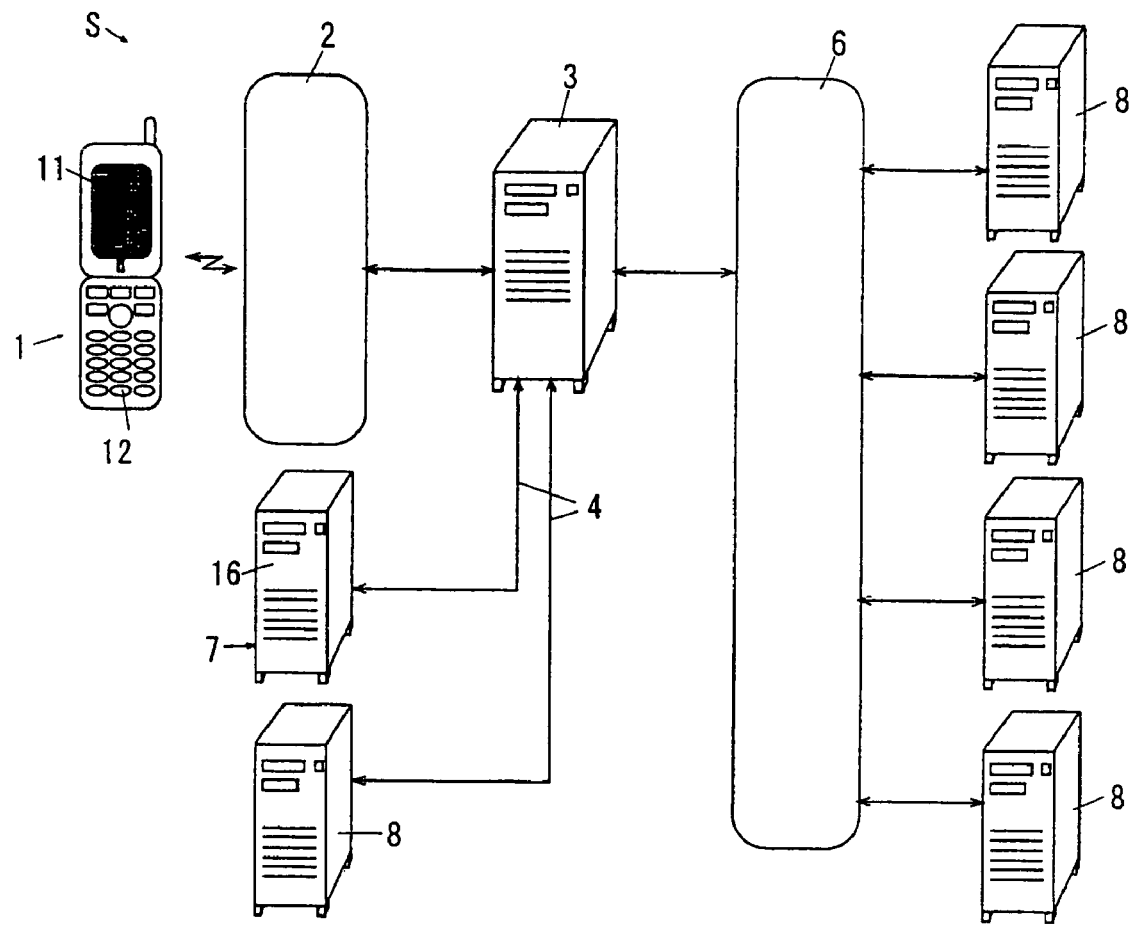
FIG. 1 is an explanatory diagram according to Example 1 of the route guide system of the present disclosure.

FIG. 1 is an explanatory diagram according to Example 1 of the route guide system of the present invention.

In FIG. 1, the route guide system S of Example 1 comprises a portable telephone 1 as a portable guide device which a user can carry on his person. The portable telephone 1 is connected to a data communications device 3 of a portable telephone operator via a portable telephone network 2. The data communications device 3 is connected, via a dedicated line 4 or the Internet 6, to a route guide data distribution server (also known as a route information providing server) 7 and an information distribution server 8 of some other information distributor (such as a content provider or application service provider). It will be noted that while the route guide data distribution server 7 of Example 1 is connected to the data communications device 3 via a dedicated line 4, it is also possible to connect it via the Internet 6.

The portable telephone 1 comprises an information display screen (which serves as the announcement unit) 11 on which a display image is displayed, an input key 12 which is utilized for inputting various commands and a storage device (storage medium) in which the programs or the like are stored. Further, the portable telephone 1 according to Example 1 has a built-in GPS device which is capable of locating the current position of a portable telephone on a three-dimensional basis. The portable telephone 1 also comprises a telephone function, a built-in loudspeaker for talking on the telephone or ring tone generation of an incoming call, and a built-in vibrator for making the portable telephone 1 vibrate.

In addition, the route guide data distribution server 7 comprises a server main section 16, a display (not shown), an input device (not shown) such as a keyboard or a mouse, a hard disk drive (a storage medium (not shown)), an optical drive (a storage medium reading device (not shown)) such as a CD drive and the like.

Explanation for the Controller of the Portable Telephone 1

Figure 2:
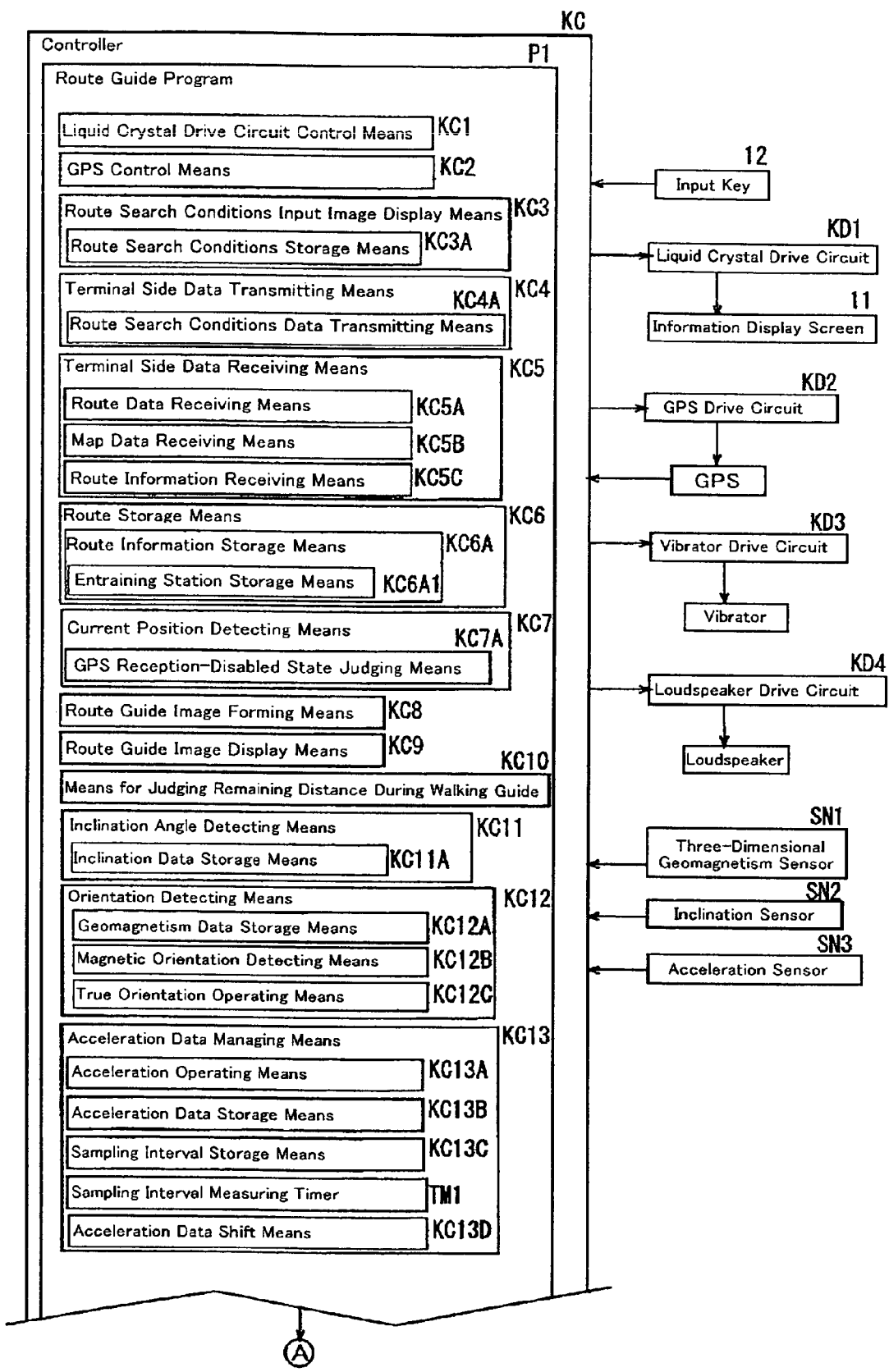
FIG. 2 is a diagram illustrating in the form of a block diagram (functional block diagram) the functions of the mobile terminal of the route guide system shown in FIG. 1.

FIG. 2 is a diagram illustrating in the form of a block diagram (functional block diagram) the functions of the mobile terminal of the route guide system shown in FIG. 1.

Figure 3:
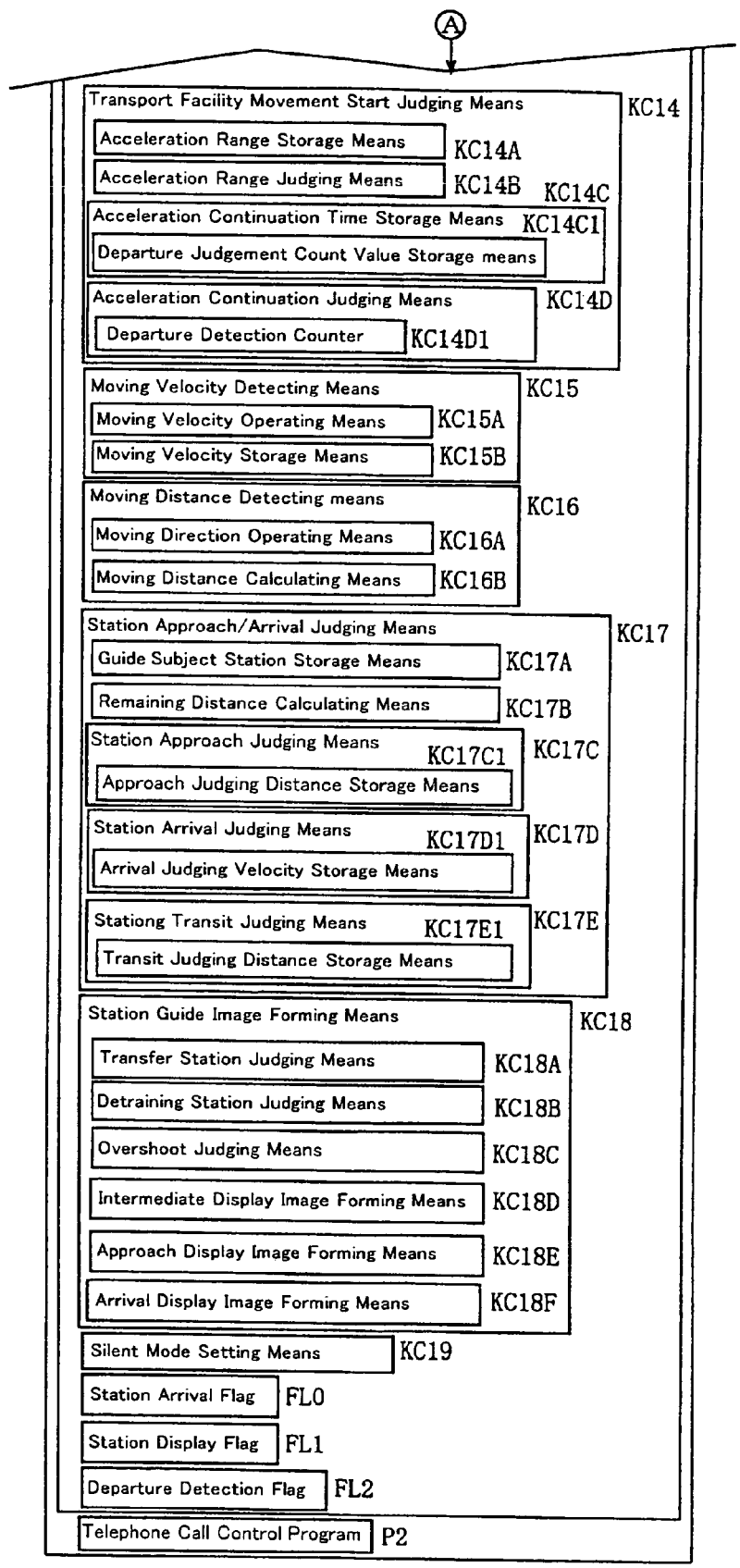
FIG. 3 is a block diagram of the mobile terminal of Example 1, and is a continuation of the diagram of FIG. 2.

FIG. 3 is a block diagram of the mobile terminal in Example 1, and is a continuation of the diagram of FIG. 2.

As shown in FIGS. 2 and 3, the controller KC of the portable telephone 1 is configured from a microcomputer comprising the following: an I/O (input-output interface) which inputs and outputs signals to the outside and regulates the input-output signal level; ROM (read only memory, storage medium) which contains recorded programs and data, etc. for performing the necessary processing; RAM (random access memory, storage medium) for temporarily storing necessary data; a CPU (central processing unit) which performs processing in accordance with the programs stored in the ROM and the like; and a clock generator and the like; whereby various functions can be realized by executing the programs stored in the ROM and the like.

Signal Input Elements Connected to the Controller KC of the Portable Telephone

Signals are inputted to the controller KC of the portable telephone 1 by means of the input key 12, the GPS device, a three-dimensional geomagnetic sensor (geomagnetic sensor) SN1, an inclination sensor SN2, an acceleration sensor SN3, and other signal input elements.

The input key 12 determines whether these signals were inputted by a user, and inputs the detected signals into the controller KC.

The GPS device locates the position of the portable telephone 1 on Earth from the time of arrival of the time signal electromagnetic waves emitted from a satellite in response to a locating start input signal, and inputs the located result into the controller KC.

The three-dimensional geomagnetic sensor SN1 detects the magnetic orientation. The three-dimensional geomagnetic sensor SN1 of Example 1 is a sensor which arranges high-sensitivity, high-precision geomagnetic sensors in three axial orientations (X, Y and Z axes) orthogonal to each other. Such geomagnetic sensor is conventional and publicly known (e.g. refer to JP-2002-090432-A, JP-8-278137-A or the like), and thus a detailed explanation thereof is omitted here.

The inclination sensor SN2 detects an inclination value with respect to the horizontal plane of the portable telephone 1. The inclination sensor SN2 of Example 1 is conventional and publicly known (e.g. refer to JP-8-278137-A or the like), and other kinds of inclination sensor may also be used, and thus a detailed explanation thereof is omitted here.

The acceleration sensor SN3 detects the acceleration of the portable telephone 1 when it is in motion. A conventional and publicly known acceleration sensor is also used as the acceleration sensor SN3 of Example 1 (e.g. refer to Japanese Patent No. 3359781 or the like) which can detect acceleration in three axial orientations (X, Y and Z axes) orthogonal to the each other and thus a detailed explanation thereof is omitted here. Further, the acceleration data Ax, Ay and Az outputted from the acceleration sensor SN3 of Example 1 are converted into 8-bit digital outputs, whereby digital data are outputted such that the acceleration of $-1$ G ($=-9.8$ m/s$^2$, i.e. acceleration due to gravity) is 0, the acceleration of 0 is 128 and the acceleration of $+1$ G is 255. In other words, the acceleration sensor SN3 of Example 1 adjusts or regulates the acceleration ranging from $-1$ G to $+1$ G into digital data within a range of 0 to 255, and outputs Ax, Ay and Az as acceleration data. The method for adjusting the outputted data can be modified as may be appropriate depending on the design.

Control Elements Connected to the Controller KC of the Portable Telephone

The controller KC of the portable telephone 1 is connected to a liquid crystal drive circuit KD1, a GPS drive circuit KD2, a vibrator drive circuit KD3, a loudspeaker drive circuit KD4, a power circuit (not shown) and other control elements, and outputs the operating control signals of these elements.

The liquid crystal drive circuit KD1 controls the on/off modes of the display electrodes of the liquid crystal display panel, whereby a display image is displayed on an information display screen (as announcement unit) 11.

The GPS drive circuit KD2 drives the GPS by outputting a locating start signal to the GPS device.

The vibrator drive circuit KD3 drives the vibrator (as announcement unit) which causes the portable telephone 1 to vibrate.

The loudspeaker drive circuit KD4 drives the loudspeaker (as announcement unit) when the user engages in conversation or during generation of ring tone.

Functions of the Controller KC of the Portable Telephone

The controller KC of the portable telephone 1 comprises a route guide program (navigation software) P1, a telephone call control program P2, and other such programs, executes processes in accordance with the output signals emanating from the respective signal output elements, and has a function (control means) for outputting control signals to the respective control elements. The functions (control means) of the route guide program P1 of the controller KC will be explained below. It will be noted, however, that the telephone call control program P2 is a conventional and publicly known program for controlling the telephone calls of the portable telephone 1, and since various well-known technologies may be employed, a detailed explanation thereof is omitted here.

KC1: Liquid Crystal Drive Circuit Control Means (Announcement Device Control Means)

In FIG. 2, the liquid crystal drive circuit control means KC1 controls the liquid crystal drive circuit KD1 for displaying an image on the information display screen 11.

KC2: GPS Control Means

The GPS control means KC2 controls driving of the GPS device via a GPS drive circuit KD2, whereby the current position of the portable telephone 1 is located by means of predetermined input signals or at predetermined time intervals by the GPS device.

FIG. 4 is an explanatory diagram of a route search conditions image of Example 1.

KC3: Route Search Conditions Input Image Display Means

Route search conditions input image display means KC3 comprises route search conditions storage means KC3A, and displays a route search conditions input image consisting of route search conditions including a departure location and a destination (refer to FIG. 4) on the information display screen 11. In FIG. 4, the route search conditions input image of Example 1 are shown, consisting of a departure input field for inputting a departure location, a destination input field for inputting a destination, a date and time input field for inputting the starting date and time or the arrival date and time of the route guide, a route search input field for inputting the number of routes to be searched, a transport facility input field for inputting the transport facility to be used during the route guide, and a search conditions transmit icon for executing transmission of the search conditions to the server 7. It will be noted that the route search conditions input image illustrated in FIG. 4 illustrates a scenario where the departure location has been set at a current position as fixed by GPS and the destination has been set to Tokyo Tower.

KC3A: Route Search Conditions Storage Means

The route search conditions storage means KC3A stores the route search conditions (for instance, departure location and destination, or starting date and time) set by being input into the route search conditions input image (refer to FIG. 4).

KC4: Terminal Side Data Transmitting Means

The terminal side data transmitting means KC4 comprises route search conditions data transmitting means KC4A, and transmits route search conditions data or the like to the route guide data distribution server 7.

KC4A: Route Search Conditions Data Transmitting Means

The route search conditions data transmitting means KC4A transmits route search conditions data stored in the route search conditions storage means KC3A to the server 7 when the search conditions transmit icon displayed on the route search conditions input image (refer to FIG. 4) has been selected.

KC5: Terminal Side Data Receiving Means

The terminal side data receiving means KC5 comprises route data receiving means KC5A, map data receiving means KC5B, and route information receiving means KC5C, and receives map data or the like transmitted from the route guide data distribution server 7.

KC5A: Route Data Receiving Means

The route data receiving means KC5A receives route data specifying a route of a particular transport facility from a departure location to a destination which the route guide data distribution server 7 has drawn up in accordance with the route search conditions transmitted from the portable telephone 1.

KC5B: Map Data Receiving Means

The map data receiving means KC5B receives and stores map data transmitted from the server. The map data receiving means KC5B of Example 1 receives data of a plurality of unit maps within a specific range transmitted from the server in accordance with the current position of the portable telephone 1. Since the relevant technology for dividing a map into unit maps, and transmitting or receiving the required unit map data is already publicly known (e.g., refer to JP-2003-214860-A or the like), a detailed explanation thereof is omitted here. Further, the map data receiving means KC5B of Example 1 receives and stores geomagnetic declination data transmitted from the server 7 along with the unit map data.

KC5C: Route Information Receiving Means

The route information receiving means KC5C receives route information transmitted from the route guide data distribution server 7. Contained in the route information received by the route information receiving means KC5C of Example 1 are station identification information (in Example 1 this pertains to the station name) for specifying the stations, entraining/detraining station identification information for specifying the entraining station, the transfer station(s) and the detraining station, and inter-station distance information for showing the distance between stations. For example, in the case of route information with respect to the Tokyo subway from Awajicho station to Kamiyacho station, route information is received along the lines of "Awajicho 0.9—Otemachi 0.6—Tokyo 1.1—Ginza 1.0—Kasumigaseki (transfer) 1.3—Kamiyacho (detrain)". The number coming after the station name refers to the inter-station distance in kilometers from one station to the next.

KC6: Route Storage Means

The route storage means KC6 comprises route information storage means KC6A, and stores route data received by the search result receiving means KC5A and route information received by the route information receiving means KC5C.

KC6A: Route Information Storage Means

The route information storage means KC6A comprises entraining station storage means KC6A1, and stores route information received by the route information receiving means KC5C.

KC6A1: Entraining Station Storage Means

The entraining station storage means KC6A1 stores station identification information regarding the initial station contained in the route information received by the route information receiving means KC5C as the entraining station.

KC7: Current Position Detection Means

The current position detection means KC7 detects the GPS reception-disabled state judging means KC7A and the current position of the portable telephone 1. The current position detection means KC7 of Example 1 detects the current position based on GPS in situations where electromagnetic waves from a GPS satellite can be received. In situations where electromagnetic waves from a GPS satellite cannot be received, and, where prior to losing reception the portable telephone 1 was located at a position close to a station, the current position detection means KC7 judges that the portable telephone 1 has entered the station.

KC7A: GPS Reception-Disabled State Judging Means

The GPS reception-disabled state judging means KC7A judges whether the electromagnetic waves from a GPS satellite can no longer be received. That is, the GPS reception-disabled state judging means KC7A judges whether the user carrying the portable guide device has moved into an underground shopping arcade, a tunnel or building. The GPS reception-disabled state judging means KC7A of Example 1 judges that electromagnetic waves from a GPS satellite can no longer be received when electromagnetic data from a GPS satellite outputted at predetermined intervals from the GPS device are not continuously received over a certain GPS reception-disabled state judging time tg (e.g., 10 seconds).

KC8: Route Guide Image Forming Means

The route guide image forming means KC8 forms a route candidate list image (refer to the below-described FIG. 12A) which displays a list of route candidates, a route guide image (refer to the below-described FIG. 12B) which is displayed while the route guide is being conducted, and a route confirmation map image (refer to the below-described FIG. 12C) which is displayed when the map of the route surroundings is being confirmed based on the current position detected by a GPS, the route data of the search results stored in the route storage means KC6, and the map data stored in the map data receiving means KC5B.

KC9: Route Guide Image Display Means

The route guide image display means KC9 displays on the information display screen 11 a route candidate list image or a route guide image formed by the route guide image forming means KC8.

KC10: Means for Judging Remaining Distance During Walking Guide

The means for judging remaining distance during walking guide KC10 judges whether the vicinity of the destination has been reached when a walking guide route is provided to the user who is not currently using a transport facility by calculating the remaining distance to the destination (remaining distance during walking guide). Thus, for example, when a walking guide is provided while the user is walking from a current position to an entraining station, the entraining station is marked as the first goal. When the user is being navigated while walking from a detraining station to a final destination, the final destination is the goal. The means for judging remaining distance during walking guide KC10 of Example 1 determines that the user has reached the vicinity of the final destination if the remaining distance thereto is within 30 m.

Figure 5:
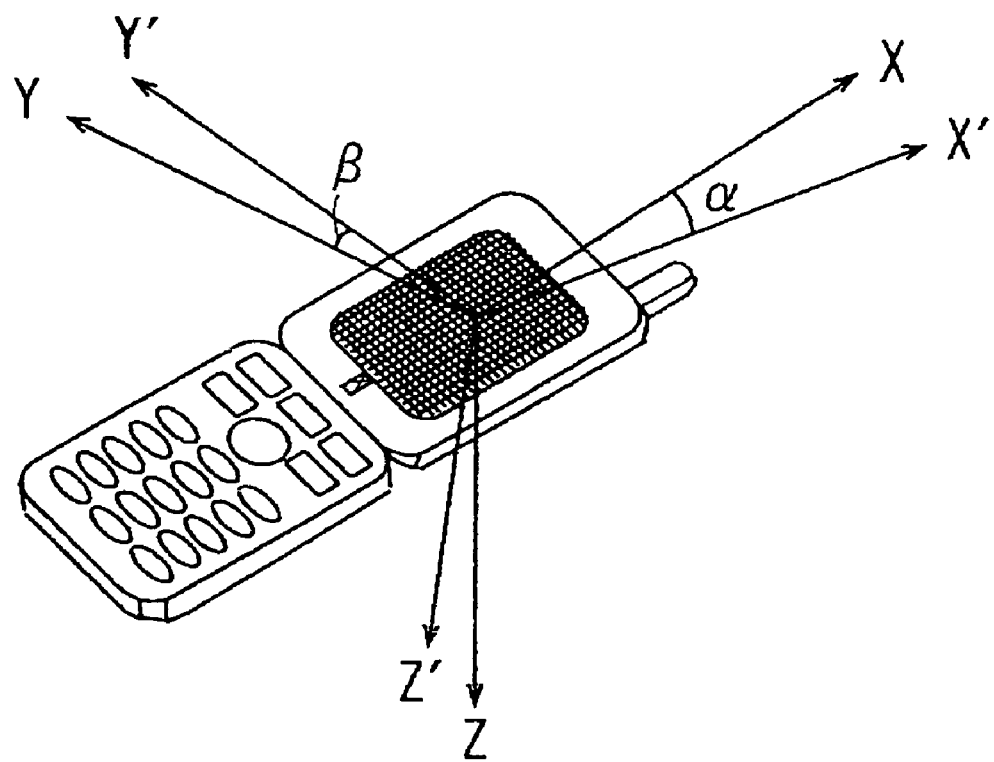
FIG. 5 is an explanatory diagram of the portable telephone viewed diagonally from a plane.

FIG. 5 is an explanatory diagram of the portable telephone viewed diagonally from a plane.

KC11: Inclination Angle Detection Means

The inclination angle detection means KC11 comprises an inclination data storage means KC11A, and based on the inclination data outputted from the inclination sensor SN2, calculates the inclination angle of the portable telephone 1. In FIG. 5, the inclination angle detection means KC11 of Example 1 calculates the inclination angles $\alpha$, $\beta$ between the X-axis and Y-axis among the X-axis, Y-axis and Z-axis of the observed coordinate system, pre-determined for observing acceleration and magnetic orientation by the acceleration sensor SN3 and the three-dimensional geomagnetic sensor SN1 of the portable telephone 1, and the X'-axis and Y'axis among the X'-axis, Y'-axis and Z'-axis of the coordinate system projected on a horizontal plane. It will be noted that the method for calculating the inclination angles $\alpha$, $\beta$ is publicly known (e.g., refer to JP-8-278137-A or the like), and thus a detailed explanation thereof is omitted here.

KC11A: Inclination Data Storage Means KC11A

The inclination data storage means KC11A stores inclination data outputted from the inclination sensor SN2 and the inclination angles $\alpha$, $\beta$ detected by the inclination angle detection means KC11.

KC12: Orientation Detection Means

The orientation detection means KC12 comprises geomagnetic data storage means KC12A, magnetic orientation operating means KC12B, and true orientation operating means KC12C, and detects orientation based on the geomagnetic data outputted from the three-dimensional geomagnetic sensor SN1.

KC12A: Geomagnetic Data Storage Means

The geomagnetic data storage means KC12A stores geomagnetic data outputted from the three-dimensional geomagnetic sensor SN1.

Figure 6:
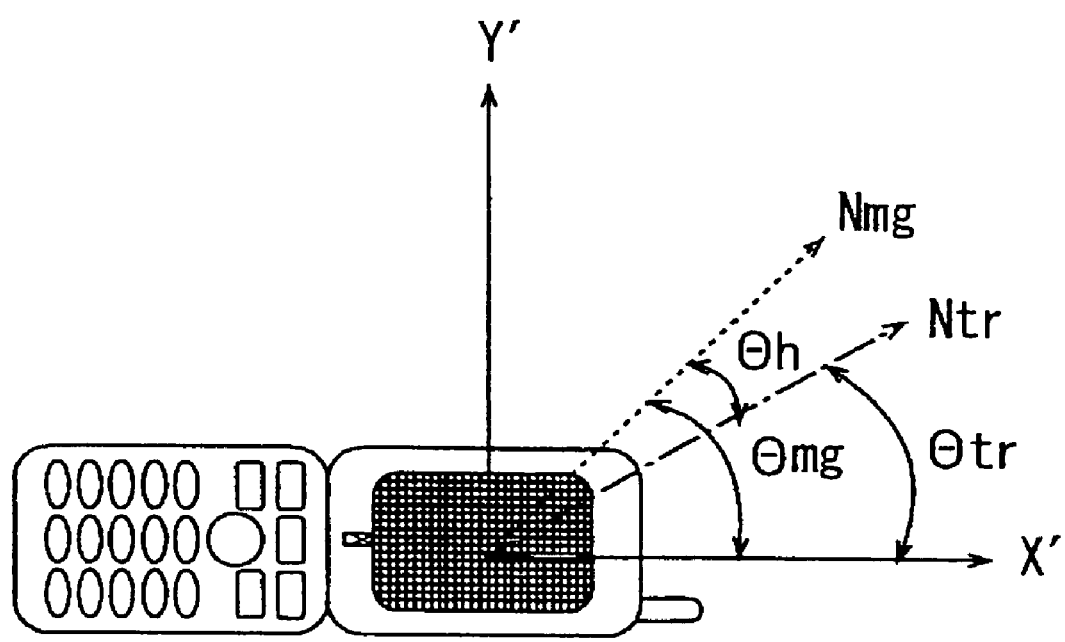
FIG. 6 is an explanatory diagram illustrating the relationship between a portable telephone and the magnetic orientation north and true orientation north.

FIG. 6 is an explanatory diagram illustrating the relationship between a portable telephone and the magnetic orientation north and true orientation north.

KC12B: Magnetic Orientation Operating Means (Magnetic Orientation Detection Means)

The magnetic orientation operating means KC12B, based on the geomagnetic data and the inclination angles $\alpha$, $\beta$, calculates the angle (magnetic orientation) $\Theta mg$ (refer to FIG. 6) on a horizontal plane between the magnetic orientation north (Nmg) and the X'-axis of the portable telephone 1. It will be noted that the method for calculating this magnetic orientation $\Theta mg$ is publicly known (e.g., refer to JP-8-278137-A or the like), and thus a detailed explanation thereof is omitted here.

KC12C: True Orientation Operating Means

The true orientation operating means KC12C, based on the magnetic orientation $\Theta mg$ and the angle (declination) $\Theta h$ formed between the true orientation and magnetic orientation which are stored in the map data receiving means KC5B, calculates the angle (true orientation) Θtr (refer to FIG. 6) between the true orientation north (Ntr) and the X'-axis of the portable telephone 1. In other words, without using the magnetic orientation Θmg itself, the portable telephone 1 of Example 1 uses the true orientation Θtr calculated based on the magnetic orientation Θmg.

KC13: Acceleration Data Managing Means

The acceleration data managing means KC13 comprises acceleration operating means KC13A, acceleration data storage means KC13B, sampling interval storage means KC13C, a sampling interval measuring timer TM1, and acceleration data shift means KC13D, and manages the reading, operating and storing and such other functions of the acceleration data Ax to Az outputted from the acceleration sensor SN3.

KC13A: Acceleration Operating Means

The acceleration operating means KC13A, based on the inclination angles α, β and the read acceleration data Ax, Ay, and Az outputted and read from the acceleration sensor SN3, calculates (or performs coordinate transformation) the acceleration data ax, ay and az on the horizontal plane coordinate system (X', Y' and Z' axes). The acceleration operating means KC13A of Example 1 calculates the operating results having a value ranging between 0 and 255 by rounding off below the decimal point. It will be noted that such coordinate transformation is publicly known (e.g., refer to Equation 3 of paragraph 0037 in JP-8-278137-A or the like), and thus a detailed explanation thereof is omitted here.

KC13B: Acceleration Data Storage Means

The acceleration data storage means KC13B stores the acceleration data ax to az which was calculated by the acceleration operating means KC13A. The acceleration data storage means KC13B of Example 1 stores per axis the calculated three-axial direction acceleration data ax, ay and az of the X'-axis, Y'-axis and Z'-axis. Further, the acceleration data storage means KC13B of Example 1 comprises, per axis, a storage region capable of storing a total of 1,500 records ranging from M0 to M1499, wherein the latest acceleration data is stored in M1499. The number of the storage regions can be changed as may be appropriate according to the design.

KC13C: Sampling Interval Storage Means

The sampling interval storage means KC13C stores the interval (sampling interval) t1 for acquiring the acceleration data. The sampling interval storage means KC13C of Example 1 stores the data 10 ms as the sampling interval t1.

TM1: Sampling Interval Measuring Timer

The sampling interval measuring timer TM1 pre-determines the sampling interval t1, and judges that time is up once the sampling interval t1 is exceeded.

KC13D: Acceleration Data Shift Means

The acceleration data shift means KC13D stores (or shifts) the acceleration data stored in M1 to M1499 to M0 to M1498 when storing new acceleration data.

KC14: Transport Facility Motion Start Judging Means

The transport facility motion start judging means KC14 comprises acceleration range storage means KC14A, acceleration range judging means KC14B, acceleration continuation time storage means KC14C, and acceleration continuation judging means KC14D. The transport facility motion start judging means KC14 determines that the transport facility which is accelerating at a predetermined acceleration has begun to move when the acceleration detected by the acceleration sensor (SN3) is within the motion start time acceleration range stored in the acceleration range storage means KC14A and the duration thereof is longer than the acceleration continuation time stored in the acceleration continuation time storage means KC14C.

KC14A: Acceleration Range Storage Means

The acceleration range storage means KC14A stores the motion start acceleration range of the transport facility which is accelerating at a predetermined acceleration at motion start. The acceleration range storage means KC14A of Example 1 stores 1 km/h/s as the lower limit (motion start judging acceleration range lower limit) ah1 of the motion start acceleration range, and stores 4 km/h/s as the upper limit (motion start judging acceleration range upper limit) ah2.

Figure 7:
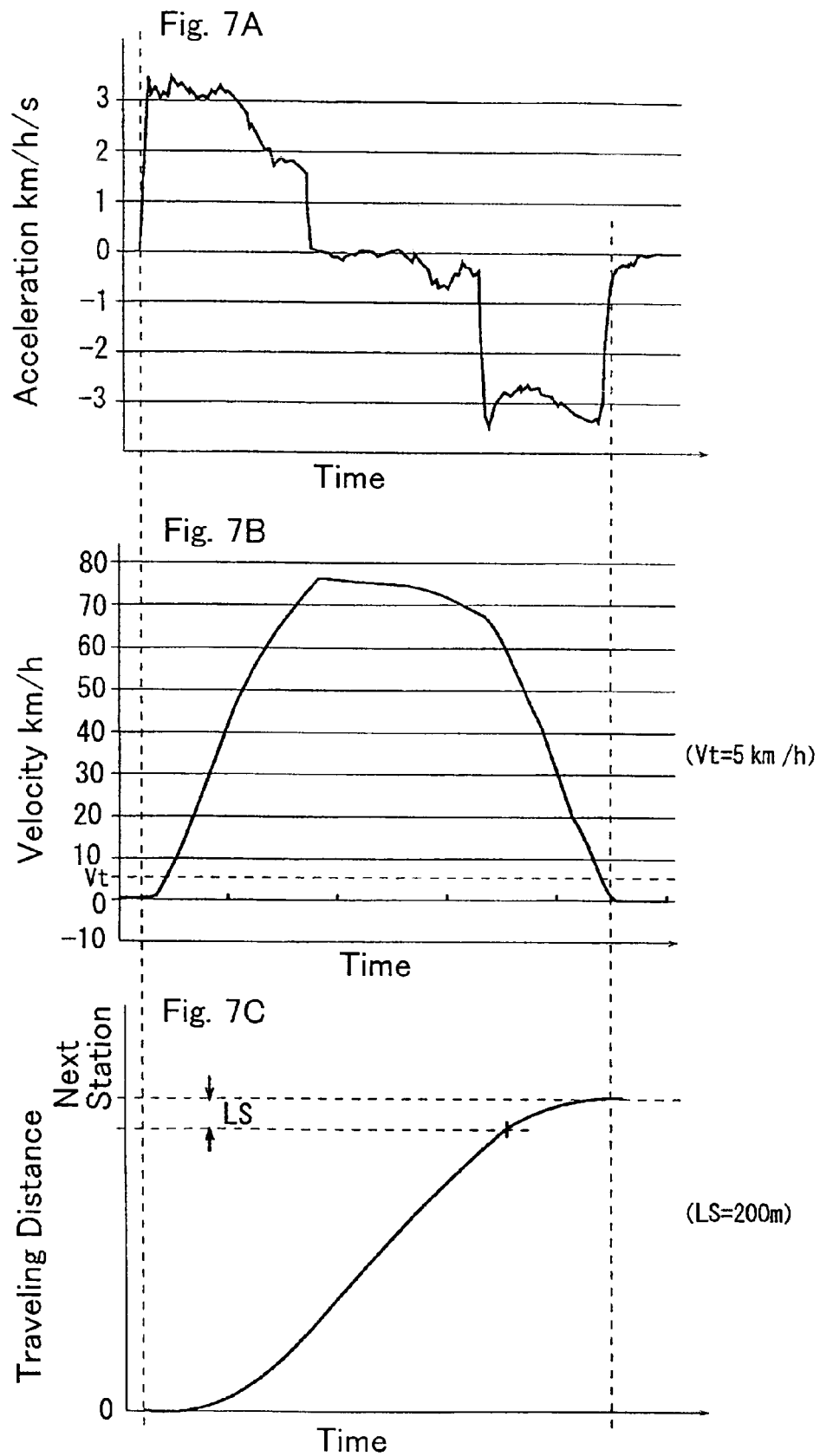

FIG. 7 is a series of explanatory diagrams of the records of acceleration and velocity of a train between stations of a transport facility and of the distance traveled by a particular train, wherein FIG. 7A is an acceleration record diagram, FIG. 7B is a velocity record diagram, and FIG. 7C is a distance traveled record diagram.

As illustrated in FIG. 7A, the train serving as the transport facility has the characteristic of accelerating at predetermined times at a certain speed that is close to the upper limits of an acceptable range whereby people on board and standing in the train do not fall over, yet on the whole accelerates as fast as possible. In the past, examples of train acceleration systems included manual step-up and automatic step-up systems which had resistors inserted in series onto the motor, and resistance would gradually change to smaller resistance values. However, in recent years smooth acceleration has been realized by using Pulse Width Modulation (PWM) control systems. Therefore, in conformity with this change, the acceleration range storage means KC14A of Example 1 stores normal train acceleration ranging from 1 km/h/s to 4 km/h/s as the motion start time acceleration range. This motion start time acceleration range can be modified depending on the transport facility to be used.

KC14B: Acceleration Range Judging Means

The acceleration range judging means KC14B determines whether the acceleration detected by the acceleration sensor SN3 is within the motion start time acceleration range. The acceleration range judging means KC14B of Example 1 determines whether the absolute value of acceleration (i.e., the magnitude of acceleration) calculated from the three-axial acceleration detected by the acceleration sensor SN3 is within the motion start time acceleration range. In other words, the most recent acceleration data ax to az of 0 to 255 stored in M1499 of the acceleration data storage means KC13B is subjected to inverse transformation to acceleration data A'x, A'y and A'z of $-9.8$ m/s$^2$ ($=-1$ G) to $+9.8$ m/s$^2$ ($=+1$ G). Then, a determination is made whether the acceleration magnitude $\{(A'x)^2+(A'y)^2+(A'z)^2\}^{1/2}$ is within the range of 1 km/h/s to 4 km/h/s. In addition, it is also possible to make a judgment based on the acceleration of a particular one-axis direction from among the three-axial directions. Further, it is also possible to determine whether acceleration is within the motion start time acceleration range if any one of the three-axial directions is within a predetermined acceleration range.

KC14C: Acceleration Continuation Time Storage Means

The acceleration continuation time storage means KC14C comprises departure judgment count value storage means KC14C1 for storing a departure judgment count value N1, and stores the acceleration continuation time for judging whether the transport facility has begun to move. The departure judgment count value storage means KC14C1 of acceleration continuation time storage means KC14C of Example 1 stores the figure 1,500 as the departure judgment count value N1, and the acceleration continuation time storage means KC14C stores the data 15 seconds as the acceleration continuation time data.

KC14D: Acceleration Continuation Judging Means

The acceleration continuation judging means KC14D comprises a departure detection counter KC14D1, and determines whether the period within which the acceleration detected by the acceleration sensor SN3 has continuously remained within the motion start time acceleration range is longer than the acceleration continuation time.

KC14D1: Departure Detection Counter

The departure detection counter KC14D1 counts the number of consecutive times the acceleration range judging means KC14B has determined that the most recent acceleration was within the motion start time acceleration range.

KC15: Moving Velocity Detection Means (Velocity Detection Storage Means)

The moving velocity detection means KC15 comprises moving velocity storage means KC15B and moving velocity operating means KC15A, and detects the moving velocities Vx, Vy and Vz of the portable telephone 1 based on the acceleration data ax, ay and az.

KC15B: Moving Velocity Storage Means

The moving velocity storage means KC15B stores the moving velocities Vx, Vy and Vz of the portable telephone 1.

KC15A: Moving Velocity Operating Means

The moving velocity operating means KC15A calculates the moving velocities Vx, Vy and Vz of the portable telephone 1 based on the most recent acceleration data ax, ay and az stored in M1499. Upon detection that the transport facility has begun to move, the moving velocity operating means KC15A of Example 1 calculates the moving velocities Vx to Vz by integrating the acceleration data stored in M0 to M1499, with 0 being the initial velocity. In other words, after all of the acceleration data ax to az stored in M0 to M1499 have been added up for each axis, the resulting values multiplied by the sampling interval t1 are calculated as moving velocities Vx to Vz, which are then stored in the moving velocity storage means KC15B. Thereafter, based on the moving velocities Vx to Vz stored in the moving velocity storage means KC15B and the most recent acceleration data stored in M1499, the most recent moving velocities Vx to Vz are calculated and updated. When calculating the moving velocities Vx to Vz, first, the acceleration data ax to az of from 0 to 255 are subjected to an inverse transformation to acceleration data A'x, A'y and A'z of from $-9.8$ m/s$^2$ ($=-1$ G) to $+9.8$ m/s$^2$ ($=+1$ G). Then, when updating the moving velocities, based on the moving velocities Vx, Vy and Vz stored in the moving velocity storage means KC15B, the acceleration data A'x, A'y and A'z, and the sampling interval t1, the most recent moving velocities Vx, Vy and Vz are calculated based on the following formula (1), and updated.

$$V(x,y,z)=V(x,y,z)+A'(x,y,z) \times t1 \qquad (1)$$

KC16: Distance Traveled Detection Means (Traveling Direction Detection Means)

The distance traveled detection means KC16 comprises traveling direction operating means KC16A and distance traveled calculating means KC16B, and detects the traveling direction Θv and distance traveled L of the portable telephone 1.

Figure 8:
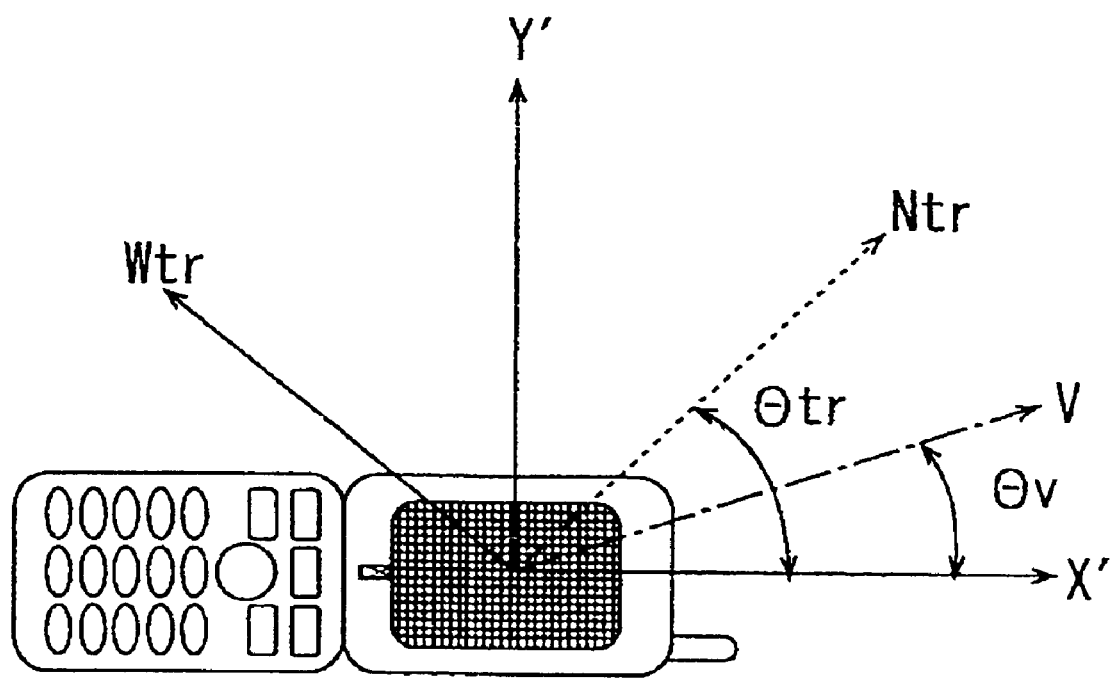
FIG. 8 is an explanatory diagram of the traveling direction of a portable telephone.

FIG. 8 is an explanatory diagram of the traveling direction of a portable telephone.

KC16A: Traveling Direction Operating Means (Traveling Direction Detection Means)

The traveling direction operating means KC16A calculates the traveling direction on the horizontal plane based on the moving velocities Vx to Vz. In FIG. 8, the traveling direction operating means KC16A of Example 1 calculates the angle Θv formed between the X'-axis and the traveling direction on a horizontal plane from the moving velocity Vx of the X'-axis direction on the horizontal plane and the moving velocity Vy of the Y'-axis direction.

KC16B: Distance Traveled Calculating Means

Upon detection that the transport facility has begun to move, the distance traveled calculating means KC16B calculates the distance traveled L of the transport facility (refer to FIG. 7C) based on the acceleration ax to az detected by the acceleration sensor SN3. The distance traveled calculating means KC16B of Example 1, when motion start has been detected, calculates the distance traveled L ($=\{(Lx)^2+(Ly)^2+(Lz)^2\}^{1/2}$) from the traveled distances Lx, Ly and Lz of each axial direction calculated by twice integrating the acceleration data stored in M0 to M1499. In other words, after all of the acceleration data ax to az stored in M0 to M1499 has been added up for each axis, the resulting values multiplied by the square of sampling interval t1 and those multiplied by ½ are calculated as traveled distances Lx to Lz. Thereafter, based on the most recent acceleration data and the sampling interval t1, the most recent traveled distances Lx to Lz are calculated and updated.

KC17: Station Approach/Arrival Judging Means

The station approach/arrival judging means KC17 comprises target guide station storage means KC17A, remaining distance calculating means KC17B, station approach judging means KC17C, station arrival judging means KC17D, and transit station judging means KC17E. The station approach/arrival judging means KC17 determines whether the transport facility is approaching or has arrived at, or passed through the target guide station.

KC17A: Target Guide Station Storage Means

The target guide station storage means KC17A stores information on the station on the route at which the train will arrive next and the station (target guide station) for which a guide will be conducted based on the route information stored in the route information storage means KC6A.

KC17B: Remaining Distance Calculating Means

The remaining distance calculating means KC17B calculates the remaining distance Ln to the target guide station based on inter-station distance to the target guide station and the traveled distance L.

KC17C: Station Approach Judging Means

The station approach judging means KC17C comprises approach judging distance storage means KC17C1 which stores the approach judging distance Ls (refer to FIG. 7C) to determine whether the transport facility has approached the target guide station, and judges whether the transport facility has approached the target guide station based on the remaining distance Ln and the approach judging distance Ls. The approach judging distance storage means KC17C1 of Example 1 stores the data 200 m as the approach judging distance Ls. Therefore, when the remaining distance Ln to the next station (target guide station) falls below 200 m, the approach judging distance storage means KC17C1 determines that the train is approaching the destination.

KC17D: Station Arrival Judging Means

The station arrival judging means KC17D comprises arrival judging velocity storage means KC17D1 which stores an arrival judging velocity Vt (refer to FIG. 7B) for judging whether the transport facility has arrived at the target guide station, and makes such determination based on the moving velocities Vx to Vz and the arrival judging velocity Vt. The arrival judging velocity storage means KC17D1 of Example 1 stores the data 5 km/h as the arrival judging velocity Vt. Therefore, when the absolute value $V\ (=\{(Vx)^2+(Vy)^2+(Vz)^2\}^{1/2})$ of the moving velocity is smaller than the arrival judging velocity Vt, the arrival judging velocity storage means KC17D1 determines that the train has arrived at the station.

KC17E: Transit Station Judging Means

The transit station judging means KC17E comprises transit judging distance storage means KC17E1 which stores a transit judging distance Lt for determining whether the transport facility has passed through the target guide station, and makes such determination based on the remaining distance Ln and the transit judging distance Lt. The transit judging distance storage means KC17E1 of Example 1 stores the data −200 m as the transit judging distance Lt. Therefore, when the traveled distance L is greater than the inter-station distance, and the remaining distance Ln is more negative than −200 m, the transit judging distance storage means KC17E1 determines that the transport facility boarded by the user has passed through the target guide station.

KC18: Station Guide Image Forming Means

The station guide image forming means KC18 comprises transfer station judging means KC18A, detraining station judging means KC18B, overshoot judging means KC18C, intermediate display image forming means KC18D, approach display image forming means KC18E, and arrival display image forming means KC18F. The station guide image forming means KC18 forms a station guide image to inform the user that he/she is approaching or has arrived at the target guide station (which may be a transfer station or the detraining station).

KC18A: Entraining Station Judging Means

The entraining station judging means KC18A judges whether a target guide station is a transfer station based on entraining/detraining station identification information which specifies the entraining station, the transfer station(s) and the detraining station.

KC18B: Detraining Station Judging Means

The detraining station judging means KC18B judges whether a target guide station is a detraining station based on the entraining/detraining station identification information.

KC18C: Overshoot Judging Means

The overshoot judging means KC18C determines whether a user has overshot his/her detraining station when a target guide station is the detraining station and the remaining distance Ln to the detraining station is smaller than the transit judging distance Lt, thereby judging that the transport facility has passed the detraining station, or when the train did not stop at the detraining station.

KC18D: Intermediate Display Image Forming Means

The intermediate display image forming means KC18D forms an intermediate display image for informing the user the next station on the route when the transport facility being ridden by the user has not approached the target guide station. The intermediate display image forming means KC18D of Example 1 forms an intermediate display image for announcing such information when the target guide station is a transfer station or a detraining station.

KC18E: Approach Display Image Forming Means

The approach display image forming means KC18E forms an approach display image to inform the user that the target guide station is being approached when the transport facility being ridden by the user approaches a target guide station. The approach display image forming means KC18E of Example 1 forms an approach display image for announcing such information when the target guide station is a transfer station or a detraining station.

KC18F: Arrival Display Image Forming Means

The arrival display image forming means KC18F forms an arrival display image to inform the user that the transport facility has arrived at the target guide station. The arrival display image forming means KC18F of Example 1 forms an arrival display image to inform the user whether the target guide station is a transfer station or a detraining station.

KC19: Silent Mode Setting Means

Upon detection that the transport facility has begun to move, the silent mode setting means KC19 automatically sets the portable telephone 1 to silent mode, by which the user is informed of an incoming call being made to it without activating the ring tone.

FL0: Station Arrival Flag

The station arrival flag FL0 has an initial value of "0". During route guidance (navigation) while walking, in case the means for judging remaining distance during walking guide KC10 has adjudged that the transport facility is within the vicinity of the station serving as the destination, the value of the station arrival flag FL0 becomes "1", and is "0" in all other cases.

FL1: Station Display Flag

The station display flag FL1 has an initial value of "0". If the transport facility has arrived at an entraining station and the station guide display operation has started, the value of the station display flag FL1 becomes "1", and when a detraining station is reached and the detection of current position by GPS has begun, such value becomes "0".

FL2: Departure Detection Flag

The departure detection flag FL2 has an initial value of "0". Upon detection that the transport facility has began to depart from the station, the value of the departure detection flag FL2 becomes "1", and if the train has arrived at the target guide station, such value becomes "0".

Explanation of the Controller of the Route Guide Data Distribution Server 7

Figure 9:
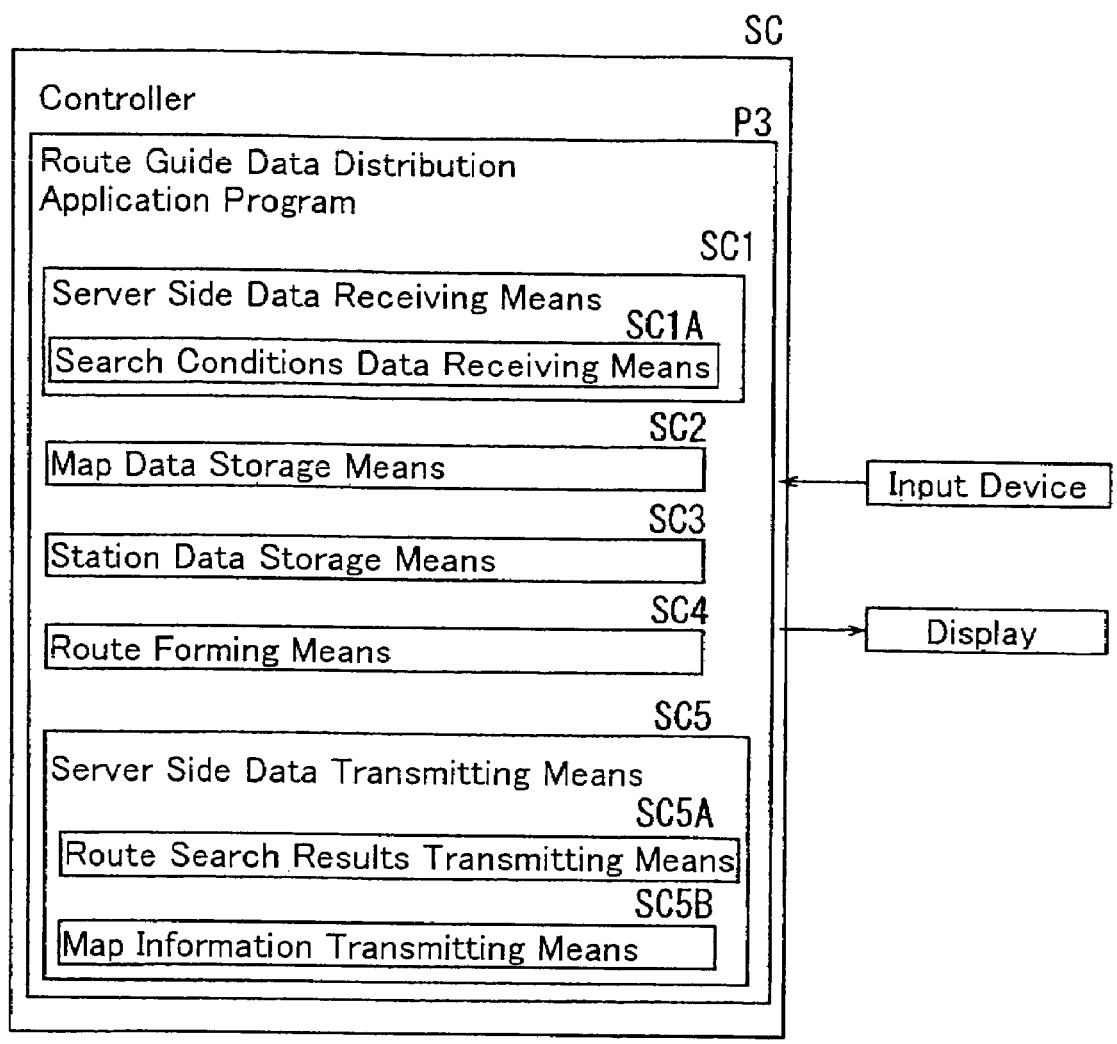
FIG. 9 is a diagram illustrated in the form of a block diagram (functional block diagram) of the functions of the server of the route guide system of Example 1.

FIG. 9 is a diagram illustrated in the form of a block diagram (functional block diagram) of the functions of the server of the route guide system of Example 1.

In FIG. 9, the controller SC of the route guide data distribution server 7 is configured from a microcomputer which comprises an I/O (input-output interface) which inputs and outputs the signals to the outside and regulates the input-output signal level; ROM (storage medium such as read only memory, hard disk) which contains recorded programs and data etc. for performing the necessary processing; RAM (random access memory, storage medium) for temporarily storing necessary data; a CPU (central processing unit) which performs processing in accordance with the programs stored in the ROM and the like; and a clock generator and the like; whereby various functions can be realized by executing the programs stored in the ROM and the like.

Signal Input Elements Connected to the Controller SC of the Server

Signals are inputted to the controller SC of the route guide data distribution server 7 by means of an input device, such as a keyboard, a mouse or the like, and such other signal input elements.

The input device detects whether such signals were inputted by a user, and inputs these detected signals to the controller SC.

Control Elements Connected to the Controller SC of the Server

The controller SC of the route guide data distribution server 7 is connected to a display, a power circuit (not shown), and other control elements, and outputs the operating control signals of these elements.

A display image corresponding to an operation made by a user is displayed on the display.

Functions of the Controller SC of the Server

The controller SC of the route guide data distribution server 7 has a route guide data distribution application program P3 which processes all the data transmitted from navigation software (i.e., route guide program P1) of the portable telephone 1, and such other programs, executes processes in accordance with the output signals coming from the respective signal output elements, and has a function (control means) for outputting control signals to the respective control elements. The functions of the route guide data distribution application program P3 of the controller SC (control means) will be explained hereafter.

SC1: Server Side Data Receiving Means

The server side data receiving means SC1 comprises search conditions data receiving means SC1A, and receives data and the like pertaining to route search conditions transmitted from the portable telephone 1.

SC1A: Search Conditions Data Receiving Means

The search conditions data receiving means SC1A receives and stores the data pertaining to route search conditions transmitted from the portable telephone 1.

SC2: Map Data Storage Means

The map data storage means SC2 stores map data. The map data storage means SC2 of Example 1 is configured from map data which are divided into unit maps of a specific range based on latitude and longitude. Further, each unit map data contains recorded data on the associated angle (declination) $\Theta h$ formed between the magnetic orientation north and the true orientation north. Vector map data are used as the map data of Example 1.

SC3: Station Data Storage Means (Route Information Storage Means)

The station data storage means SC3 stores station data (route information) relating to stations, such as the route, the names of stations forming part of the route (station identification information), inter-station distance pertaining to the distance between stations and information regarding the position of stations.

SC4: Route Forming Means

The route forming means SC4 decides on a route from the time the transport facility leaves the departure location until it arrives at the desired destination in accordance with the received route search conditions, and forms data (i.e., route data) corresponding to the optimum route comprising departure location position data which shows the position of the departure location, and destination position data which shows the position of the destination. If the transport facility to be used is specified in the route search conditions, the optimum route formed will include the transport facility. In cases where a plurality of routes to be searched has been specified, such number of routes is formed as may have been specified. When a transport facility is used, station identification information and entraining/detraining station identification information concerning the transport facility entraining station, transfer station(s) (if there are any transfers to be made) and detraining station, and route information comprising station identification information for all transit stations on the route being used, are formed along with the route data. It will be noted that the technology for producing the optimum route data is publicly known, (e.g., refer to JP-2003-214860-A or the like), and thus a detailed explanation thereof is omitted here.

SC5: Server Side Data Transmitting Means

The server side data transmitting means SC5 comprises route search result transmitting means SC5A and map information transmitting means SC5B, and transmits the searched route data, map data and the like to the portable telephone 1 from the route guide data distribution server 7.

SC5A: Route Search Results Transmitting Means

The route search result transmitting means SC5A transmits the route data formed by the route forming means SC4 to the portable telephone 1. Further, when the user has boarded a transport facility, the route search result transmitting means SC5A transmits data of the route search results containing route data and route information.

SC5B: Map Information Transmitting Means

The map information transmitting means SC5B transmits map data to the portable telephone 1 in accordance with the current position of the portable telephone 1.

Flowchart Explanations

Explanation for the Flowchart of the Route Guide Data Distribution Server 7

Figure 10:
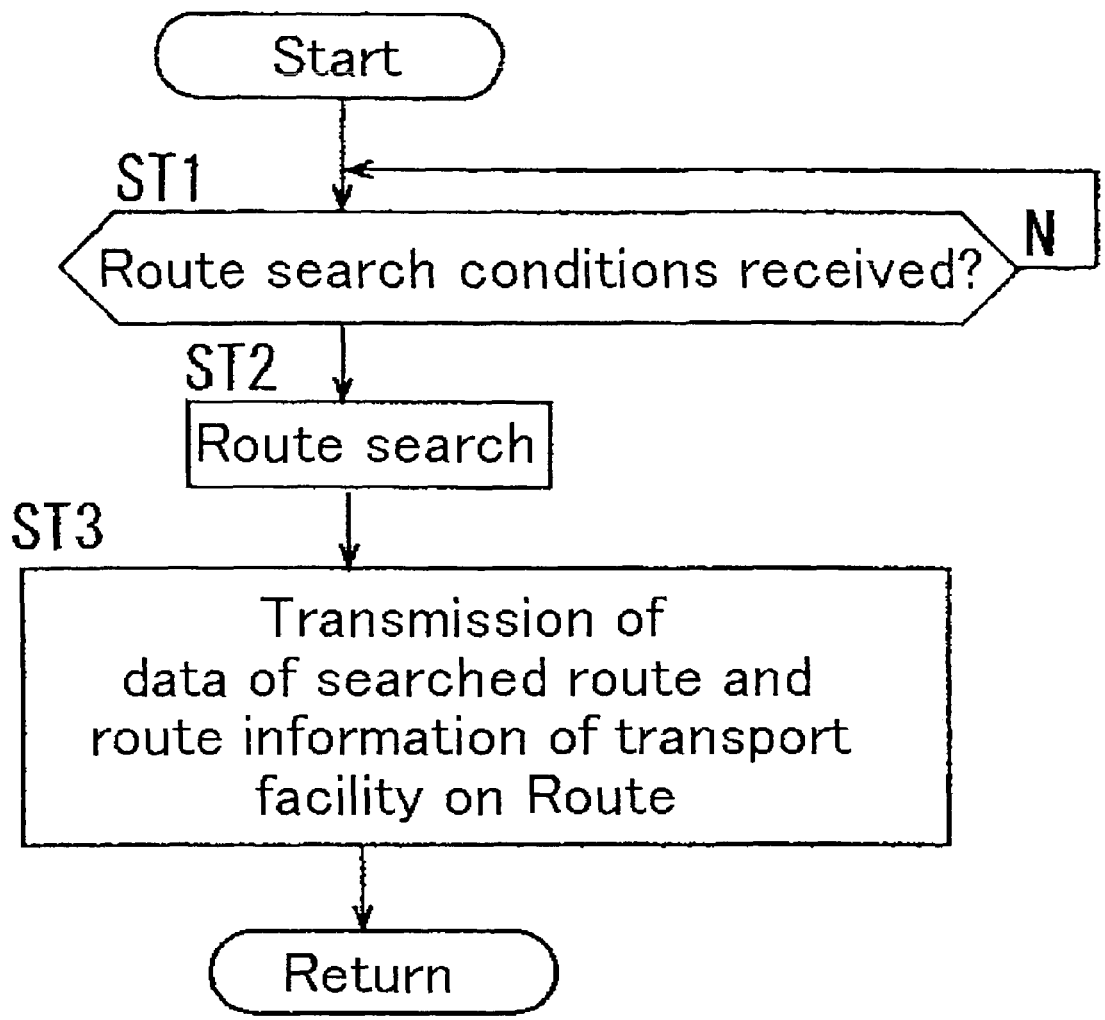
FIG. 10 is the main flowchart of the guide route forming process of a route guide data distribution application program which is provided in the route guide data distribution server of the route guide system of Example 1.

FIG. 10 is the main flowchart of the guide route forming process of a route guide data distribution application program which is provided in the route guide data distribution server of the route guide system of Example 1.

The process for each step ("ST") in the flowchart of FIG. 10 is conducted in accordance with the route guide data distribution application program P3 of the controller SC of the server 7. In addition, these processes are executed in parallel with other various processes of the server 7.

The guide route forming process of FIG. 10 starts when the power source of the server 7 is switched on.

In ST1 of FIG. 10, a determination is made whether the route search conditions transmitted from the portable telephone 1 have been received or not. If "no" (N), ST1 is repeated, and if "yes" (Y), the operation moves on to ST2.

In ST2, route search and formation are carried out by the route forming means SC4. The operation then moves on to ST3.

In ST3, the formed route data and the route information of the transport facility on the route are transmitted to the portable telephone 1. The operation then returns to ST1.

Explanation for the Flowchart of the Portable Telephone 1

Figure 11:
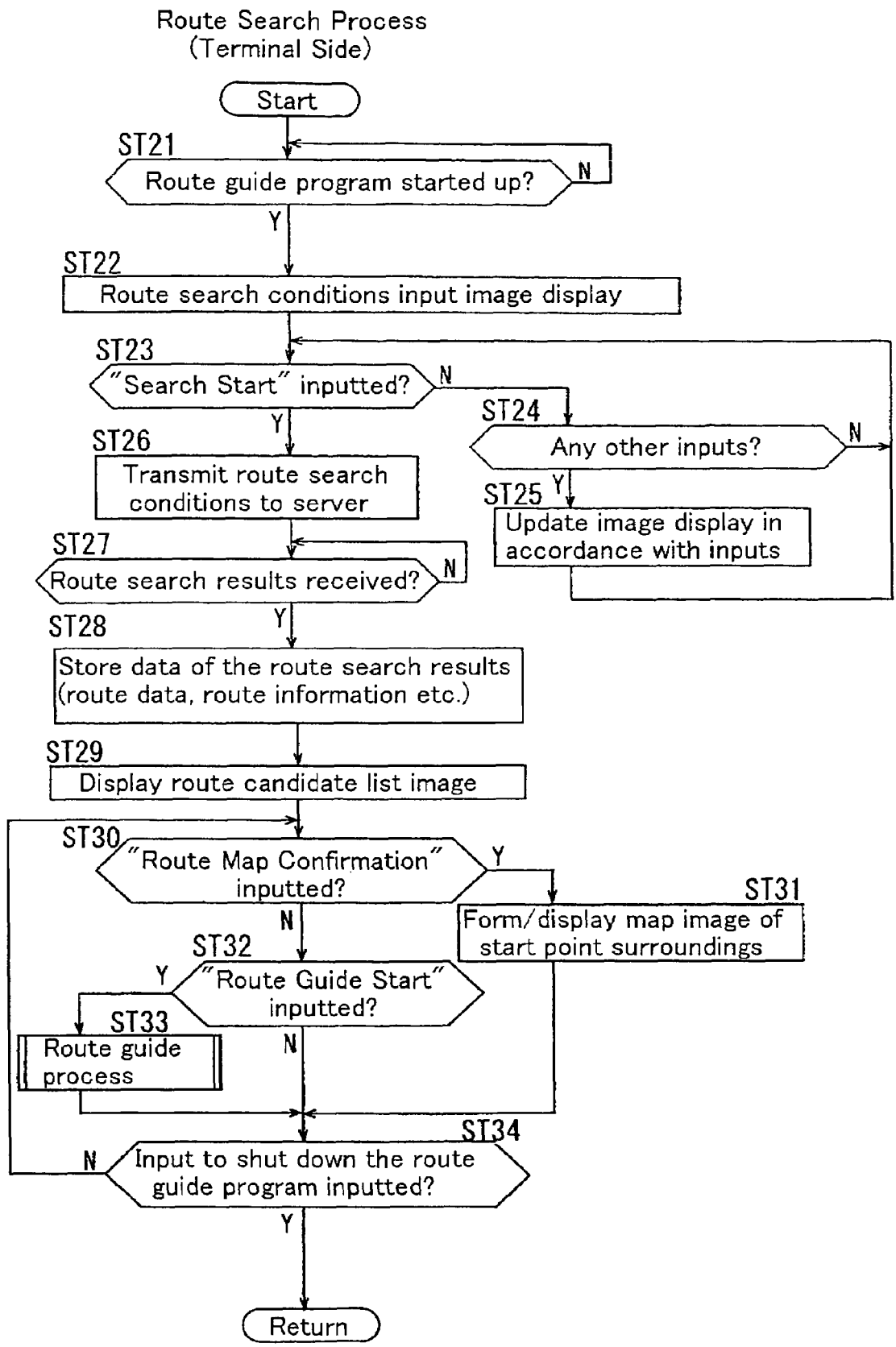
FIG. 11 is the main flowchart of the route search process of the route guide program provided in the portable telephone of the route guide system of Example 1.

FIG. 11 is the main flowchart of the route search process of the route guide program provided in the portable telephone of the route guide system of Example 1.

The process for each step ("ST") in the flowchart of FIG. 11 is conducted in accordance with the route guide program P1 of the controller KC of the portable telephone 1. In addition these processes are executed in parallel with other various processes of the portable telephone 1.

The flowchart illustrated in FIG. 11 starts when the power source of the portable telephone 1 is switched on.

In ST21 of FIG. 11, a determination is made whether the route guide program P1 has been executed or not. If "no" (N), ST21 is repeated, and if "yes" (Y), the operation moves on to ST22.

In ST22, a route search conditions input image (refer to FIG. 4) is displayed on an information display screen 11. The operation then moves on to ST23.

In ST23, a determination is made whether the "search start" icon (search conditions transmit icon) has been inputted or not. If "no" (N), the operation moves on to ST24, and if "yes" (Y), the operation moves on to ST26.

In ST24, a determination is made whether the other inputs (inputs into the departure location input field, destination input field, date and time input field etc.) have been made or not. If "yes" (Y), the operation moves on to ST25, and if "no" (N), the operation returns to ST23.

In ST25, the image display of the route search conditions input image (refer to FIG. 4) is updated in accordance with the inputs made. The operation then moves on to ST23.

In ST26, data of the route search conditions are transmitted to the route guide data distribution server 7. The operation then moves on to ST27.

In ST27, a determination is made whether a route search result has been transmitted corresponding to the route search conditions or not. If "no" (N), ST27 is repeated, and if "yes" (Y), the operation moves on to ST28.

In ST28, data of the received route search results (route data, route information, map data and the like) are stored. The operation then moves on to ST29.

FIG. 12 is a series of explanatory diagrams of the image shown during the route guide of Example 1, wherein FIG. 12A is an explanatory diagram of a route candidate list image, FIG. 12B is an explanatory diagram of a route guide image, and FIG. 12C is an explanatory diagram of a route confirmation map image.

In ST29, the route candidate list image (refer to FIG. 12A) formed based on the received data of the route search results is displayed on the information display screen 11, and then the operation moves on to ST30. In FIG. 12A, as a specific example, a route candidate list image 21 pertaining to a route search conducted from the Awajicho vicinity to Tokyo Tower is displayed. The route candidate list image 21 comprises a "route guide start" icon 21a by which a route guide commences with a walking route, a "route map confirmation" icon 21b for displaying a map for confirming the departure location surroundings in case a walking route guide is to be conducted, and a transport facility display image 21c which displays the transport facility to be used.

In ST30, a determination is made whether, in the route candidate list image 21, the "route map confirmation" icon 21b has been inputted or not. If "yes" (Y), the operation moves on to ST31, and if "no" (N), the operation moves on to ST32.

In ST31, based on the map data, a route confirmation map image 22 (refer to FIG. 12C) of the departure location surroundings is formed and displayed on the information display screen 11. The operation then moves on to ST34.

In ST32, a determination is made whether, in the route candidate list image 21, the "route guide start" icon 21a has been inputted or not. If "yes" (Y), the operation moves on to ST33, and if "no" (N), the operation moves on to ST34.

In ST33, based on a current position fixed by a GPS device and map data, a route guide process (refer to the subroutine of FIG. 13 described below) is executed which guides (navigates) a user to his/her destination by walking or using a transport facility. The operation then moves on to ST34.

In ST34, a determination is made whether an input for shutting down the route guide program has been entered or not. If "no" (N), the operation returns to ST30, and if "yes" (Y), the operation returns to ST21.

Explanation for the Flowchart of the Route Guide Process (Subroutine of ST33)

Figure 13:
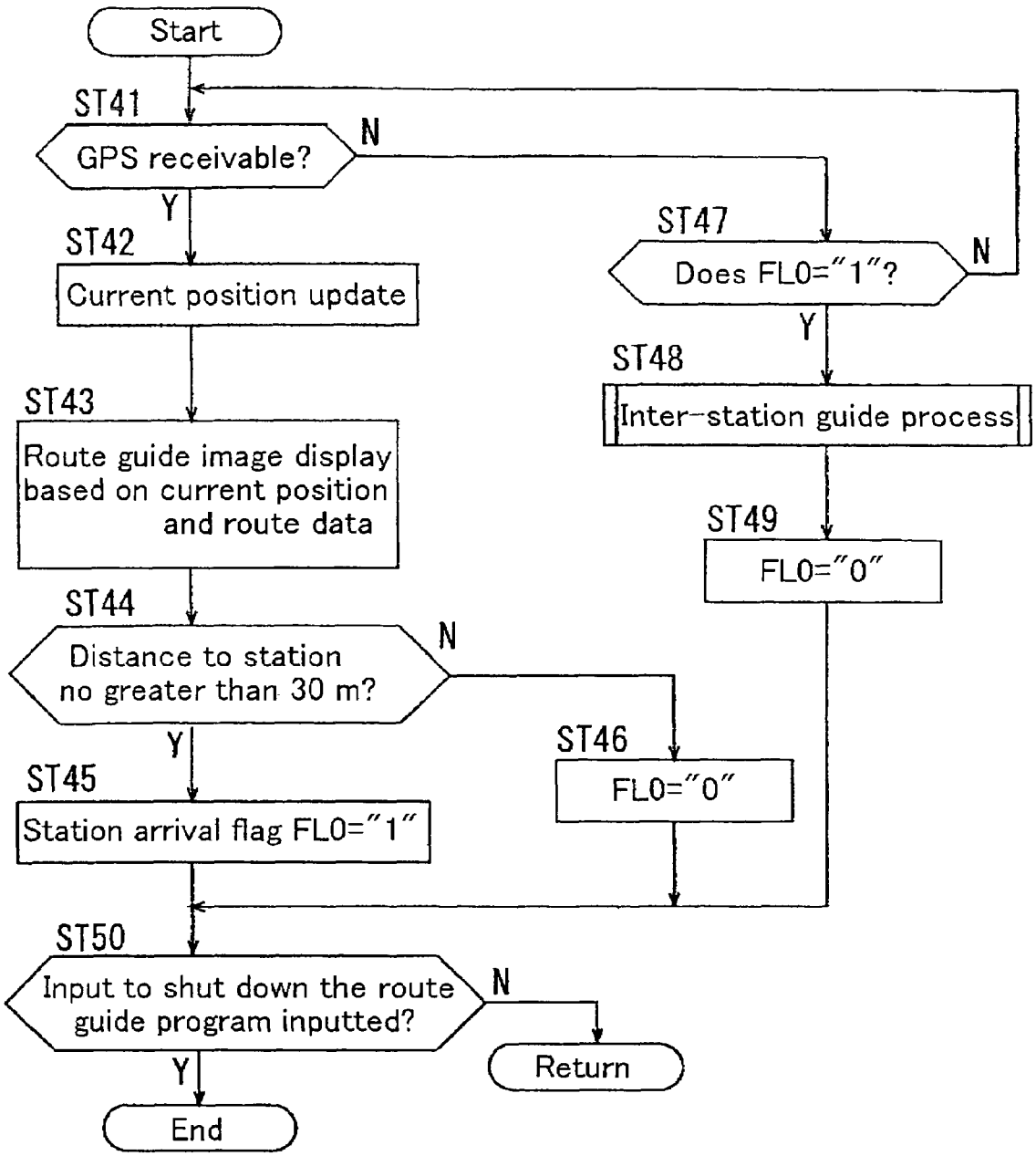
FIG. 13 is an explanatory diagram of a flowchart of the route guide process of Example 1, and is also an explanatory diagram of the subroutine of ST33 of FIG. 11.

FIG. 13 is an explanatory diagram of a flowchart of the route guide process of Example 1, and is also is an explanatory diagram of the subroutine of ST33 of FIG. 11.

In ST41 of FIG. 13, a determination is made whether the GPS device is capable of receiving electromagnetic waves from a GPS satellite or not. If "yes" (Y), the operation moves on to ST42, and if "no" (N), the operation moves on to ST47.

In ST42, the current position is updated to the position fixed by the GPS device. The operation then moves on to ST43.

In ST43, a route guide image 23 (refer to FIG. 12B) formed based on the updated current position and the route data of the walking route guide is displayed on the information display screen 11, and the operation moves on to ST44. In FIG. 12B the route guide image 23 comprises a map image 23a showing the user's current position at the center, a route image 23b which shows the route guide, and a human-like icon image 23c which represents the user's current position.

In ST44, if the desired destination is an entraining station, a determination is made whether the distance between the user's current position and the desired destination (i.e., remaining distance during walking guide) is less than 30 m or not. If "yes" (Y), the operation moves on to ST45, and if "no" (N), the operation moves on to ST46.

In ST45, the station arrival flag FL0 is set to "1". The operation then moves on to ST50.

In ST46, the station arrival flag FL0 is set to "0". The operation then moves on to ST50.

In ST47, a determination is made whether the station arrival flag FL0 is equal to 1 or not. If "yes" (Y), the operation moves on to ST48, and if "no" (N), the operation returns to ST41.

In ST48, an inter-station guide process which guides a user from an entraining station to a detraining station is executed, and the operation moves on to ST49. In the inter-station guide process of Example 4, a station guide display process (refer to the subroutine of FIG. 14 described below) and a transport facility departure detection process (refer to the subroutine of FIG. 16 described below) are executed in parallel.

In ST49, the station arrival flag FL0 is set to "0". The operation then moves on to ST50.

In ST50, the route guide is shut down, and a determination is made whether an input has been entered to re-display the route candidate list image 21 or not. If "no" (N), the operation returns to ST41, and if "yes" (Y), the process of FIG. 13 is shut down, and the operation returns to the route search process of FIG. 11.

Explanation for the Flowchart of the Station Guide Display Process

Figure 14:
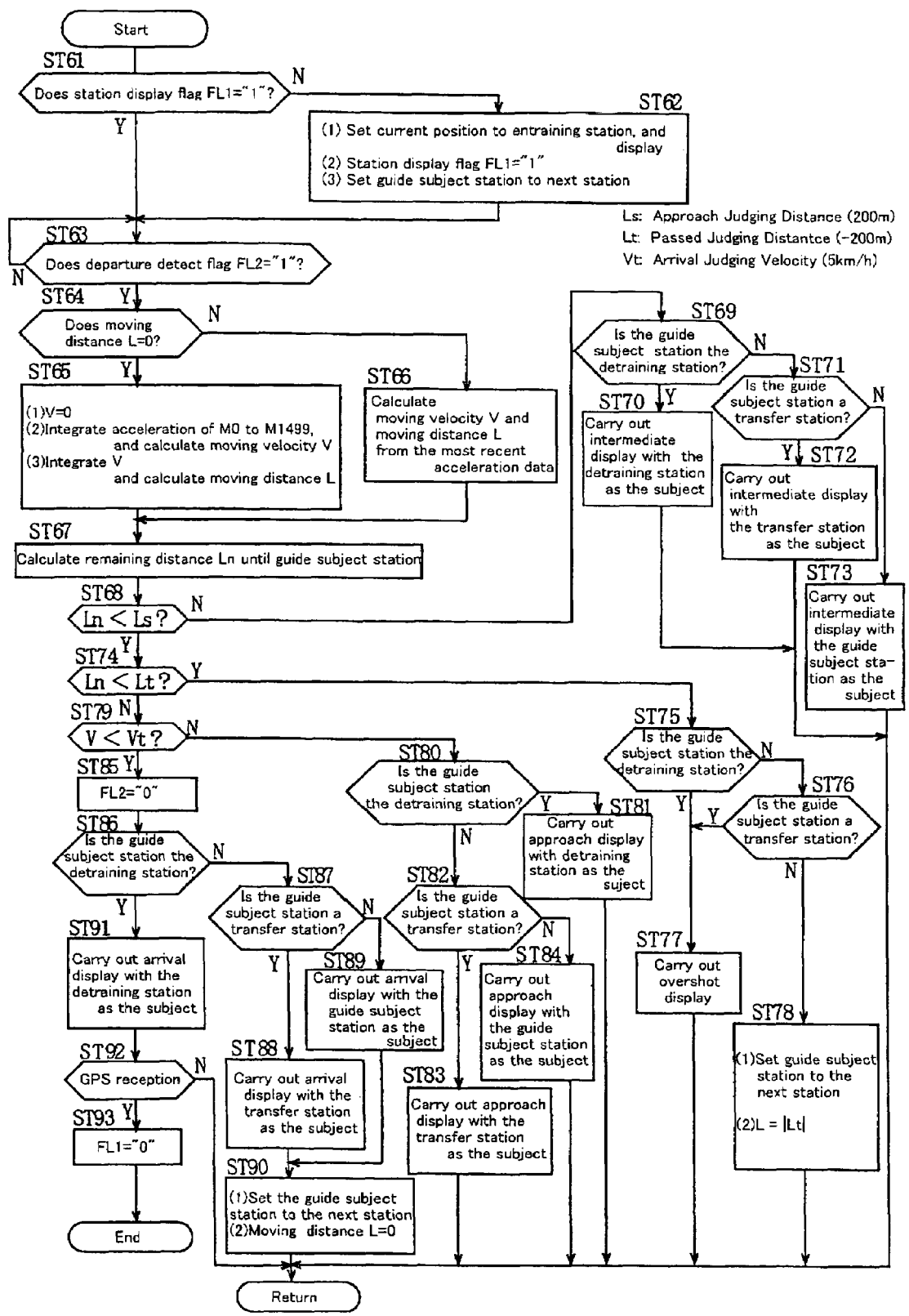
FIG. 14 is an explanatory diagram of a flowchart of the station guide display process of Example 1, and is also an explanatory diagram of the subroutine (1) of the inter-station guide process of ST48 of FIG. 13.

FIG. 14 is an explanatory diagram of a flowchart of the station guide display process of Example 1, and is also an explanatory diagram of the subroutine (1) of the inter-station guide process of ST48 of FIG. 13.

FIG. 15 is a series of explanatory diagrams of the station guide image of Example 1, wherein FIG. 15A is an explanatory diagram of an entraining station display image for announcing an entraining station; FIG. 15B is an explanatory diagram of an intermediate display image for announcing the next transit station; FIG. 15C is an explanatory diagram of an approach display image for announcing that a transit station has been approached; FIG. 15D is an explanatory diagram of an arrival display image for announcing that the train has arrived at the transit station; FIG. 15E is an explanatory diagram of an intermediate display image for announcing the next station where transfer to another train can be made; FIG. 15F is an explanatory diagram of an approach display image for announcing that the train is nearing or approaching the transfer station; FIG. 15G is an explanatory diagram of an arrival display image for announcing that the train has arrived at the transfer station; FIG. 15H is an explanatory diagram of an intermediate display image for announcing that the next station is the detraining station; FIG. 15I is an explanatory diagram of an approach display image for announcing that the train is nearing or approaching the detraining station; FIG. 15J is an explanatory diagram of an arrival display image for announcing that the train has arrived at the detraining station; and FIG. 15K is an explanatory diagram of an overshoot display image for announcing that the train has already passed the detraining station and the user has overlooked or failed to notice it.

In ST61 of FIG. 14, a determination is made whether the station display flag FL1 is "1" or not. If "no" (N), the operation moves on to ST62, and if "yes" (Y), the operation moves on to ST63.

In ST62, the following processes (1) to (3) are executed, and the operation moves on to ST63.
(1) The user's current position is set as the entraining station stored in the entraining station information storage means KC6A1, and the entraining station display image (refer to FIG. 15A) is displayed on the information display screen 11.
(2) The station display flag FL1 is set to "1".
(3) The target guide station is set to the next station on the route.

In ST63, a determination is made whether the departure detection flag FL2 is set to "1". If "no" (N), ST63 is repeated, and if "yes" (Y), the operation moves on to ST64.

In ST64, a determination is made whether the traveled distance L is "0" or not. If "yes" (Y), the operation moves on to ST65, and if "no" (N), the operation moves on to ST66.

In ST65, the following processes (1) to (3) are executed, and the operation moves on to ST67.
(1) Moving velocity V is reset to "0".
(2) Based on the acceleration data ax to az stored in M0 to M1499, the moving velocities Vx to Vz are calculated.
(3) Based on the acceleration data ax to az stored in M0 to M1499, the traveled distance L is calculated.

In ST66, once the sampling interval t1 has elapsed from the previously calculated moving velocity, the moving velocities Vx to Vz and the traveled distance L are calculated based on the most recent acceleration data ax to az stored in M1499.

In ST67, based on the traveled distance L and the inter-station distance to the target guide station, the remaining distance Ln to the target guide station is calculated. The operation then moves on to ST68.

In ST68, a determination is made whether the remaining distance Ln is less than the approach judging distance Ls or not. If "no" (N), the operation moves on to ST69, and if "yes" (Y), the operation moves on to ST74.

In ST69, a determination is made whether the target guide station is the detraining station or not. If "yes" (Y), the operation moves on to ST70, and if "no" (N), the operation moves on to ST71.

In ST70, the intermediate display image (refer to FIG. 15H) with the detraining station as the target is displayed on the information display screen 11. The operation then returns to ST61.

In ST71, a determination is made whether the target guide station is a transfer station or not. If "yes" (Y), the operation moves on to ST72, and if "no" (N), the operation moves on to ST73.

In ST72, the intermediate display image (refer to FIG. 15E) with a transfer station as the target is displayed on the information display screen 11. The operation then returns to ST61.

In ST73, the intermediate display image (refer to FIG. 15B) with a target guide station as the target is displayed on the information display screen 11. The operation then returns to ST61.

In ST74, a determination is made whether the remaining distance Ln is less than the transit judging distance Lt or not. If "yes" (Y), the operation moves on to ST75, and if "no" (N), the operation moves on to ST79.

In ST75, a determination is made whether the target guide station is the detraining station or not. If "no" (N), the operation moves on to ST76, and if "yes" (Y), the operation moves on to ST77.

In ST76, a determination is made whether the target guide station is a transfer station or not. If "yes" (Y), the operation moves on to ST77, and if "no" (N), the operation moves on to ST78.

In ST77, the overshoot display image (refer to FIG. 15K) showing that the train has passed or overshot the target guide station is displayed on the information display screen 11. The operation then returns to ST61.

In ST78, the following processes (1) and (2) are executed, and the operation returns to ST61.
(1) The target guide station is set to the next station on the route.
(2) The traveled distance L is set to the magnitude of the transit judging distance Lt (i.e. the absolute value of Lt).

In ST79, a determination is made whether the magnitude V of the moving velocities Vx to Vz is less than the stoppage judging velocity Vt or not. If "no" (N), the operation moves on to ST80, and if "yes" (Y), the operation moves on to ST85.

In ST80, a determination is made whether the target guide station is the detraining station or not. If "yes" (Y), the operation moves on to ST81, and if "no" (N), the operation moves on to ST82.

In ST81, the approach display image (refer to FIG. 15I) with the detraining station as the target is displayed on the information display screen 11. The operation then returns to ST61.

In ST82, a determination is made whether the target guide station is a transfer station or not. If "yes" (Y), the operation moves on to ST83, and if "no" (N), the operation moves on to ST84.

In ST83, the approach display image (refer to FIG. 15F) featuring a transfer station as the target is displayed on the information display screen 11. The operation then returns to ST61.

In ST84, the approach display image (refer to FIG. 15C) with the target guide station as the target is displayed on the information display screen 11. The operation then returns to ST61.

In ST85, the departure detection flag FL2 is set to "0". The operation then moves on to ST86.

In ST86, a determination is made whether the target guide station is the detraining station or not. If "no" (N), the operation moves on to ST87, and if "yes" (Y), the operation moves on to ST91.

In ST87, a determination is made whether the target guide station is a transfer station or not. If "yes" (Y), the operation moves on to ST88, and if "no" (N), the operation moves on to ST89.

In ST88, the arrival display image (refer to FIG. 15G) featuring a transfer station as the target is displayed on the information display screen 11. The operation then moves on to ST90.

In ST89, the arrival display image (refer to FIG. 15D) with a target guide station as the target is displayed on the information display screen 11. The operation then moves on to ST90.

In ST90, the following processes (1) and (2) are executed, and the operation returns to ST61.
(1) The target guide station is set to the next station on the route.
(2) The traveled distance L is reset to 0.

In ST91, the arrival display image (refer to FIG. 15J) with the detraining station as the target is displayed on the information display screen 11. The operation then moves on to ST92.

In ST92, a determination is made whether the electromagnetic waves from the GPS satellite have been received or not. If "yes" (Y), the operation moves on to ST93, and if "no" (N), the operation returns to ST61.

In ST93, the station display flag FL1 is set to "0". The station guide display process of FIG. 14 is then shut down, and the operation returns to the route guide process of FIG. 13.

Explanation for the Transport Facility Departure Detection Process

Figure 16:
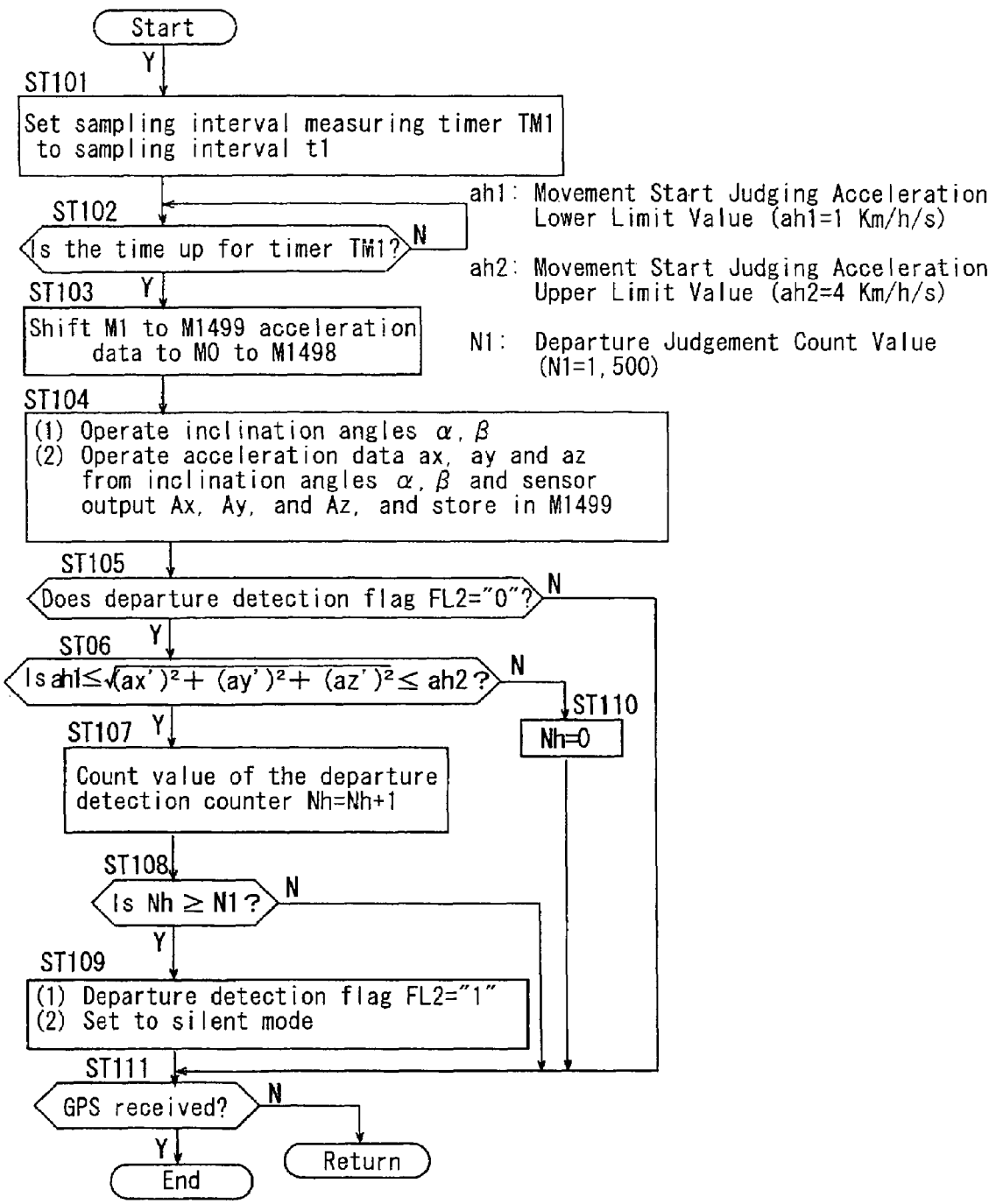
FIG. 16 is an explanatory diagram of a flowchart of the transport facility departure detection process of Example 1, and is also an explanatory diagram of the subroutine (2) of the inter-station guide process of ST48 of FIG. 13.

FIG. 16 is an explanatory diagram of a flowchart of the transport facility departure detection process of Example 1, and is also an explanatory diagram of the subroutine (2) of the inter-station guide process of ST48 of FIG. 13.

In ST101 of FIG. 16, the sampling interval t1 is set to the sampling interval measuring timer TM1. The operation then moves on to ST102.

In ST102, a determination is made whether the sampling interval measuring timer TM1 has run out of time; i.e., whether the sampling interval t1 has elapsed or not. If "no" (N), ST102 is repeated, and if "yes" (Y), the operation moves on to ST103.

In ST103, the acceleration data stored in M1 to M1499 of the acceleration data storage means KC13B is shifted to M0 to M1498. The operation then moves on to ST104.

In ST104, the following processes (1) and (2) are executed, and the operation moves on to ST105.
(1) Based on the output from the inclination sensor SN2, inclination angles $\alpha$, $\beta$, are calculated.
(2) The acceleration data Ax, Ay and Az outputted from a three-dimensional acceleration sensor SN3 are read, whereby based on the read acceleration data Ax, Ay and Az and the inclination angles $\alpha$, $\beta$, acceleration ax, ay and az on the horizontal plane are calculated and stored in M1499 of the acceleration data storage means KC13B.

In ST105, a determination is made whether the departure detection flag FL2 is "0" (i.e., whether the transport facility is moving) or not. If "yes" (Y), the operation moves on to ST106, and if "no" (N), the operation moves on to ST111.

In ST106, a determination is made whether the magnitude of acceleration $\{(A'x)^2+(A'y)^2+(A'z)^2\}^{1/2}$ is equal to or greater than the motion start judging acceleration lower limit value ah1 (=1 km/h/s) and equal to or less than the motion start judging acceleration lower limit value ah2 (=4 km/h/s) or not. If "yes" (Y), the operation moves on to ST107, and if "no" (N), the operation moves on to ST110.

In ST107, the count value Nh of the departure detection counter KC14D1 is established as Nh+1. In other words, 1 is added to the count value Nh. The operation then moves on to ST108.

In ST108, a determination is made whether the count value Nh is equal to or greater than the departure judging count value N1 (=1,500 times) or not. In other words, a determination is made whether acceleration of the motion start time acceleration range was detected continuously for 15 seconds (the acceleration continuation time) or not. If "yes" (Y), the operation moves on to ST109, and if "no" (N), the operation moves on to ST111.

In ST109, the following processes (1) and (2) are executed, and the operation moves on to ST111.

(1) The departure detection flag FL2 is set to "1".

(2) The portable telephone 1 is set to silent mode.

In ST110, the count value Nh of the departure detection counter KC14D1 is reset to "0". The operation then moves on to ST111.

In ST111, a determination is made whether the electromagnetic waves from the GPS satellite have been received or not. If "no" (N), the operation returns to ST101, and if "yes" (Y), the transport facility departure detection process of FIG. 16 is shut down, and the operation returns to the route guide process of FIG. 13.

Effects of Example 1

In the route guide system S of Example 1 as described above, route searching is conducted by a route guide program, and if the user is on foot, a GPS or a geomagnetic sensor SN1 etc. is used to track the user's current position or traveling direction and the like. In this manner a route guide image 23 (refer to FIG. 12) is displayed for navigating the user.

When the user enters a station or an underground shopping arcade and the portable telephone 1 can no longer receive GPS electromagnetic waves, a station guide display image (refer to FIG. 15) is displayed, and a guide display concerning the station is shown. At this time the entraining station is automatically set based on the route search results, so the user need not make a manual input. Upon detection by the acceleration sensor SN3 that acceleration of the motion start time acceleration range continues for a period of 15 seconds (acceleration continuation time), the motion start (departure) of the transport facility is detected.

Since the transport facility was at a standstill fifteen seconds before the motion start was detected, calculating the moving velocity V and traveling distance L with the initial velocity being "0" 15 seconds beforehand, allows the traveled distance L to be calculated accurately without any error. Therefore, even when electromagnetic waves cannot be received from a GPS or a base station, the traveled distance can be accurately calculated and calculation of the remaining distance Ln to the station or the like can be carried out with good precision. Accordingly, users can be provided with an accurate station guide.

Further, since a guide is being carried out based on an accurately calculated traveled distance L by detecting the motion start of the transport facility actually boarded by the user, the guidance process is not affected even if the train schedule is thrown into disarray due to unscheduled stopping between stations or trains being delayed or cancelled, and can still be carried out in accordance with the actual running situation of the transport facility. Users therefore do not have to consult a timetable.

In addition, by judging whether the traveled distance L is less than the transit judging distance Lt (=−200 m), even if a user has boarded an express or a super express train which has passed or does not stop at the target guide station, a guide display of the correct station can still be carried out to reflect this (refer to ST78).

If the transit station at which the transport facility did not make a stop is a transfer station or the detraining station, the user will be informed accordingly since such fact can be displayed. (refer to ST77). Similarly, if a user fails to notice that the train has stopped at the detraining station, the traveled distance L will be continually added and thus fall below the transit judging distance Lt, so the fact of overshooting can still be announced.

In the portable telephone 1 (portable guide device) of Example 1, there is no need to store route information pertaining to the whole country in the portable telephone 1 itself because route information can be provided and transmitted based on the route searched by the server 7. Therefore, the need to provide for a large-capacity storage medium can be dispensed with, thereby leading to cost reduction.

Further, in the route guide system S of Example 1, route information and the like can be transmitted and received utilizing an existing portable telephone network. Therefore, station guidance can be carried out utilizing existing systems (infrastructure) without the need to install new devices in train carriages and stations and the like.

In addition, in the portable telephone 1 of Example 1, when the motion start of a transport facility is detected, namely, once it is detected that a user has boarded the transport facility, the portable telephone 1 is automatically set to silent mode, thereby preventing other passengers from being disturbed by the ringing thereof.

Example 2

Figure 17:
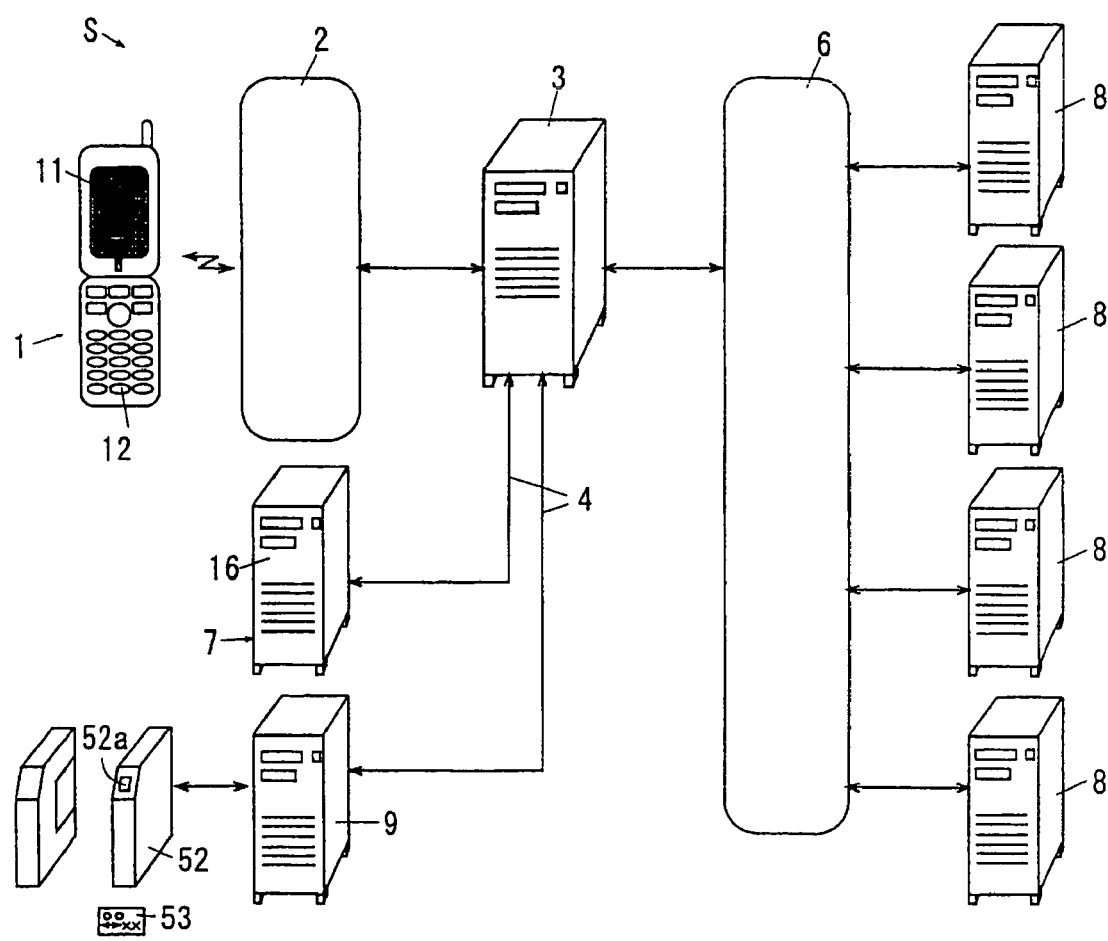
FIG. 17 is an explanatory diagram according to Example 2 of the route guide system in of the present disclosure, corresponding to FIG. 1 of Example 1.

FIG. 17 is an explanatory diagram according to Example 2 of the route guide system of the present invention, corresponding to FIG. 1 of Example 1.

Next, although an explanation in respect of Example 2 of the route guide system of the present invention will be given, structural elements thereof corresponding to those of Example 1 have been marked with the same reference symbols, and thus a detailed explanation thereof is omitted here.

While it differs from Example 1 in the following respects, Example 2 is configured in the same manner as Example 1 in all other respects.

As shown in FIG. 17, in the route guide system S of Example 2 an admission maintenance server 9 capable of transmitting and receiving data is connected to a route guide data distribution server 7. The admission maintenance server 9 is configured in such manner that data can be transmitted and received between ticket gates 52 installed at stations of the transport facility. The ticket gates 52 comprise a non-contact ticket reader 52a, so that information stored in an integrated circuit ("IC") can be read by a reader 52a when a ticket 53 embedded with a non-contact IC approaches the reader 52a. Therefore, by having the information in this ticket 53 read, a user can acquire information pertaining to an admission station or a station where he/she has alighted and entraining and detraining of the user can thus be managed. It will be noted that a system for managing admission into a station by means of such non-contact IC is publicly known (e.g., refer to JP-11-16011-A or the like), and thus a detailed explanation thereof is omitted here.

Explanation for the Controller of the Portable Telephone 1

Figure 18:
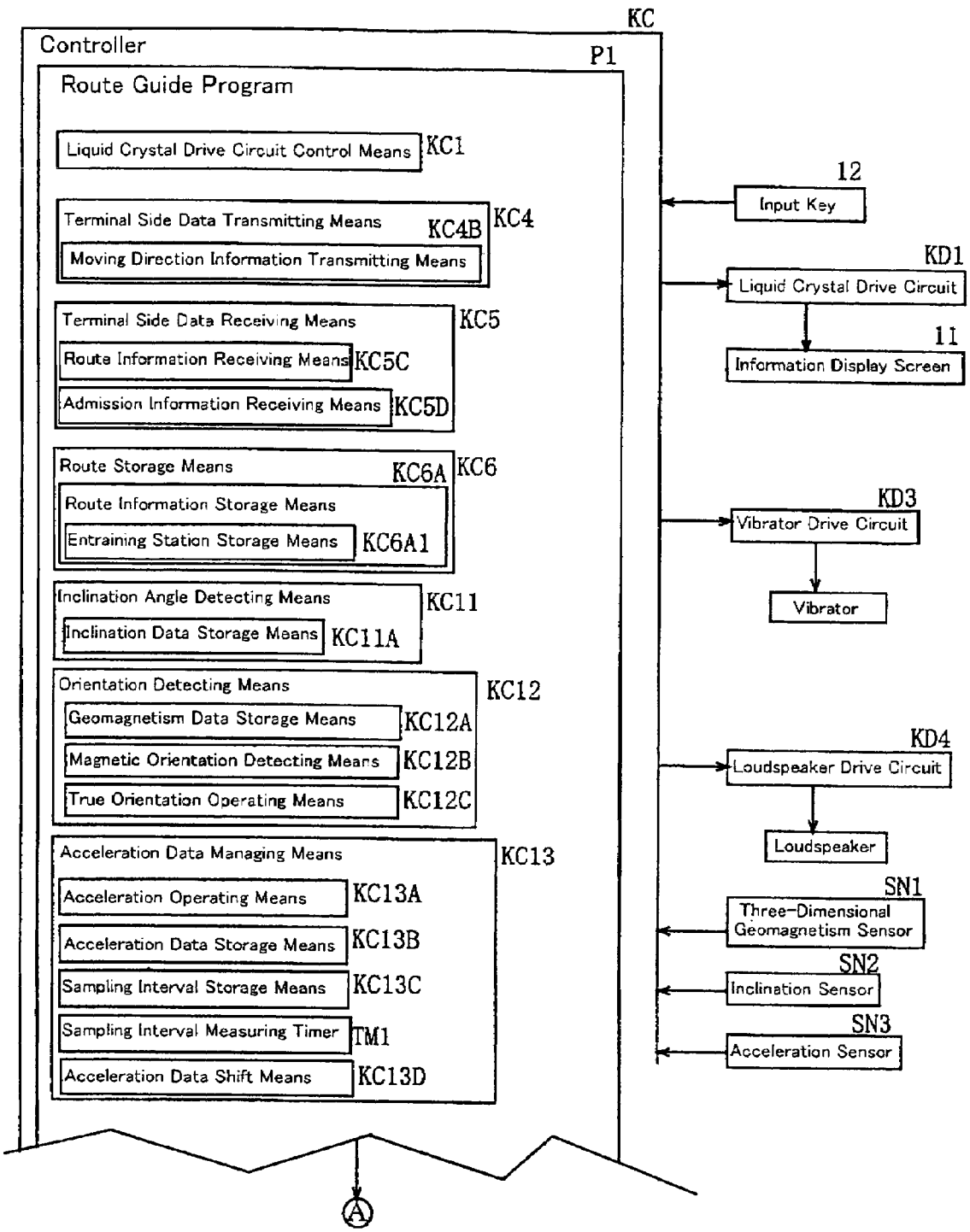
FIG. 18 is a diagram illustrating in the form of a block diagram (functional block diagram) the functions of the portable telephone of the route guide system of Example 2, corresponding to FIG. 2 of Example 1.

FIG. 18 is a diagram illustrating in the form of a block diagram (functional block diagram) the functions of the portable telephone of the route guide system of Example 2, corresponding to FIG. 2 of Example 1.

As shown in FIG. 18, the GPS has been omitted for the portable telephone 1 of Example 2. Thus, while it is not equipped with the GPS control means KC2, the route search conditions input image display means KC3, the route search conditions data transmitting means KC4A, the route data receiving means KC5A, the map data receiving means KC5B, the current position detection means KC7, the route guide image forming means KC8, the route guide image display means KC9, and the means for judging remaining distance during walking guide KC10, the controller KC of the portable telephone 1 comprises the following control means.

KC4B: Traveling Direction Information Transmitting Means

The traveling direction information transmitting means KC4B transmits to the route guide data distribution server 7 information pertaining to the traveling direction Θv of the transport facility detected based on moving velocities Vx to Vz after motion start of the transport facility.

KC5D: Admission Information Receiving Means

When a ticket 53 is used to pass through a ticket gate 52, the admission information receiving means KC5D of Example 2 receives admission information on the admission transmitted by the server 7 via the server 9 from the ticket gate 52 for notifying the portable telephone 1, in the form of admission confirmation mail (by electronic mail).

Based on such admission information, the entraining station storage means KC6A1 of Example 2 stores the admission station as the entraining station. Further, the route information receiving means KC5C of Example 2 receives route information containing station identification information pertaining to the stations on the route and the inter-station distances transmitted from the server 7. The route information storage means KC6A stores the received route information.

Explanation for the Controller of the Route Guide Data Distribution Server 7 (Route Information Providing Server)

Figure 19:
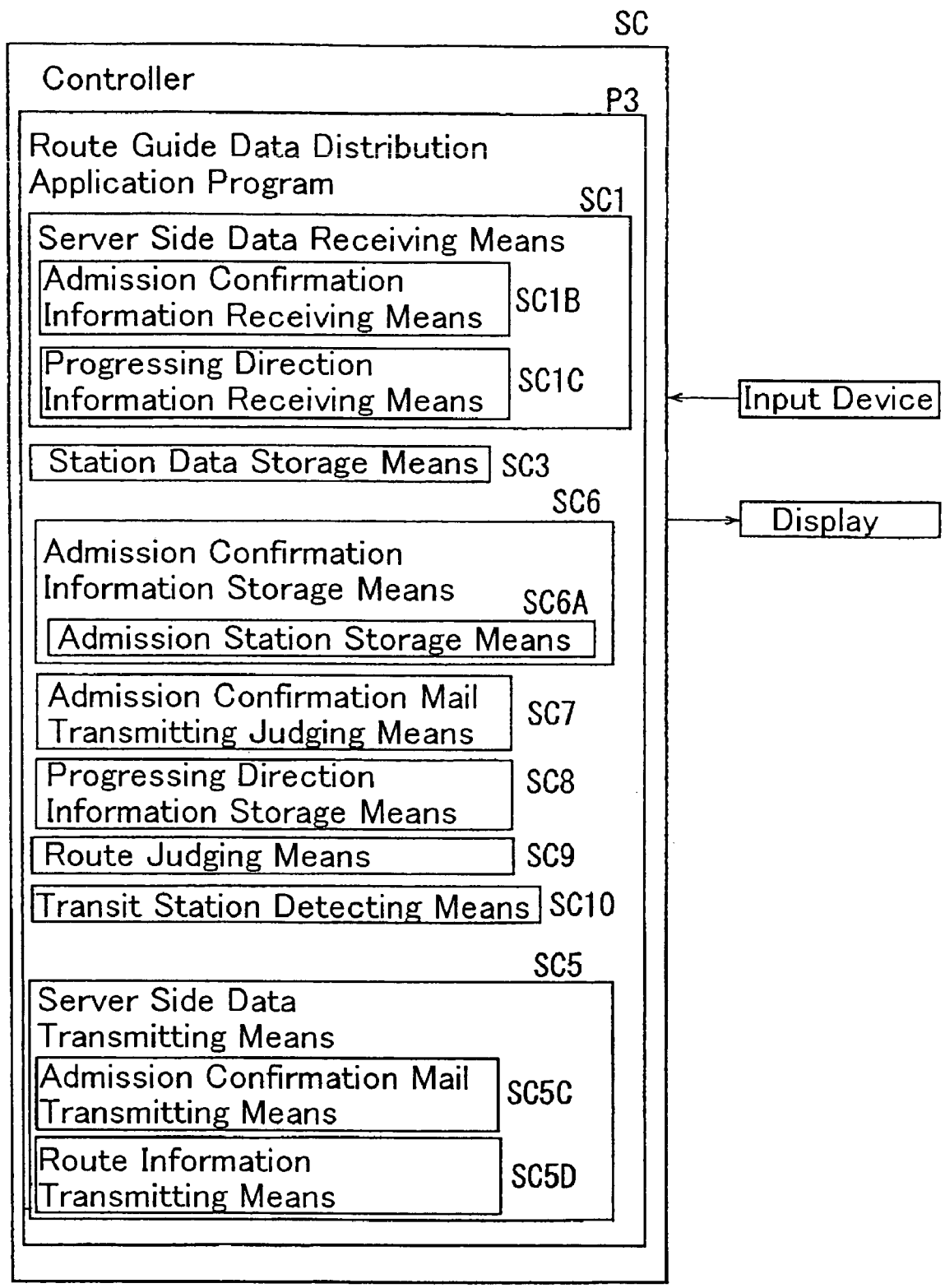
FIG. 19 is a diagram illustrated in the form of a block diagram (functional block diagram) of the functions of the route guide data distribution server of the route guide system of Example 2, corresponding to FIG. 9 of Example 1.

FIG. 19 is a diagram illustrated in the form of a block diagram (functional block diagram) of the functions of the route guide data distribution server of the route guide system of Example 2, corresponding to FIG. 9 of Example 1.

As shown in FIG. 19, while the route guide data distribution server 7 of Example 2 is not equipped with the search conditions data receiving means SC1A, the map data storage means SC2, the route forming means SC4, the route search result transmitting means SC5A, and the map information transmitting means SC5B, it comprises the following respective control means.

SC1B: Admission Confirmation Information Receiving Means

The admission confirmation information receiving means SC1B receives admission confirmation information of an admission transmitted from the admission maintenance server 9, and particularly contains user identification information for specifying the admitted user and station identification information for specifying the admitted station.

SC1C: Progressing Direction Information Receiving Means

The progressing direction information receiving means SC1C receives progressing direction information transmitted from the portable telephone 1.

SC6: Admission Confirmation Information Storage Means

The admission confirmation information storage means SC6 comprises admission station storage means SC6A, and stores the received admission confirmation information.

SC6A: Admission Station Storage Means

The admission station storage means SC6A stores the inputted station based on the station identification information for specifying the admission station contained in the admission confirmation information.

SC7: Admission Confirmation Mail Transmission Judging Means (Admission Information Transmission Judging Means)

The admission confirmation mail transmission judging means SC7 comprises admission confirmation mail transmitting list storage means (not shown) for storing a list of electronic mail addresses of users to whom admission confirmation mail will be transmitted when admitted to a station by means of the ticket 53, and determines whether a user specified in the user identification information contained in the admission confirmation information is in the recorded list (or otherwise judges whether an admission confirmation mail should be transmitted or not).

SC8: Progressing Direction Information Storage Means

The progressing direction information storage means SC8 stores the progressing direction information received.

SC9: Route Judging Means

The route judging means SC9 determines the route taken by the user and the progressing direction (inbound or outbound) of the train based on the station in which the user was admitted, the route information stored in the station data storage means SC3, and the progressing direction information transmitted from the portable telephone 1.

SC10: Transit Station Detection Means

The transit station detection means SC10 detects the stations (transit stations) on the route located in the progressing direction from the admission station, based on the route specified by the route judging means SC9, the progressing direction, the admission station, and the route information. The transit station detection means SC10 of Example 2 detects the transit stations up to the end of the route, but can also be configured so as to detect a predetermined number of stations.

SC5C: Admission Confirmation Mail Transmission Means

The admission confirmation mail transmission means SC5C transmits admission confirmation mail to the portable telephone 1.

SC5D: Route Information Transmitting Means

The route information transmitting means SC5D transmits to the portable telephone 1 route information containing station identification information pertaining to the transit stations detected by the transit station detection means SC10 and the inter-station distance information showing the inter-station distances between transit stations.

Flowchart Explanations

In the explanations provided herein below in respect of the flowcharts of Example 2, the processing steps that correspond to the respective steps of the processes involved in Example 1 have been marked with the same ST numbers, and thus appropriate explanation thereof has been omitted.

Explanation for the Flowchart of the Route Guide Data Distribution Server 7

Figure 20:
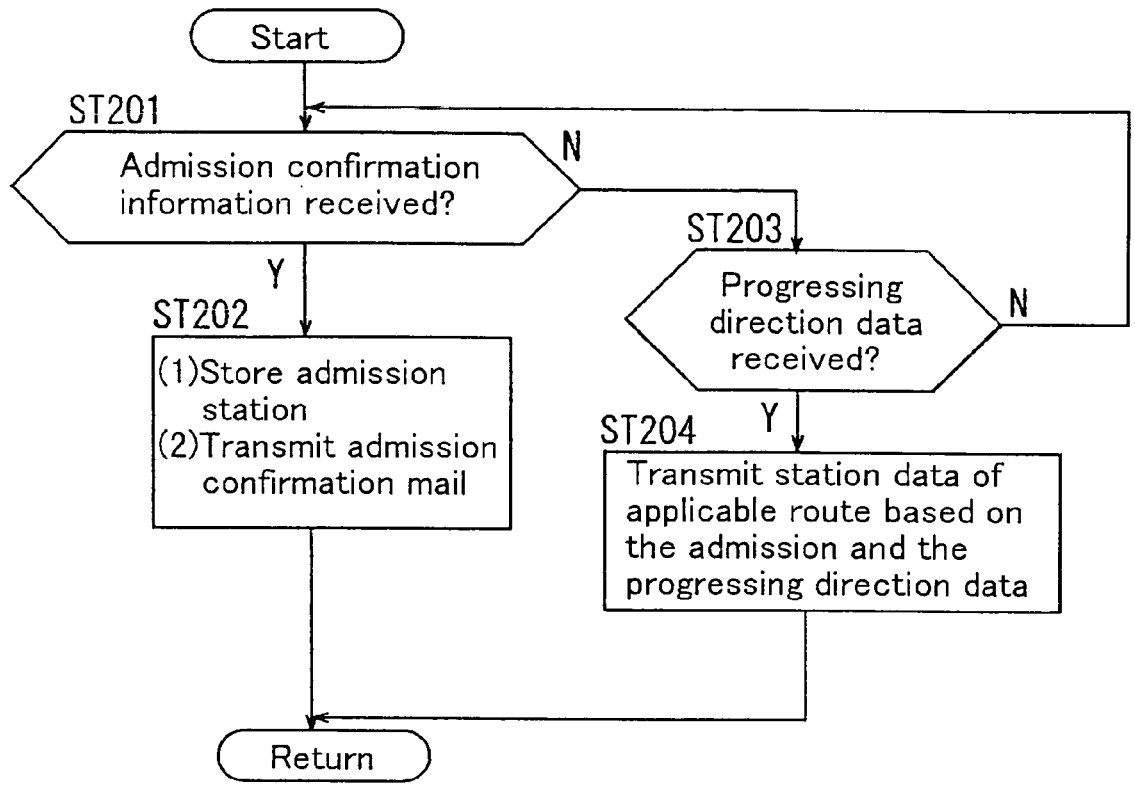
FIG. 20 is the main flowchart of the station detection process provided in the route guide data distribution server of the route guide system of Example 2.

FIG. 20 is the main flowchart of the station detection process provided in the route guide data distribution server of the route guide system of Example 2.

The process for each step ("ST") in the flowchart of FIG. 20 is conducted in accordance with the route guide data distribution application program P3 of the controller SC of the server 7. In addition, these processes are executed in parallel with various other processes of the server 7.

The station detection process of FIG. 20 starts when the power source of the server 7 is switched on.

In ST201 of FIG. 20, a determination is made whether the admission confirmation information transmitted from the admission maintenance server 9 has been received or not. If "yes" (Y), the operation moves on to ST202, and if "no" (N), the operation moves on to ST203.

In ST202, the following processes (1) and (2) are executed, and the operation returns to ST201.
(1) The admission station is stored.
(2) An admission confirmation mail is transmitted to the portable telephone 1 of the user specified in the admission confirmation information.

In ST203, a determination is made whether the progressing direction information transmitted from the portable telephone 1 has been received or not. If "yes" (Y), the operation moves on to ST204, and if "no" (N), the operation returns to ST201.

In ST204, based on the admission station and progressing direction information, data pertaining to the route of the transport facility boarded by the user (route information) and the transit station of the progressing direction are transmitted. The operation then returns to ST201.

Explanation for the Flowchart of the Portable Telephone 1

Explanation of the Station Guide Display Process

FIG. 21 is a flowchart of the station guide display process of the route guide program provided in the portable telephone of the route guide system of Example 2, corresponding to FIG. 14 of Example 1.

The process for each step ("ST") in the flowchart of FIG. 21 is conducted in accordance with the route guide program P1 of the controller KC of the portable telephone 1. In addition, these processes are executed in parallel with various other processes (such as the below-described transport facility departure detection process of FIG. 22) of the portable telephone 1.

The flowchart illustrated in FIG. 21 starts when the power source of the portable telephone 1 is switched on.

In ST211 of FIG. 21, a determination is made whether an admission confirmation mail transmitted from the route guide data distribution server 7 has been received or not. If "yes" (Y), the operation moves on to ST212, and if "no" (N), ST211 is repeated.

In ST212, the station arrival flag FL0 is set to "1". The operation then moves on to ST213.

In ST213, a determination is made whether the departure detection flag FL2 is "1" or not. If "yes" (Y), the operation moves on to ST214, and if "no" (N), ST213 is repeated.

In ST214, the following processes (1) to (3) are executed, and the operation moves on to ST215.
(1) The moving velocities Vx to Vz are calculated based on the acceleration data ax to az.
(2) The progressing direction $\Theta v$ is calculated based on the moving velocities Vx to Vz and the true orientation tr.
(3) The progressing direction $\Theta v$ is transmitted to the route guide data distribution server 7 as progressing direction data.

In ST215, a determination is made whether the route information transmitted from the route guide data distribution server 7 has been received or not. If "yes" (Y), the operation returns to ST61, and if "no" (N), ST215 is repeated.

In ST61 of FIG. 21, a determination is made in the same manner as in ST61 of Example 1 as to whether the station display flag FL1 is "1" or not. If "yes" (Y), the operation moves on to ST63, and if "no" (N), the operation moves on to ST62'.

In ST62', the following processes (1) and (2) are executed, and the operation moves on to ST63.

(1) The station display flag FL1 is set to "1".

(2) The target guide station is set to the next station on the route.

Next, the same processes mentioned in steps ST63 to ST67 of Example 1 are executed, and the operation moves on to ST68.

In ST68 of FIG. 21, a determination is made whether the remaining distance Ln is less than the approach judging distance Ls or not. If "no" (N), the operation moves on to ST73, and if "yes" (Y), the operation moves on to ST74.

In ST73, the intermediate display image (refer to FIG. 15B) with a target guide station as the target is displayed on the information display screen 11. The operation then moves on to ST216.

In ST74, a determination is made whether the remaining distance Ln is less than the transit judging distance Lt or not. If "yes" (Y), the operation moves on to ST78, and if "no" (N), the operation moves on to ST79.

In ST78, the following processes (1) and (2) are executed, and the operation moves on to ST216.

(1) The target guide station is set to the next station on the route.

(2) The traveled distance L is set to the magnitude of the transit judging distance Lt (i.e., the absolute value of Lt).

In ST79, a determination is made whether the magnitude V of the moving velocities Vx to Vz is less than the stoppage judging velocity Vt or not. If "no" (N), the operation moves on to ST84, and if "yes" (Y), the operation moves on to ST85.

In ST84, the approach display image (refer to FIG. 15F) with the transfer station as the target is displayed on the information display screen 11. The operation then moves on to ST216.

In ST85, the departure detection flag FL2 is set to "0". The operation then moves on to ST89.

In ST89, the arrival display image (refer to FIG. 15D) with a target guide station as the target is displayed on the information display screen 11. The operation then moves on to ST90.

In ST90, the following processes (1) and (2) are executed, and the operation moves on to ST216.

(1) The target guide station is set to the next station on the route.

(2) The traveled distance L is reset to 0.

In ST216, a determination is made whether an input to shut down the station guide display has been inputted or not. If "no" (N), the operation returns to ST61, and if "yes" (Y), the operation moves on to ST217.

In ST217, the station arrival flag FL0 is set to "0". The operation then moves on to ST93.

In ST93, the station display flag FL1 is set to "0". The operation then returns to ST211.

Explanation for the Transport Facility Departure Detection Process

Figure 22:
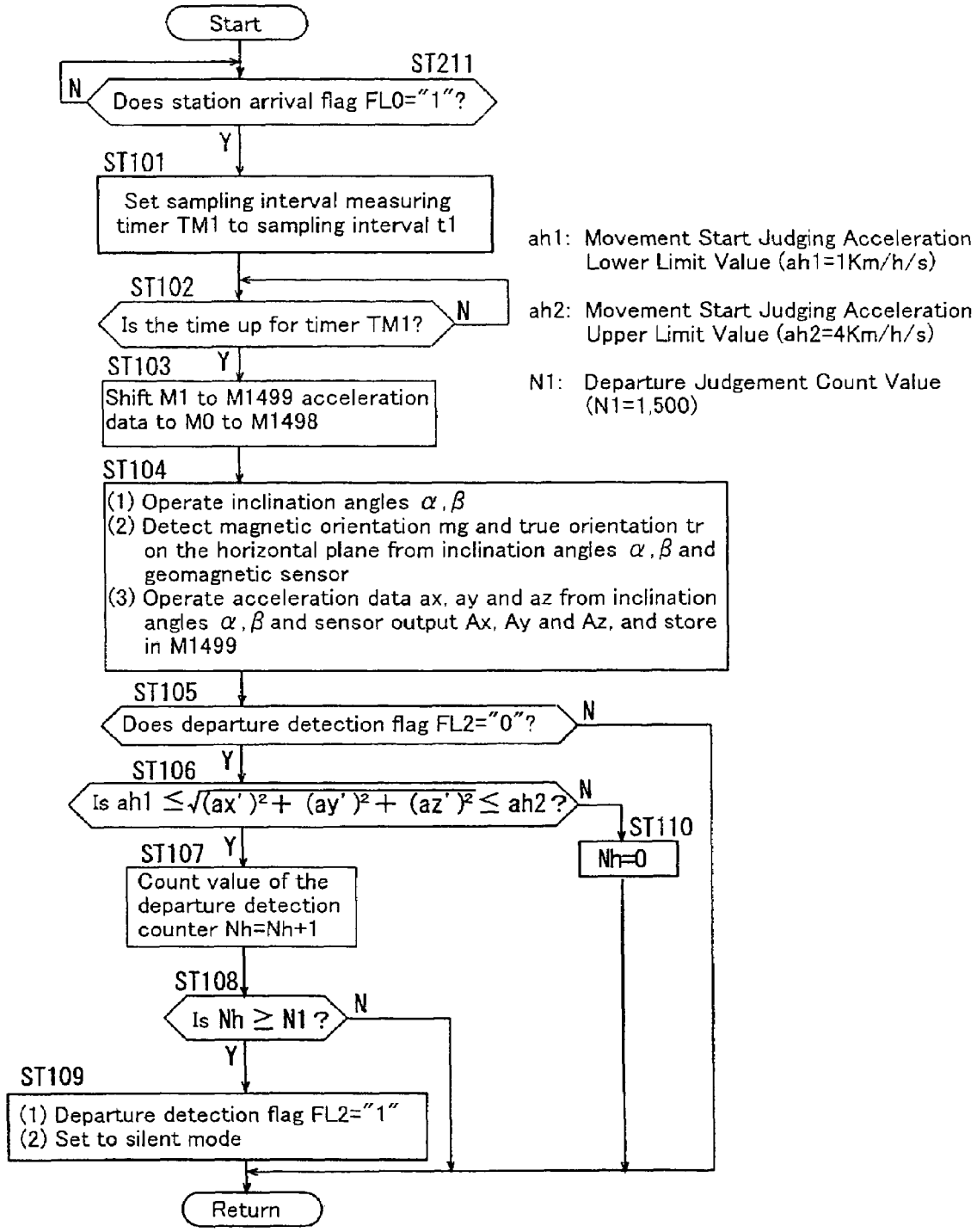
FIG. 22 is an explanatory diagram of a flowchart of the transport facility departure detection process of Example 2, and corresponds to FIG. 16 of Example 1.

FIG. 22 is an explanatory diagram of a flowchart of the transport facility departure detection process of Example 2, corresponding to FIG. 16 of Example 1.

The transport facility departure detection process of FIG. 22 starts when the power source of the portable telephone 1 is turned on.

In ST211 of FIG. 22, a determination is made whether the station arrival flag FL0 is "1" or not. If "yes" (Y), the operation moves on to ST101, and if "no" (N), ST211 is repeated.

Next, the same processes referred to as ST101 to ST110 in the discussion of Example 1 are executed. In the transport facility departure detection process of Example 2, ST111 of Example 1 is omitted, and thus in the case of a "no" (N) in ST105 or if the processes involved in steps ST109 and ST110 have been shut down, the operation returns to ST211.

Effects of Example 2

In the route guide system S of Example 2 as described above, when a ticket 53 embedded with a non-contact IC is used for admission, the admission is automatically announced to the portable telephone 1. Once the transport facility that the user has boarded begins to move, the route taken, the progressing direction and the stations that it will pass through are automatically detected according to the traveling direction of the transport facility. Therefore, even if a user does not input the departure station, the route or the like, the above respective information is automatically detected.

Further, in the same manner as in Example 1, since the traveled distance L is calculated by detecting the motion start of the transport facility, an accurate traveled distance L can be calculated. Therefore, a guide display of the stations at which the transport facility will pass through can be accurately displayed for the user, such that a guide can still be carried out in accordance with the actual running situation of the transport facility regardless of any delay or cancellation of trips. In addition, in the same manner as in Example 1, the route guide system S of Example 2 can conduct station guidance by utilizing existing systems.

Example 3

Next, in the explanation to be given for Example 3 of the portable guide device of the present invention, similar structural elements corresponding to those of Example 2 have been marked with the same reference symbols, and thus a detailed explanation thereof is omitted here.

Example 3 differs from Example 2 in the following respects, but is similarly configured as that of Example 2 in all other respects Explanation for the Controller of the Portable Telephone 1

Figure 23:
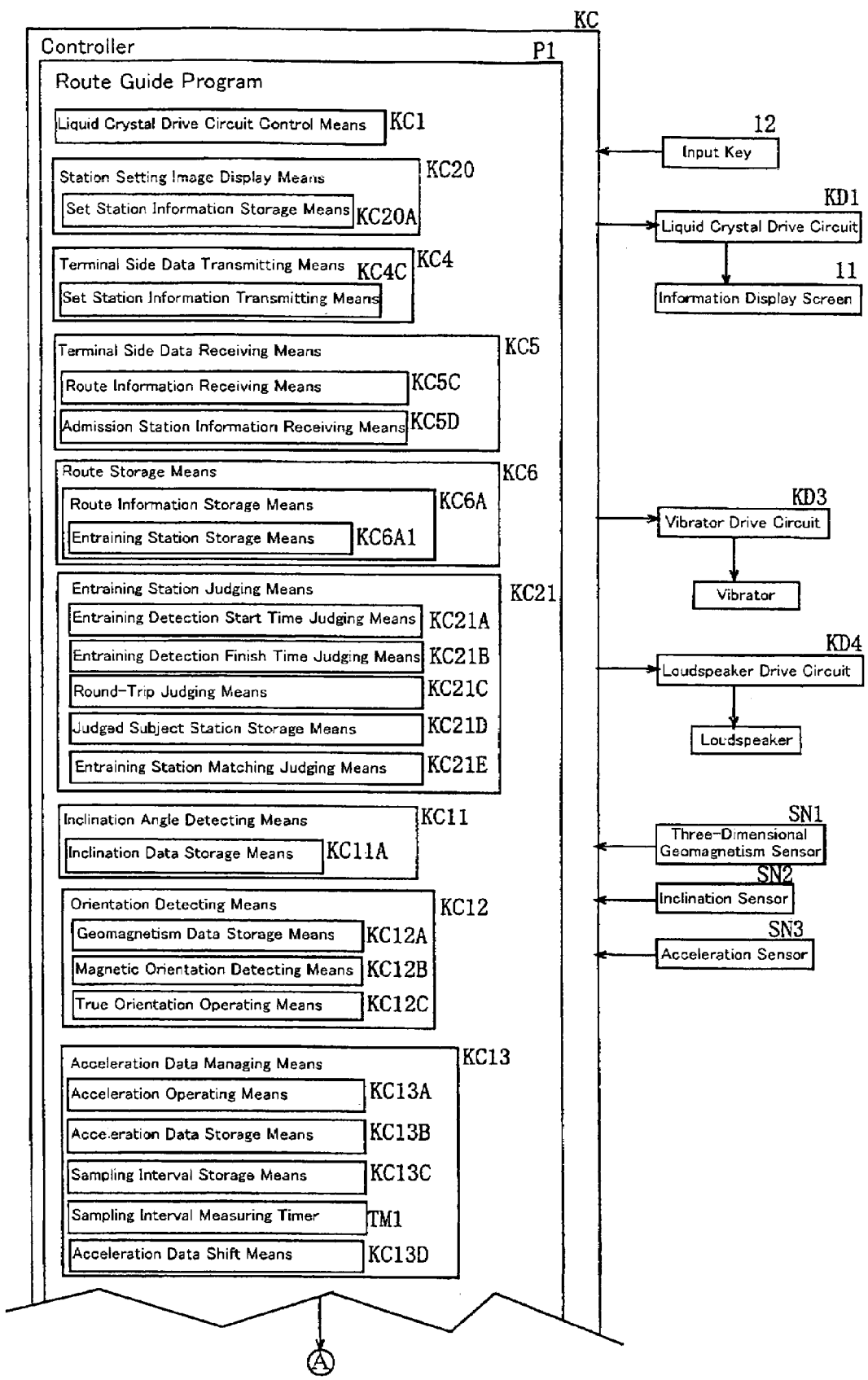
FIG. 23 is a diagram illustrating in the form of a block diagram (functional block diagram) the functions of the portable telephone of the route guide system of Example 3, and corresponds to FIG. 18 of Example 2.

FIG. 23 is a diagram illustrating in the form of a block diagram (functional block diagram) the functions of the portable telephone of the route guide system of Example 3, and corresponds to FIG. 18 of Example 2.

As shown in FIG. 23, the portable telephone 1 of Example 3 is not equipped with the traveling direction information transmitting means KC4B and the station guide image forming means KC18 comprising the portable telephone 1 of Example 2, but comprises the following control means.

FIG. 24 is an explanatory diagram of the station setting image of Example 3.

KC20: Station Setting Image Display Means

The station setting image display means KC20 comprises setting station information storage means KC20A, and displays on the information display screen 11 a station setting image 61 (refer to FIG. 24) in reference to which a user manually sets a time band for executing a route or station guide. In FIG. 24, the station setting image 61 of Example 3 comprises a start-up date and time input field 62 for inputting the date and the time (working day, daily, or weekly on xxx day) for executing station guidance; an outward detection start time input field 63 for selecting and inputting the outward detection start time for starting detection of admission into the outward station heading for the destination station from the departure station; an outward detection completion time input field 64 for selecting and inputting the outward detection completion time for completing detection of admission into the outward station; a homeward detection start time input field 66 for selecting and inputting the homeward detection start time for starting detection of admission into the homeward station heading for the departure station from the destination station; a homeward detection completion time input field 67 for selecting and inputting the homeward detection completion time for completing detection of admission into the homeward station; a route recording field 68 for inputting the route (such as transfer station(s), route and the like) from the departure station to the destination station; an arrival announcement setting field 69 for selecting and inputting the method for carrying out announcement upon arrival at the outward destination station or homeward departure station; and an option setting field 71 for setting whether the portable telephone 1 will be automatically set to silent mode when a departure is detected.

KC20A: Setting Station Information Storage Means

The setting station information storage means KC20A stores the date, time and route inputted to the station setting image 61 (for example: from Kawasaki to Awajicho: departure—Kawasaki, Tokaido line; transfer—Tokyo, Marunouchi line; destination—Awajicho), as well as the detection start time, the detection completion time and the like.

KC4C: Setting Station Information Transmission Means

The setting station information transmission means KC4C transmits pre-determined station information, such as departure station and destination station inputted for setting by the user, to the route guide data distribution server 7.

KC21: Entraining Station Judging Means

The entraining station judging means KC21 comprises entraining detection start time judging means KC21A, entraining detection completion time judging means KC21B, and entraining station matching judging means KC21E. The entraining station judging means KC21 determines, based on the entraining station stored in the entraining station storage means KC6A1 and the departure station and the destination station of the recorded route, whether the entraining station is the departure station or the destination station.

KC21A: Entraining Detection Start Time Judging Means

The entraining detection start time judging means KC21A determines whether the current time of an internal clock (not shown) of the portable telephone 1 is a detection start time (outward detection start time or homeward detection start time).

KC21B: Entraining Detection Completion Time Judging Means

The entraining detection completion time judging means KC21B determines whether the current time is a detection completion time (outward detection completion time or homeward detection completion time).

KC21C: Round-Trip Judging Means

Round-trip judging means KC21C judges whether the trip is outward or homeward bound according to the current time and the detection start time (outward detection start time or homeward detection start time).

KC21D: Adjudged Target Station Storage Means

The adjudged target station storage means KC21D stores the departure station as the adjudged target station and the destination station as the detraining station which were recorded by the user if a determination is made by the round-trip judging means KC21C that the journey is outward bound, and stores the destination station as the adjudged target station and the departure station as the detraining station which were recorded by the user if a determination is made by the round-trip judging means KC21C that the journey is homeward bound KC21E: Entraining Station Match Judging Means The entraining station match judging means KC21E determines whether the entraining station specified in the admission information matches the adjudged target station (outward departure station or homeward destination station).

Explanation of the Controller of the Route Guide Data Distribution Server (Route Information Providing Server) 7)

Figure 25:
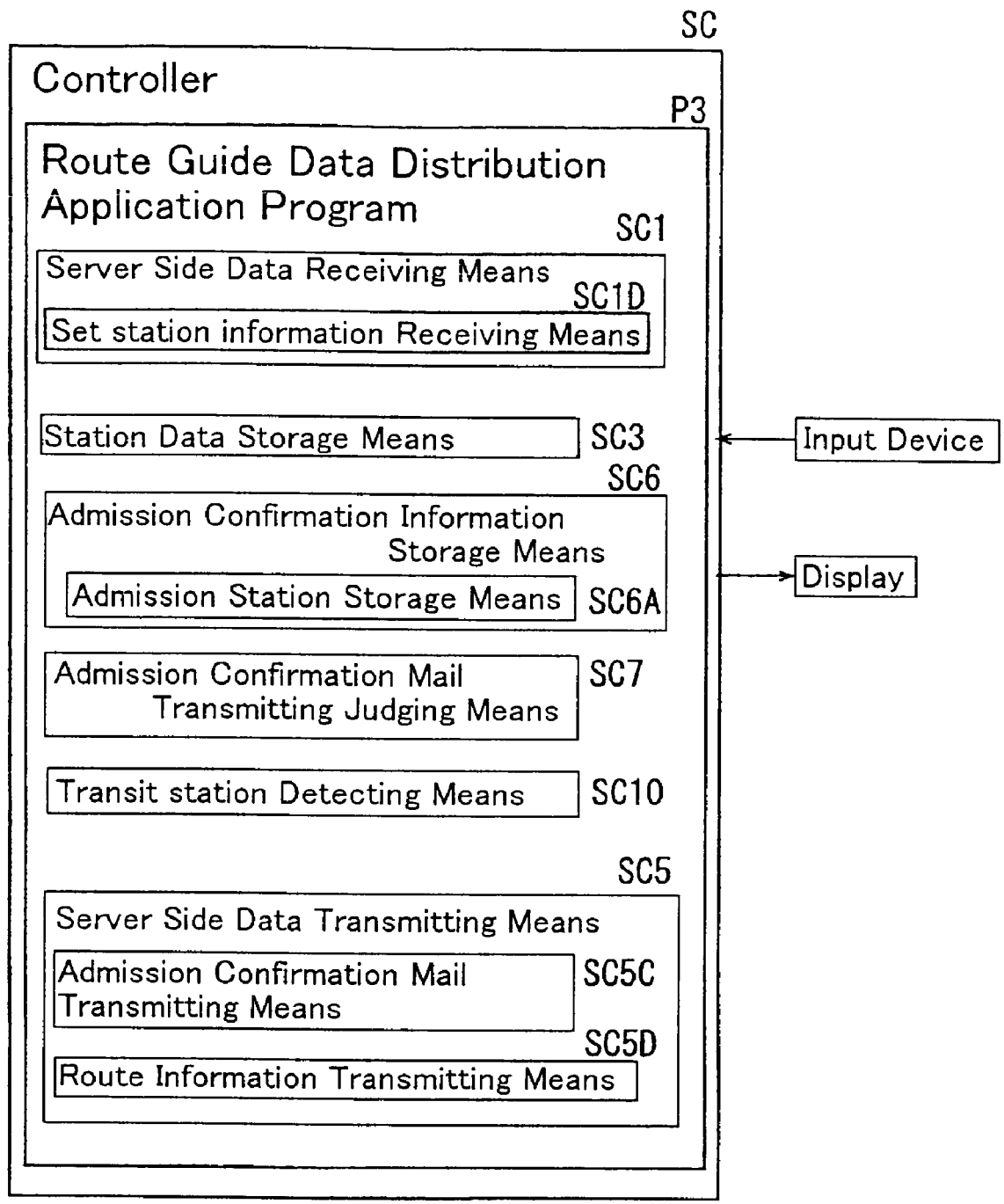
FIG. 25 is a diagram illustrated in the form of a block diagram (functional block diagram) of the functions of the route guide data distribution server of the route guide system of Example 3, and corresponds to FIG. 19 of Example 2.

FIG. 25 is a diagram illustrated in the form of a block diagram (functional block diagram) of the functions of the route guide data distribution server of the route guide system of Example 3, and corresponds to FIG. 19 of Example 2.

As shown in FIG. 25, the route guide data distribution server 7 of Example 3, is not equipped with the admission confirmation information receiving means SC1B, the progressing direction information receiving means SC1C, the progressing direction information storage means SC8, and the route judging means SC9 of the route guide data distribution server 7 of Example 2, but comprises setting station information receiving means SC1D which receives set station information transmitted from the portable telephone 1. Further the transit station detection means SC10 of Example 3 detects transit stations on the route according to the set station information received.

Flowchart Explanations

In the explanations provided herein below in respect of the flowcharts of Example 3, the processing steps that correspond to the respective steps of the processes involved in Examples 1 and 2 have been marked with the same ST numbers, and thus appropriate explanation thereof has been omitted.

Explanation for the Flowchart of Route Guide Data Distribution Server 7

Figure 26:
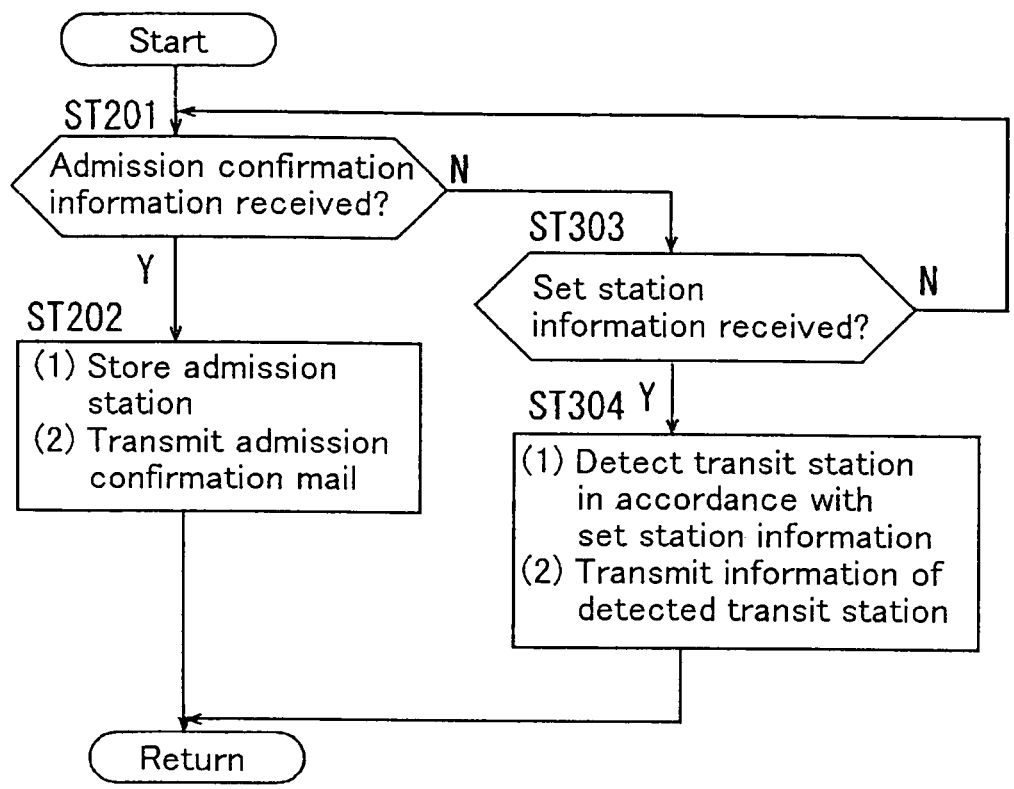
FIG. 26 is the main flowchart of the station detection process provided in the route guide data distribution server of the route guide system of Example 3.

FIG. 26 is the main flowchart of the station detection process provided in the route guide data distribution server of the route guide system of Example 3.

The process for each step ("ST") in the flowchart of FIG. 26 is conducted in accordance with the route guide data distribution application program P3 of the controller SC of the server 7. In addition, these processes are executed in parallel with various other processes of the server 7.

The station detection process of FIG. 26 starts when the power source is switched on.

In ST201 of FIG. 26, a determination is made whether the admission confirmation information transmitted from the admission maintenance server 9 has been received or not. If "yes" (Y), the operation moves on to ST202, and if "no" (N), the operation moves on to ST303.

In ST303, a determination is made whether the set station information transmitted from the portable telephone 1 has been received or not. If "yes" (Y), the operation moves on to ST304, and if "no" (N), the operation returns to ST201.

In ST304, the following processes (1) and (2) are executed, and the operation returns to ST201.
(1) The transit stations on the route corresponding to the set station information (departure station, destination station and the like) are detected.
(2) Information on the detected transit stations is transmitted to the portable telephone 1.

Explanation for the Flowchart of the Portable Telephone 1

Next, although the flowchart pertaining to the portable telephone 1 will be explained, explanation for the following processes have been omitted: the process whereby the station setting image 61 (refer to FIG. 24) is displayed on the information display screen 11, the process wherein the user inputs each item to the displayed station setting image 61, the process wherein the inputted set station data are transmitted to the route guide data distribution server 7, and the process wherein information of the transit stations transmitted from the route guide data distribution server 7 is received and stored.

In addition, in the portable telephone 1 of Example 3, since the transport facility departure detection process of Example 2 (refer to FIG. 22) for detecting the departure of the transport facility is likewise executed, detailed explanation thereof is omitted here.

Explanation for the Flowchart of the Station Guide Process

Figure 27:
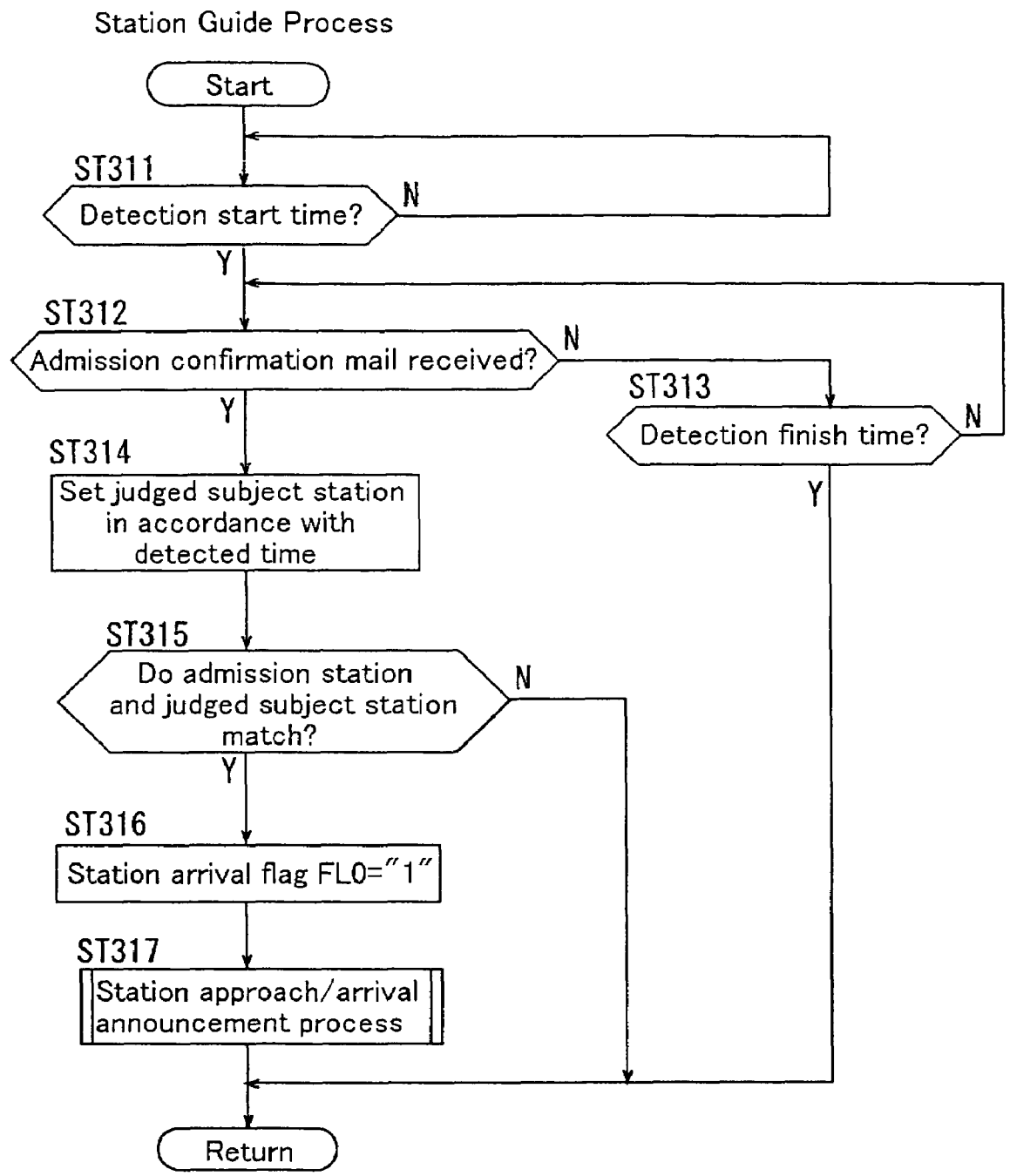
FIG. 27 is a flowchart of the station guide process of the route guide program provided in the portable telephone of the route guide system of Example 3.

FIG. 27 is a flowchart of the station guide process of the route guide program provided in the portable telephone of the route guide system of Example 3.

The process for each step ("ST") in the flowchart of FIG. 27 is conducted in accordance with the route guide program P1 of the controller KC of the portable telephone 1. In addition, these processes are executed in parallel with various other processes (such as the transport facility departure detection process etc.) of the portable telephone 1.

The flowchart illustrated in FIG. 27 starts when the power source of the portable telephone 1 is switched on.

In ST311 of FIG. 27, a determination is made whether the current time is a detect start time (either outward detect start time or homeward detect start time) or not. If "yes" (Y), the operation moves on to ST312, and if "no" (N), ST311 is repeated.

In ST312, a determination is made whether an admission confirmation mail transmitted from the route guide data distribution server 7 has been received or not. If "no" (N), the operation moves on to ST313, and if "yes" (Y), the operation moves on to ST314.

In ST313, a determination is made whether the current time constitutes a detection completion time (either outward detection completion time or homeward detection completion time) or not. If "yes" (Y), the operation returns to ST311, and if "no" (N), the operation returns to ST312.

In ST314, depending on whether the detected time is an outward detection completion time or a homeward detection completion time, the adjudged target station is set (stored) as a departure station or a destination station. The operation then moves on to ST315.

In ST315, a determination is made whether the admission station matches the adjudged target station. If "yes" (Y), the operation moves on to ST316, and if "no" (N), the operation returns to ST311.

In ST316, the station arrival flag FL0 is set to "1". The operation then moves on to ST317.

In ST317, a station approach/arrival announcement process (refer to the below-described flowchart of FIG. 28) for announcing that the transport facility is approaching or has arrived at a transfer station or detraining station is executed, and the operation then returns to ST311.

Explanation for the Station Approach/Arrival Announcement Process

Figure 28:
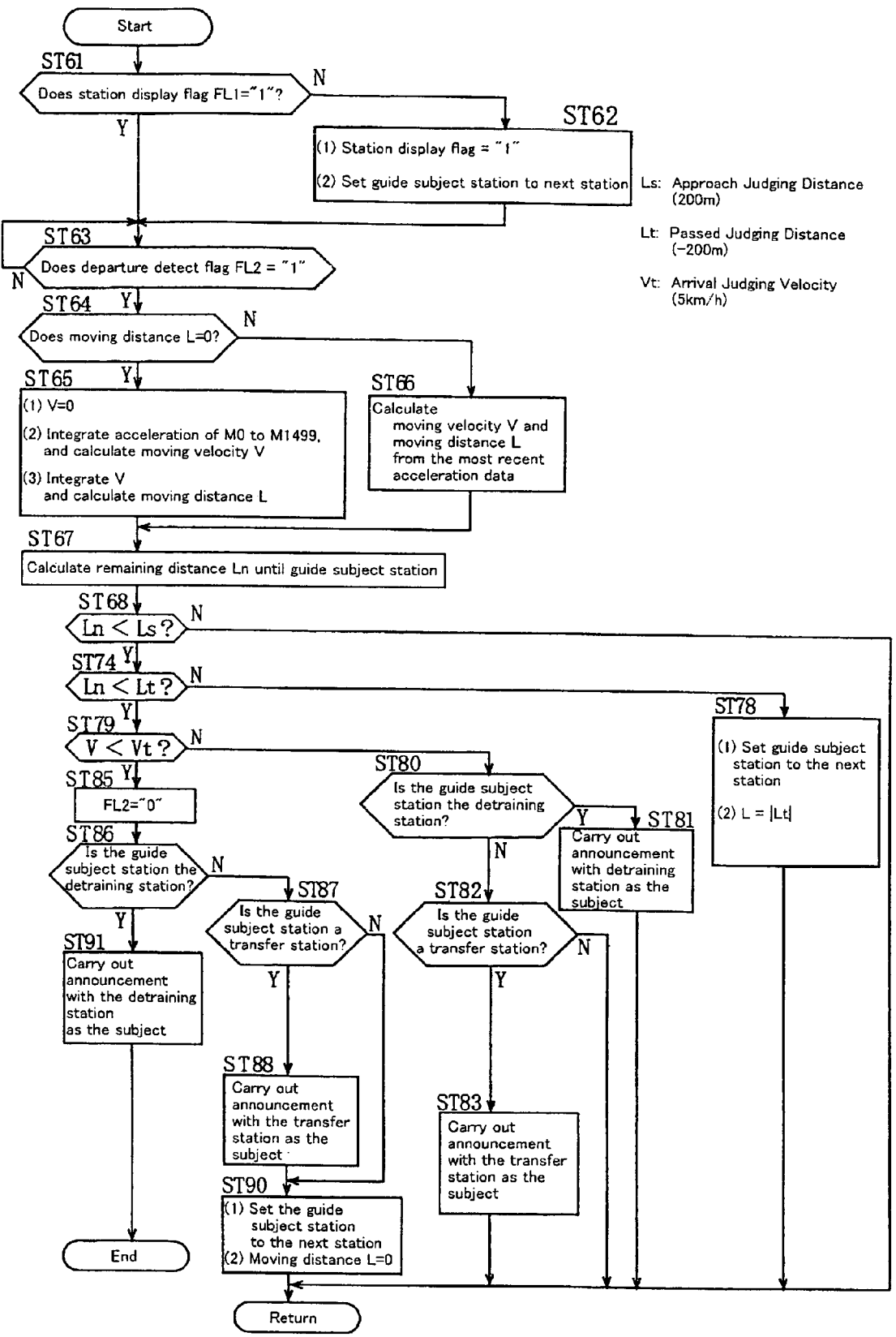
FIG. 28 is a flowchart of the station approach/arrival announcement process of Example 3, corresponding to FIG. 14 of Example 1.

FIG. 28 is a flowchart of the station approach/arrival announcement process of Example 3, corresponding to FIG. 14 of Example 1.

In ST61 of FIG. 28, a determination is made whether the station display flag FL1 is "1" or not. If "no" (N), the operation moves on to ST62', and if "yes" (Y), the operation moves on to ST63.

In ST62', the following processes (1) and (2) are executed, and the operation moves on to ST63.

(1) The station display flag FL1 is set to "1".

(2) The target guide station is set to the next station on the route.

Next, the processes of ST63 to ST67 are executed, and the operation moves on to ST68.

In ST68, a determination is made whether the remaining distance Ln is less than the approach judging distance Ls or not. If "no" (N), the operation returns to ST61, and if "yes" (Y), the operation moves on to ST74.

In ST74, a determination is made whether the remaining distance Ln is less than the transit judging distance Lt or not. If "yes" (Y), the operation moves on to ST78, and if "no" (N), the operation moves on to ST79.

In ST78, the following processes (1) and (2) are executed, and the operation returns to ST61.
(1) The target guide station is set to the next station on the route.
(2) The traveled distance L is set to the magnitude of the transit judging distance Lt (i.e., the absolute value of Lt).

In ST79, a determination is made whether the magnitude V of the moving velocities Vx to Vz is less than stoppage judging velocity Vt or not. If "no" (N), the operation moves on to ST80, and if "yes" (Y), the operation moves on to ST85.

In ST80, a determination is made whether the target guide station is the detraining station or not. If "yes" (Y), the operation moves on to ST81, and if "no" (N), the operation moves on to ST82.

In ST81, an announcement (by vibration) that the train is approaching the detraining station as the target is carried out. The operation then returns to ST61.

In ST82, a determination is made whether the target guide station is a transfer station or not. If "yes" (Y), the operation moves on to ST83, and if "no" (N), the operation returns to ST61.

In ST83, an announcement of approach to a transfer station as the target is carried out. The operation then returns to ST61.

In ST85, the departure detection flag FL2 is set to "0". The operation then moves on to ST86.

In ST86, a determination is made whether the target guide station is the detraining station or not. If "no" (N), the operation moves on to ST87, and if "yes" (Y), the operation moves on to ST91.

In ST87, a determination is made whether the target guide station is a transfer station or not. If "yes" (Y), the operation moves on to ST88, and if "no" (N), the operation moves on to ST90.

In ST88, an announcement of arrival at a transfer station as the target is carried out. The operation then moves on to ST90.

In ST90, the following processes (1) and (2) are executed, and the operation returns to ST61.

(1) The target guide station is set to the next station on the route.

(2) The traveled distance L is reset to 0.

In ST91, an announcement of arrival at the detraining station as the target is carried out. The station approach/arrival announcement process of FIG. 28 is then shut down, and the operation returns to the station guide process of FIG. 27.

Effects of Example 3

In the route guide system S of Example 3 as described above, a user can record into the station setting image 61 the route of a departure station, a destination station, a transfer station etc, and a time band for conducting station guidance. For example, a user can set a station close to his home from which he boards a train to commute to his workplace as the departure station, and record the closest station to his workplace as the destination station, then set his work start time as the outward detection time band (outward detection start time to outward detection completion time) and his return home time as the homeward detection time band (outward detection start time to outward detection completion time). Other examples include recording information regarding a school commuted to, or a regularly visited customer and the like.

Further, if a ticket 53 embedded with a non-contact IC is used for admission within such detection time band, the user's admission is automatically announced to the portable telephone 1. Based on the detected time band, the recorded departure station and destination station can be automatically set to either of an adjudged target station or a detraining station, whereby it can be determined whether the adjudged target station matches the admission station. If these stations match, using the recorded route, the user will be presumed to ride as far as the detraining station (outward destination station or homeward departure station) and detection of the departure of the transport facility takes place. Accordingly, the user is informed when the train is approaching or arriving at the detraining station or transfer station (if recorded). In the portable telephone 1 of Example 3, such announcement is made by driving a vibrator to cause the portable telephone 1 to vibrate without image display.

For example, if the user boards the subway or the user's return trip for home is after nightfall, he may not easily determine if the transport facility is running as it is dark outside the train. Alternatively, the train may be crowded, so that the electronic notice board displaying the next station cannot be seen from the user's position, or the user may be listening to music with headphones and is therefore unable to hear announcements being made by the transport facility within the train. In cases such as these, the user may have difficulty in determining whether the train is approaching or has arrived at a transfer station or detraining station, and thus prevent him from taking a nap on board the train for fear of missing such stop. However, in the case of the portable telephone 1 of Example 3, users are duly informed whether the train is approaching or has arrived at a transfer station or detraining station, thus preventing overshooting, etc. In addition, the portable telephone 1 of Example 3 also possesses the same advantageous effects as that of Example 1.

INDUSTRIAL APPLICABILITY

While the Examples of the present invention have been explained in detail above, the present invention is not limited to these Examples. Various modifications may be carried out within the general scope of the present invention as set forth in the Claims.

For example, in Examples 1 to 3, while detection of an approach being made to or arrival at a station was conducted based on inter-station distance and traveled distance, it is possible to detect such approach or arrival by using position information (coordinate position) on the entraining station to calculate the current position of the transport facility and then calculating the distance to the next station from such position and the position of the next station.

Further, in Examples 1 and 2, it is also possible to display the calculated remaining distance Ln in the intermediate display image and approach display image.

In addition, in Examples 2 and 3, while a ticket embedded with a non-contact IC and a portable telephone 1 residing in a separate body were used, it is possible to configure the non-contact IC as to be built into the portable telephone 1, so that when the portable telephone 1 comes into contact with the reader 52$a$, station information is received from a ticket gate 52, whereby information concerning the admission station can be acquired. In this case, the transmission/receipt of data or of admission confirmation mail from an admission maintenance server 9 and the server 7 can therefore be omitted.

Further, in Examples 2 and 3, while a ticket embedded with a non-contact IC was used, the present invention is not limited to such configuration as any configuration which is capable of acquiring admission information can be used. Possible configurations may consist of a bar code being attached to a station ticket gate and read for acquiring station information, by using a magnetic-type train pass.

In addition, applicability of the present invention is not limited to Examples 1 to 3 wherein a portable telephone 1 was used as the portable guide device, as it may also be applied to any portable device such as a PDA, a laptop computer, a headphone stereo, a portable MP3 player, a portable radio and the like.

Further, in Examples 1 to 3, in cases where the traveling direction is not adopted, the geomagnetic sensor SN1 and the like is not necessary.

In Examples 1 to 3, although an image display on an information display image 11 or a vibrator were mentioned as announcement units for the user, such announcement function may also be carried out by an arbitrary announcement unit, in the form of an alarm sound, a buzzer sound, or a predetermined melody, or by causing a light emitting device to flash.

Further, in Examples 1 to 3, while the motion start time acceleration range (1 km/h/s to 4 km/h/s) used for detecting the departure of the transport facility and the acceleration continuation time (15 seconds) were set at predetermined values, for example, in respect of a short zone wherein the inter-station distance is extremely short and the acceleration continuation time is also short, the acceleration continuation time may be set shorter than usual. In addition, when it is known that a sleeper train or a rail motor will be used, the motion start time acceleration range can likewise be set lower (e.g. 0.5 km/h/s to 3 km/h/s).

In Examples 1 to 3, errors may possible occur due to the quality of detection precision of the acceleration sensor SN3 itself, wherein errors tend to accumulate as the distance between stations increases. To address this problem, when it is known that the transport facility will pass through certain places where a detectable change of state will occur, the configuration can be such that the remaining distance Ln is corrected when such places have been passed. For example, when it is known that there is a tunnel along the line and that the electromagnetic waves from the base station of the portable telephone 1 will be cut off (become out of range), it is possible to configure the portable telephone 1 such that the places which may be cut off are pre-recorded, and the receiving state of the electromagnetic waves of the portable telephone 1 is confirmed, so that the remaining distance Ln to the next station can be corrected. Further, in the case of a carriage such as a bullet train enters a tunnel at high speed, a change in air pressure occurs, and to address this, an air-pressure sensor can be installed into the portable telephone 1 and places where sudden air pressure changes occur are pre-recorded, such that when a sudden air pressure change is detected, the remaining distance Ln to the next station can be corrected.

Further, the inclination sensor SN2 provided in Examples 1 to 3 may be omitted, and in lieu thereof, a three-dimensional acceleration sensor SN3 may be utilized to detect the acceleration G due to gravity in the vertical direction (9.8 m/s$^2$), whereby the inclination angles $\alpha$, $\beta$ can also be calculated.

In addition, while a true orientation was used in Examples 1 to 3, it is also possible to use the magnetic orientation to calculate the traveling direction, etc.

Further, in Examples 1 to 3, while the read acceleration data Ax to Az outputted from the acceleration sensor SN3 was stored as acceleration data ax to az having undergone coordinate transformation, and the processes were carried out based on this data, the present invention is not restricted to this, as it also possible to store the data Ax to Az prior to coordinate transformation and thereby execute the respective processes based on such stored data.

In addition, in Examples 1 to 3, while the portable telephone 1 received and stored the route information from the server 7, it may be also configured in the manner that all of the functions with which the route information providing server 7 is equipped with are built into the portable telephone 1, thereby enabling the portable telephone 1 to execute the searching of routes and detection of transit stations, etc. by itself.

Further, in Examples 1 to 3, it is also possible to change the values of the sampling interval t1, approach judging distance Ls, the transit judging distance, the arrival judging velocity and the like, in accordance with the design of the portable telephone 1 and transport facility to be used.

In addition, in Examples 1 to 3, the silent mode setting means may also be omitted.

What is claimed is:

1. A portable guide device comprising:
    an acceleration sensor for detecting the acceleration of a portable guide device when it is in motion;
    acceleration range storage means for storing the motion start acceleration range of a transport facility which accelerates at a certain speed within a predetermined range at motion start time;
    acceleration continuation time storage means for storing the acceleration continuation time to determine whether the transport facility has begun to move;
    acceleration range judging means for determining whether the acceleration detected by the acceleration sensor is within the motion start time acceleration range;
    acceleration continuation judging means for determining whether the acceleration detected by the acceleration sensor is within the motion start time acceleration range and whether the duration thereof is longer than the acceleration continuation time;
    transport facility motion start judging means for determining that the transport facility has begun to move when the acceleration detected by the acceleration sensor is within the motion start time acceleration range and the duration thereof is longer than the acceleration continuation time;
    distance traveled calculating means for calculating, upon detection that the transport facility has begun to move, the distance traveled by transport facility based on the acceleration detected by the acceleration sensor;
    route information storage means for storing route information consisting of information pertaining to either the distance between respective stations of the transport facility or information on the position of stations, and station identification information for identifying the respective stations;
    entraining station storage means for storing the station identification information in respect of the entraining station of the transport facility; and
    announcement device control means which controls an announcement unit for announcing station guidance to a user of the portable guide device based on the station identification information in respect of the entraining station, the route information and the distance traveled by the transport facility.

2. The portable guide device according to claim 1, comprising:
    route information receiving means for receiving the route information transmitted from a route information providing server storing the route information; and
    the route information storage means for storing the received route information.

3. The portable guide device according to claim 1, comprising:
    admission information receiving means which receives admission information in respect of admission to a station; and
    the entraining station storage means for storing the admitted station as the entraining station based on the admission information received.

4. The portable guide device according to claim 3, comprising:
    traveling direction operating means which, upon detection that the transport facility has begun to move, detects the traveling direction of the transport facility based on the acceleration detected by the acceleration sensor;
    traveling direction information transmitting means which transmits information on the traveling direction of the transport facility to the route information providing server for detecting a station on the route of the transport facility boarded by the user based on the admission information and information on the traveling direction; and
    the route information storage means for storing the route information comprising station identification information of stations on the route transmitted from the route information providing server.

5. The portable guide device according to any one of claims 1 to 3 comprising:

station setting image display means which displays a station setting image for setting a departure station and a destination station;

setting station information transmission means for transmitting information in respect of the departure station and the destination station set according to inputs made to the station setting image to the route information providing server which stores the route information; and the route information storage means for storing the route information comprising station identification information in respect of the departure station, the destination station, and each station of the transit stations transmitted from the route information providing server which detects transit stations between the departure station and the destination station.

6. The portable guide device according to claim 1 or 2, comprising:

route storage means for storing a route used by the transport facility from the departure location to the destination, an entraining station and detraining station of the transport facility boarded by the user, and station identification information in respect of the detraining station and transit stations;

the entraining station storage means for storing the entraining station stored in the route storage means as an entraining station of the transport facility; and the route information storage means for storing route information comprising the station identification information in respect of the detraining station and transit stations.

7. A portable telephone comprising the portable guide device according to any one of claims 1 to 4.

8. The portable telephone according to claim 7 comprising:

silent mode setting means, upon detection that the transport facility has begun to move, for setting the portable telephone to silent mode by which the user is informed of an incoming call without activating the ring tone which operates when an incoming call is made to the portable telephone.

* * * * *